March 27, 1962    R. C. LEE ETAL    3,027,550
SIGNAL PULSE DETECTOR AND REGISTER
Filed Dec. 31, 1956    21 Sheets-Sheet 1
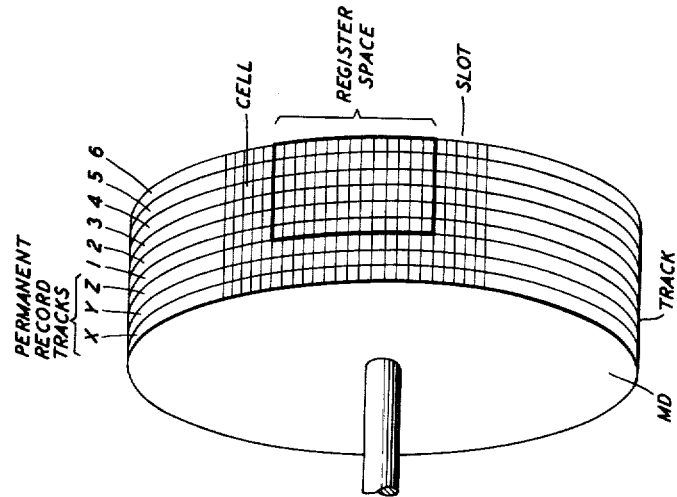
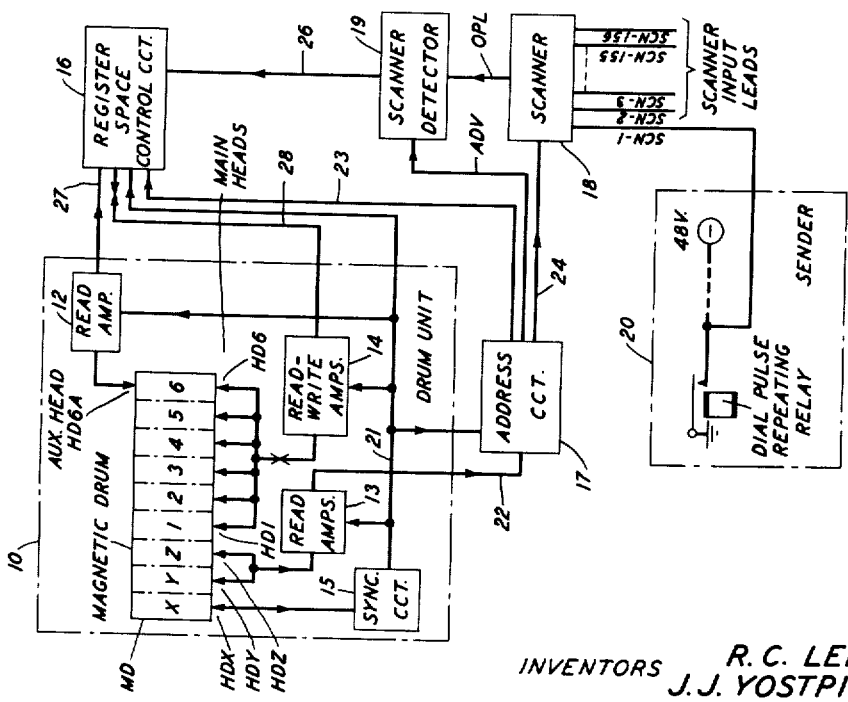
INVENTORS  R. C. LEE
J. J. YOSTPILLE
BY Kenneth B. Hamlin
ATTORNEY March 27, 1962 R. C. LEE ETAL 3,027,550
SIGNAL PULSE DETECTOR AND REGISTER
Filed Dec. 31, 1956 21 Sheets-Sheet 2

INVENTORS R. C. LEE
J. J. YOSTPILLE
BY
ATTORNEY

March 27, 1962  R. C. LEE ETAL  3,027,550
SIGNAL PULSE DETECTOR AND REGISTER
Filed Dec. 31, 1956  21 Sheets-Sheet 3

INVENTORS R.C. LEE
J. J. YOSTPILLE
BY Kenneth B Hamlin
ATTORNEY

March 27, 1962 R. C. LEE ETAL 3,027,550
SIGNAL PULSE DETECTOR AND REGISTER
Filed Dec. 31, 1956 21 Sheets-Sheet 4
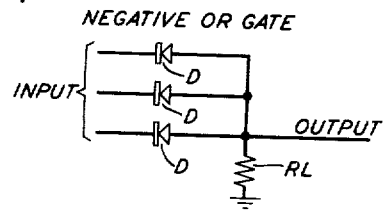
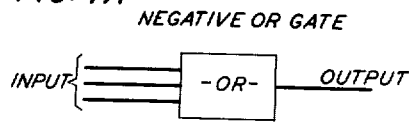
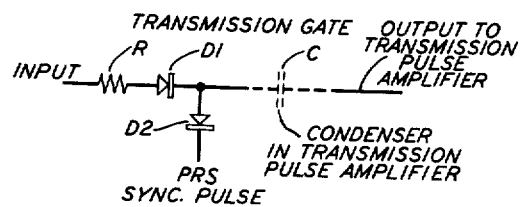
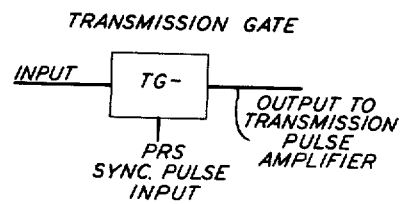
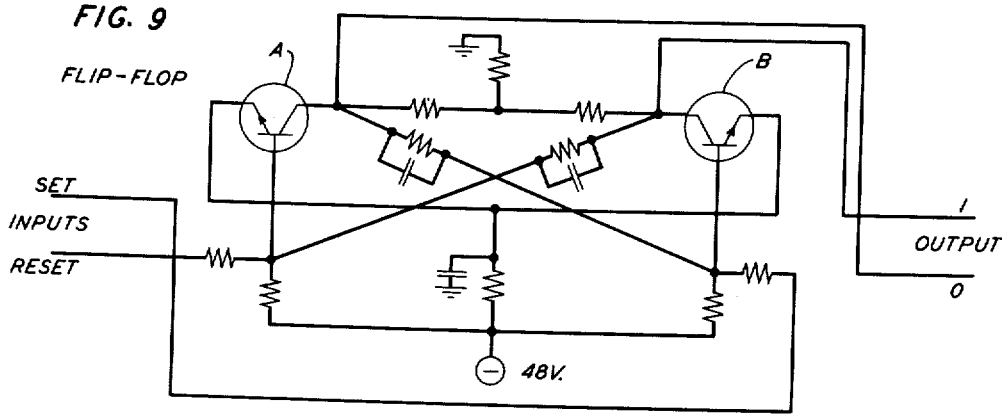
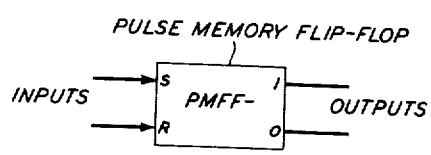
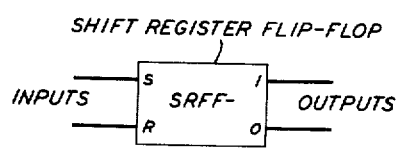
INVENTORS R.C. LEE
J. J. YOSTPILLE
BY Kenneth B Hamlin
ATTORNEY March 27, 1962  R. C. LEE ETAL  3,027,550
SIGNAL PULSE DETECTOR AND REGISTER
Filed Dec. 31, 1956 21 Sheets-Sheet 5

D.C. AMPLIFIER

D.C. AMPLIFIER

SHIFT REGISTER GATE

SHIFT REGISTER GATE

PULSE AMPLIFIER

PULSE AMPLIFIER

TRANSMISSION PULSE AMPLIFIER

INVENTORS R.C. LEE
J.J. YOSTPILLE
BY Kenneth B Hamlin
ATTORNEY

PULSE SHAPING AMPLIFIER

SYNCHRONIZING PULSES

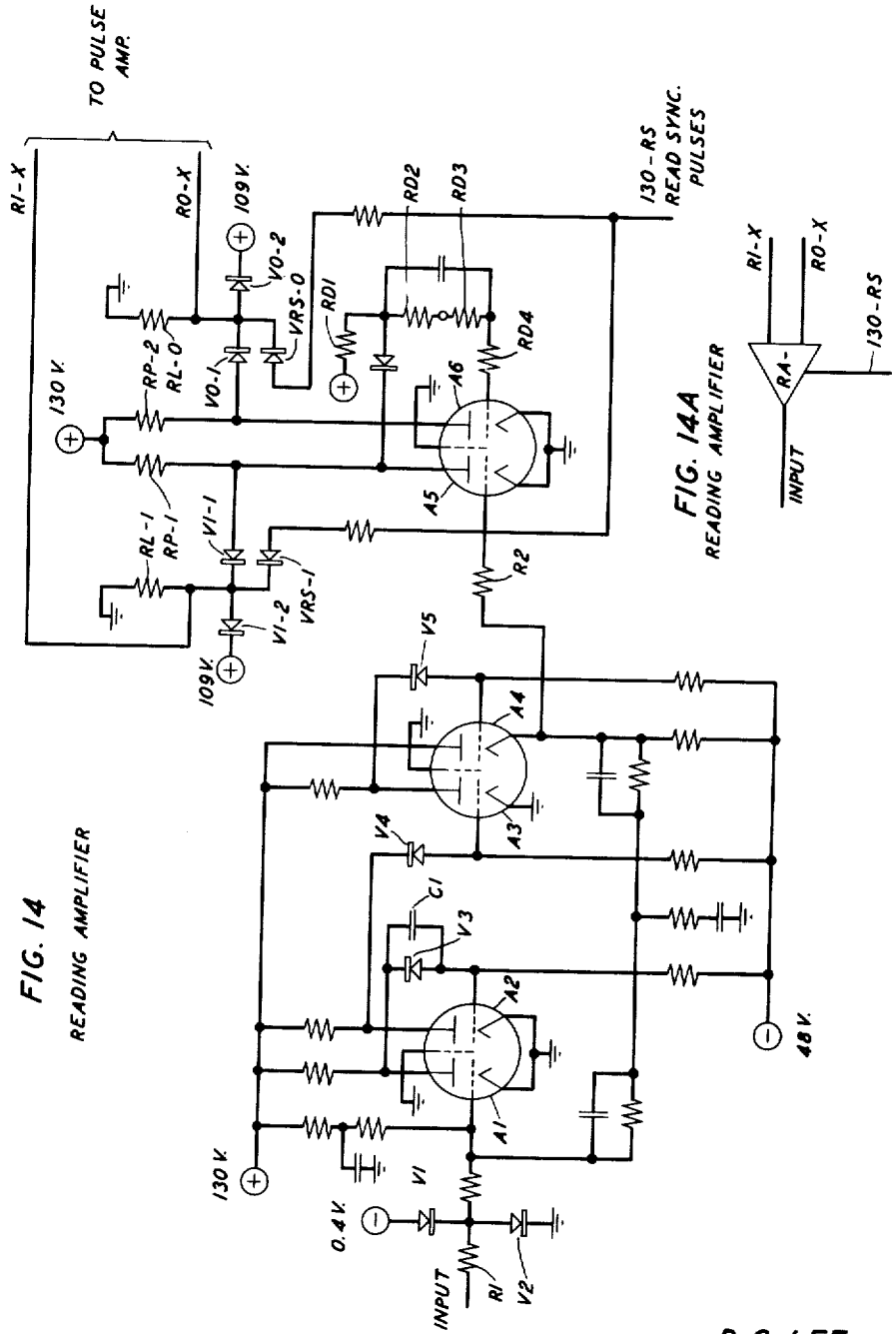

March 27, 1962
R. C. LEE ETAL
3,027,550
SIGNAL PULSE DETECTOR AND REGISTER
Filed Dec. 31, 1956
21 Sheets-Sheet 8
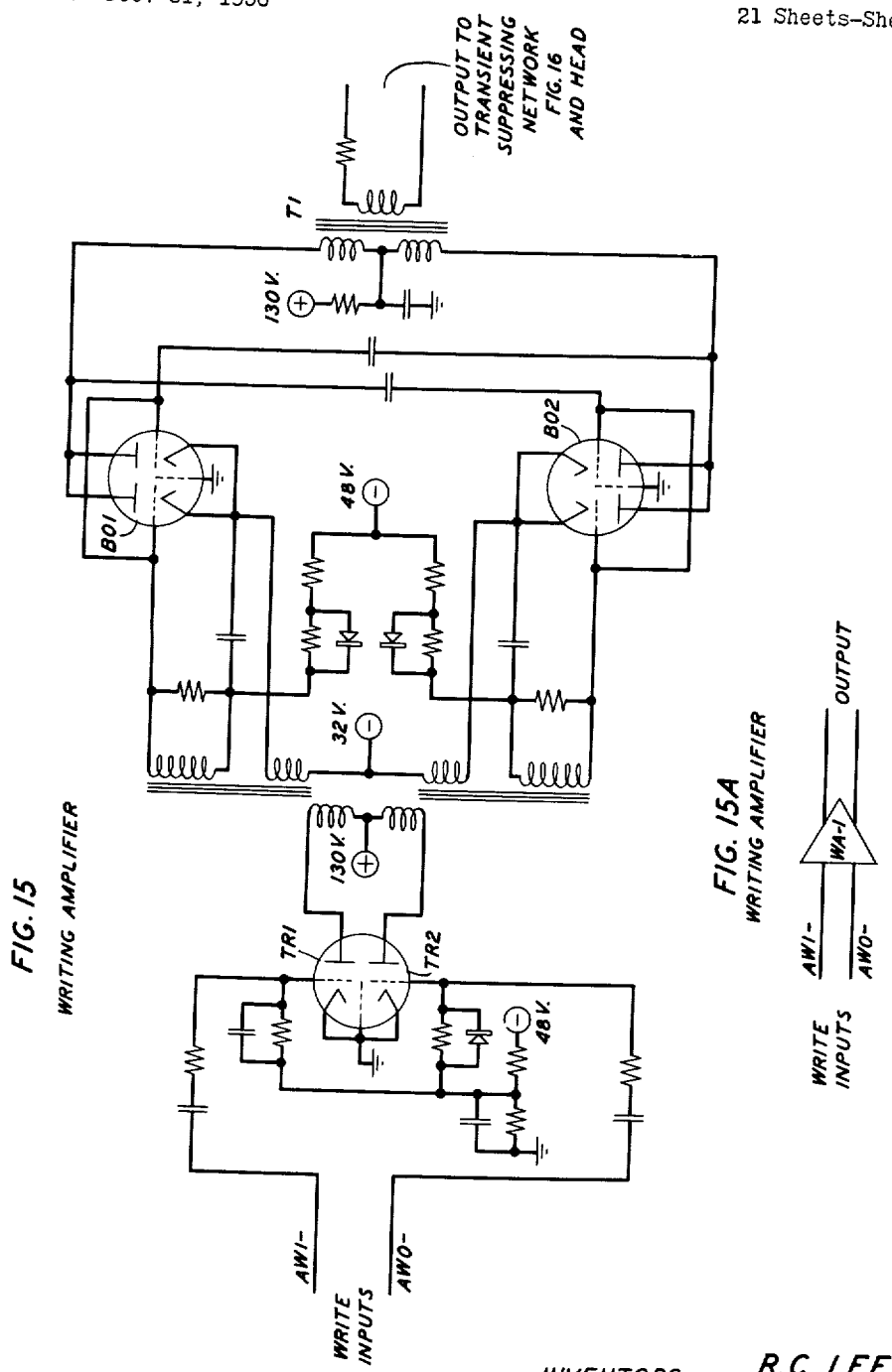
FIG. 15 WRITING AMPLIFIER
FIG. 15A WRITING AMPLIFIER
INVENTORS R.C. LEE
J.J. YOSTPILLE
BY
Kenneth B Hamlin
ATTORNEY

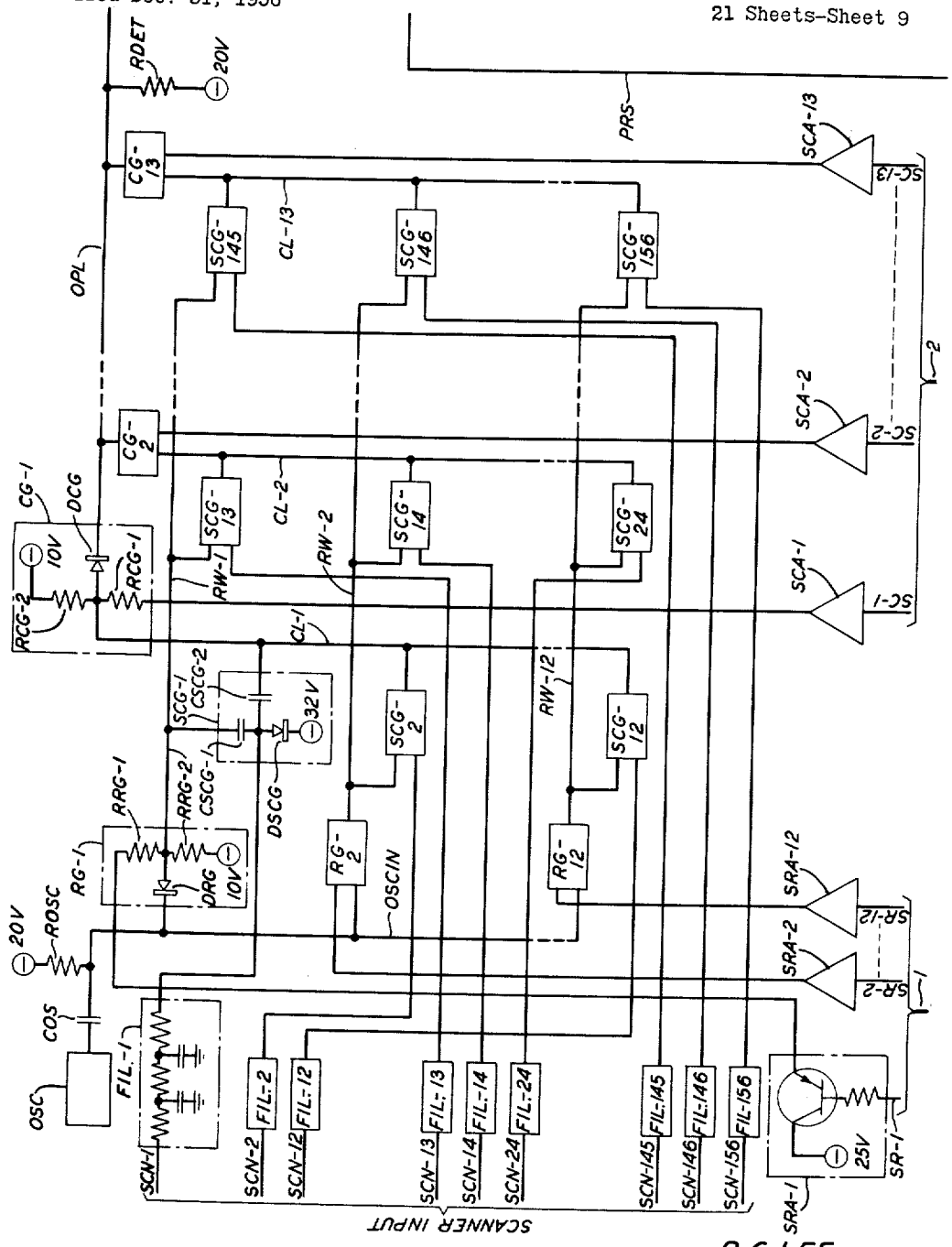

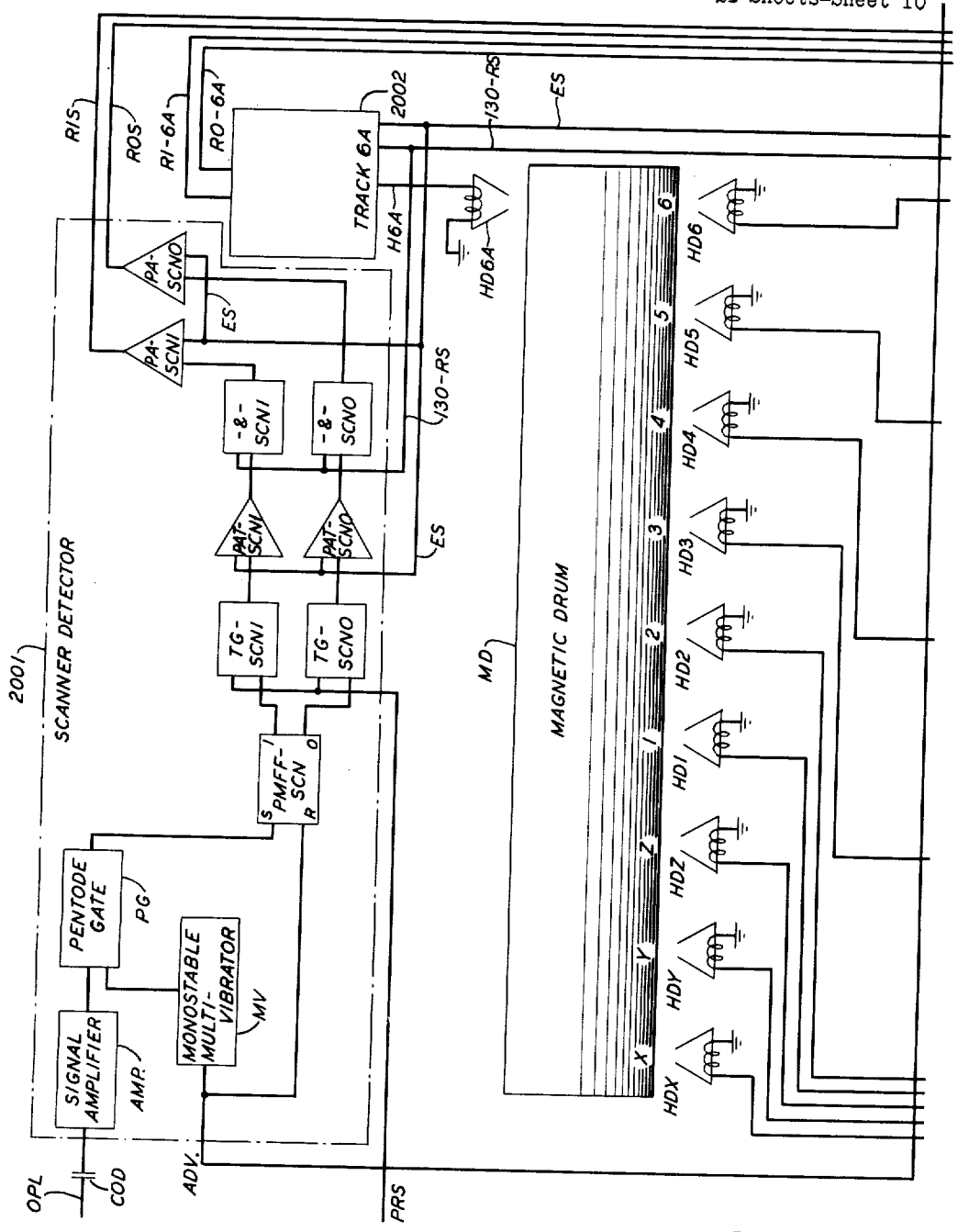

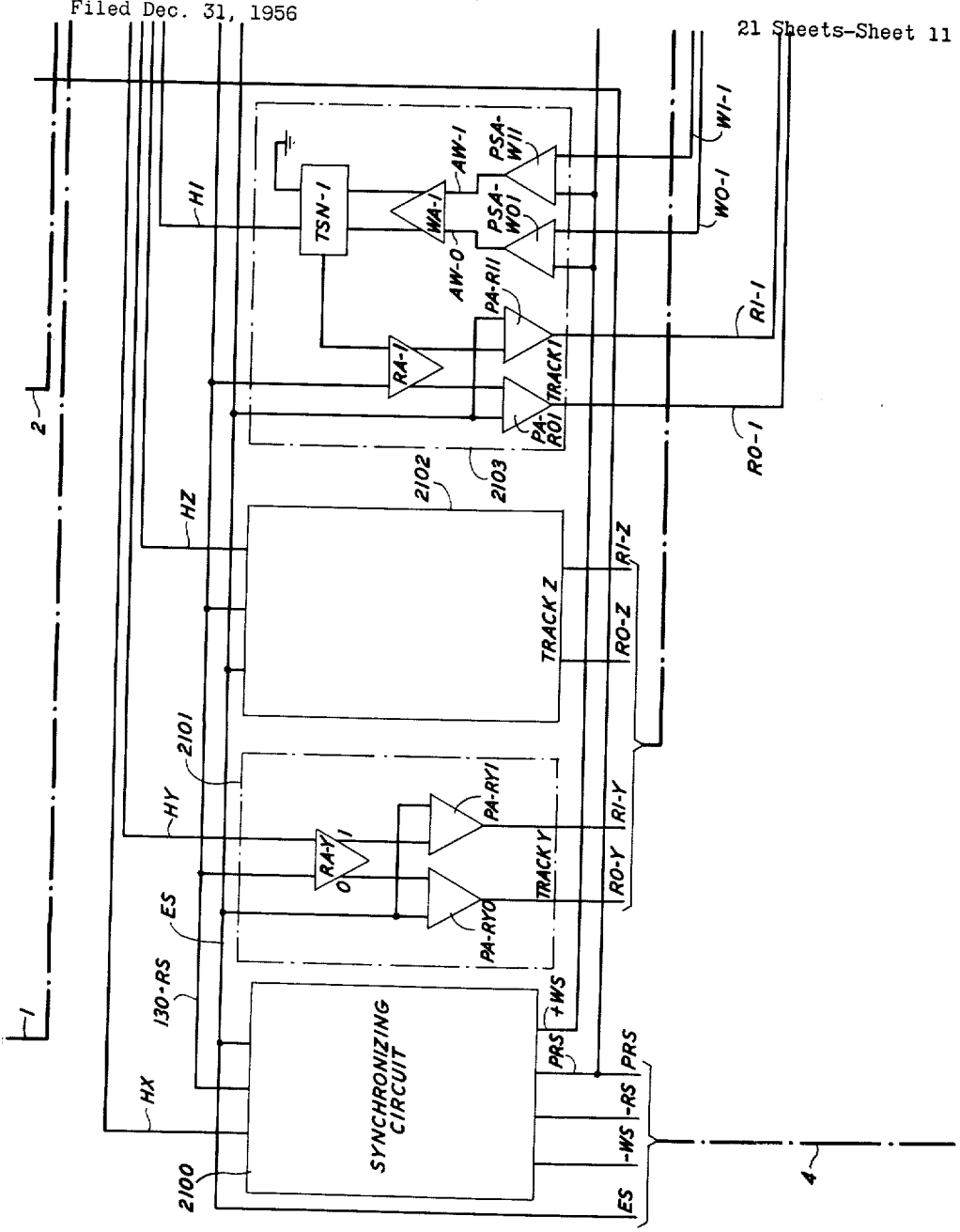

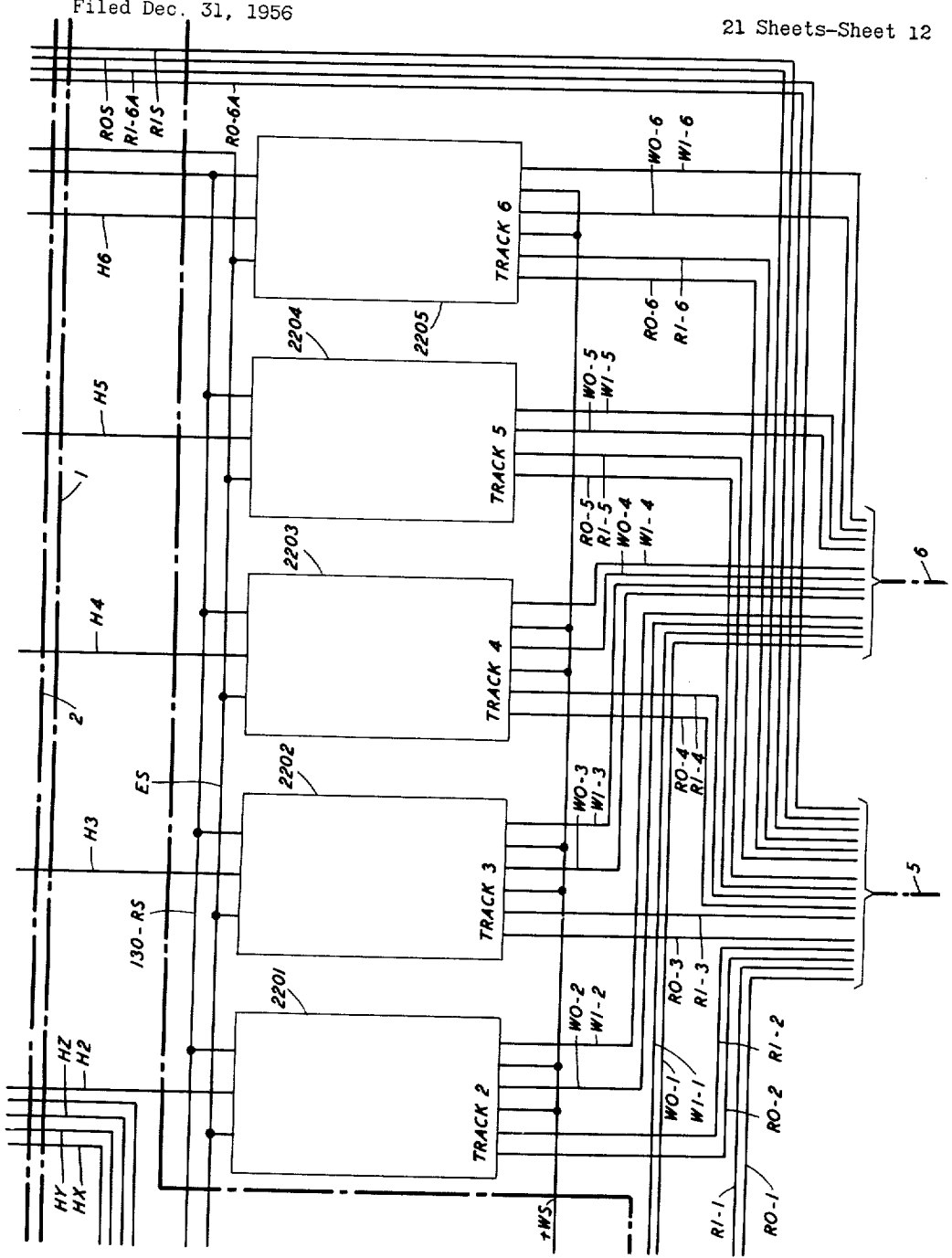

INVENTORS
R.C. LEE
J.J. YOSTPILLE
BY Kenneth B Hamlin
ATTORNEY

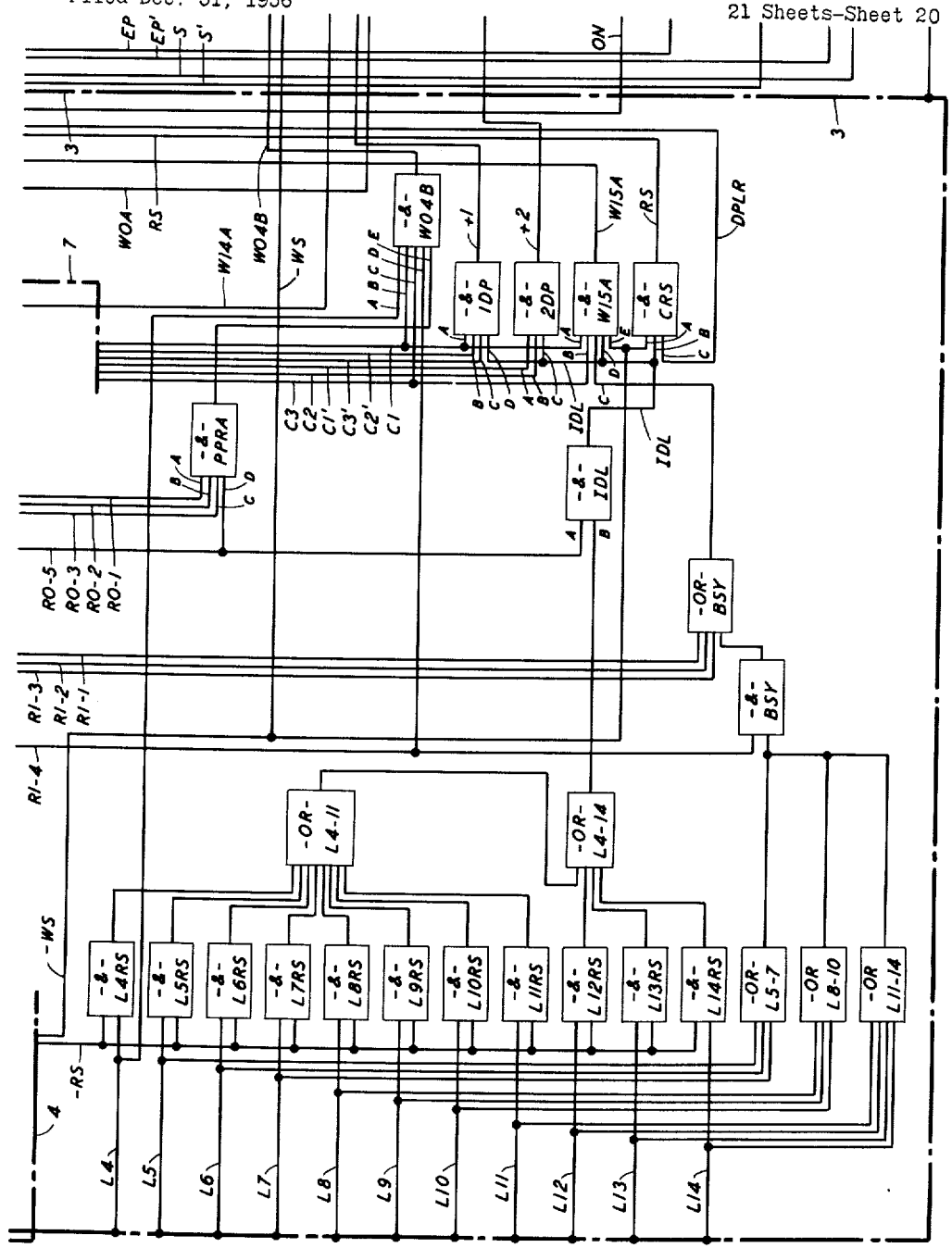

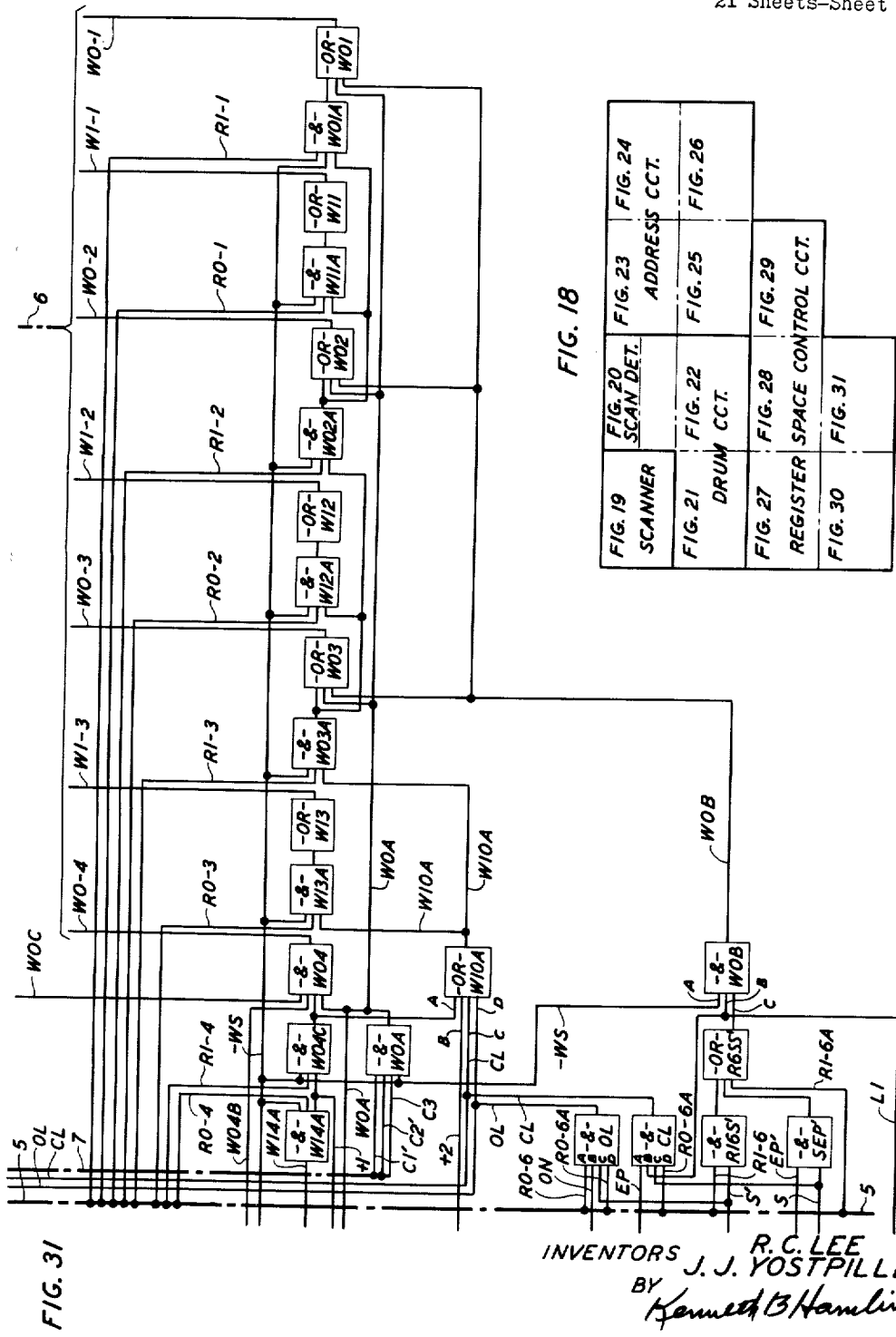

United States Patent Office 3,027,550
Patented Mar. 27, 1962

3,027,550
SIGNAL PULSE DETECTOR AND REGISTER
Robert C. Lee, Madison, and John J. Yostpille, Livingston, N.J., assignors to Bell Telephone Laboratories, Incorporated, New York, N.Y., a corporation of New York
Filed Dec. 31, 1956, Ser. No. 631,531
15 Claims. (Cl. 340—174.1)

This invention relates to methods and apparatus for detecting, counting and registering signal pulses; more particularly, this invention relates to methods and apparatus employing a magnetic drum for detecting, counting and registering signal pulses in data storage systems, computers and telephone systems.

Signal pulses utilized in data storage systems, computers and telephone systems, and which the present invention may advantageously detect, count and register, are characterized by changes in a circuit condition from one state to a second state and back again to the first state. For example, in telephone systems a complete signal pulse (a dial pulse) is characterized by the change in the condition of a subscriber's loop from a closed loop condition to an open loop condition and back again to a closed loop condition. Similarly, a complete signal pulse utilized in a data storage system may be characterized by a change in the potential condition present on an information input or output lead from a first potential level to a second potential level and back again to the first potential level.

An object of the present invention is the provision of improved circuits and apparatus for detecting, counting and registering signal pulses of the above type.

The use of a magnetic drum as a memory or storage element in data storage systems is well known. Its ability to store up to several hundred thousand bits of information in a compact space and at a low cost per bit, and its ability to store this information in a nonvolatile form, makes the magnetic drum particularly attractive for use in such systems.

A magnetic drum essentially comprises a means for rotating a thin cylindrical shell of magnetic material rapidly past one or more magnetic heads located adjacent to but out of contact with the rotating surface. Each magnetic head comprises one or more coils surrounding a core element and may be used either as a recording (writing) or a reading instrumentality.

Magnetic drum data storage systems are based on the principle of producing a pattern of magnetic marks on the surface of the drum for each item of information to be stored. This pattern is arranged in ordered columns, each column being defined by the circumferential area of the drum which passes immediately under or is influenced by a single magnetic head. These columns on the drum are termed "tracks." The marks are further arranged in ordered rows termed "slots" (a contraction of the term "time-slot"), as defined by the occurrence of synchronizing pulses produced in response to timing or clock pulses from a timing pulse generator circuit operating in synchronism with the rotation of the drum. The part of a track which is directly under or is influenced by a single magnetic head when a synchronizing pulse occurs, and which is defined by the intersection of a track and a slot, is known as a "cell" and is the incremental area on the drum surface in which a single magnetic mark may be entered. A slot is, therefore, the aggregate of all the cells of the drum which pass under or are influenced by their respective magnetic heads during the occurrence of any one synchronizing pulse. The simplest arrangement of a slot is a rectangular area running parallel with the axis on the surface of the drum. In the usual case, however, the slot will be more complicated in form. When the various magnetic heads are staggered or positioned in the form of a helix around the drum, the slot pattern on the surface of the drum will be sawtoothed in form or helical in form.

It has heretofore been found particularly advantageous to employ a magnetic drum with common control circuitry to detect, count and register the signal pulses applied to large pluralities of circuits in data storage systems, computers and telephone systems. One such telephone system, for example, wherein connections between subscribers are completed under control of information permanently and temporarily stored on magnetic drums is disclosed in Patent 2,723,311 granted to W. A. Malthaner and H. E. Vaughan on November 8, 1955. Magnetic drum systems have also been proposed heretofore as auxiliary memory and storage elements in telephone systems to provide additional register capacity for registers or register senders presently in use in telephone offices. Such a system is disclosed in the copending application of C. E. Brooks, W. O. Fleckenstein, R. C. Lee and H. N. Seckler, Serial No. 554,280, filed on December 20, 1955, now Patent 2,876,288 granted March 3, 1959.

As heretofore proposed the magnetic drum and associated logic circuitry employed in common control systems of the type referred to above are utilized on a time shared basis to periodically scan the circuits to which signal pulses are applied and to detect, count and record these signal pulses on the magnetic drum. In a typical operation of such a system a scanner is operated in synchronism with the rotation of the magnetic drum to scan each of the circuits once per revolution of the magnetic drum and to record the state of each scanned circuit in an area associated therewith on the magnetic drum. The speed of rotation of the magnetic drum is such that each circuit is periodically scanned at a rate sufficiently fast to insure that signal pulse information is not missed. It will be noted that if the number of circuits to be periodically scanned is increased, or if the duration of the signal pulse applied to the scanned circuits is decreased, the speed of rotation of the magnetic drum must be correspondingly increased to insure that signal pulse information is not lost. For a signal pulse of a particular duration this requirement has heretofore placed a practical limitation upon the number of circuits in which these signal pulses may be detected, counted and registered by a magnetic drum and associated logic circuitry. Or for a particular number of circuits to be observed, this requirement has placed a practical limitation upon the minimum duration of the signal pulse that may be detected, counted and registered by a magnetic drum and associated logic circuitry. This limitation results because of the complexity and cost of suitable driving means for rotating magnetic drums at high speeds of rotation and because of the difficulty of maintaining a high speed of rotation of a magnetic drum within required tolerances. Furthermore, the manufacturing tolerances for the magnetic drum itself are much more critical when the drum is to rotate at a high speed of rotation.

A further object of the present invention is the provision of improved facilities employing a magnetic drum for detecting, counting and registering signal pulses in a greater number of circuits than heretofore accomplished with such facilities.

An additional object of the present invention is the provision of improved facilities employing a magnetic drum for detecting, counting and registering signal pulses of shorter duration than heretofore accomplished by such facilities.

As the speed of rotation of a magnetic drum is increased in order to periodically scan a greater number of circuits for signal pulses of a particular duration, or as the speed of rotation is increased in order to periodically scan a particular number of circuits for signal pulses of shorter duration, an additional disadvantage is encountered in the magnetic drum systems known heretofore. As the speed of rotation of the drum is increased (to insure that signal pulse information will not be missed), a shorter interval of time is available to the reading amplifiers, writing amplifiers and logic circuits associated with the magnetic drum for performing the logical functions of detecting, counting and registering signal pulses for each of the scanned circuits. This has necessitated an increase in the complexity of design and cost of manufacture of the reading amplifiers, writing amplifiers and associated logic circuitry. Furthermore, because the interval in which these logical functions must be performed for each of the scanned circuits is decreased the possibility of error or malfunction of the circuit is increased.

To overcome the above-described disadvantages it has been proposed heretofore in magnetic drum systems to scan each of the plurality of circuits to which signal pulses are applied a plurality of times during each revolution of the magnetic drum. This may be accomplished by positioning a plurality of magnetic heads around the circumference of the magnetic drum and by providing associated logic circuitry which will scan a particular circuit when a register area associated therewith on the magnetic drum is passing under one of the magnetic heads. This provision has increased the cost of such a magnetic drum system considerably because the magnetic heads are expensive to manufacture and are difficult and costly to accurately position around the circumference of the drum. Furthermore, considerable logic circuitry is required for each of the magnetic heads in order to control the multiple scanning of each of the circuits. In the above cited Brooks et al. application, for example, each of the circuits to which signal pulses are applied is scanned twice per revolution of the magnetic drum. This is accomplished therein by the use of an additional auxiliary writing head located on the circumference of the magnetic drum approximately 180 degrees from the main read-write heads. This writing head must be positioned with respect to the magnetic drum in such a manner that it will write on the surface of the magnetic drum at the exact center of a cell in order to prevent a spread of the writing flux into adjacent cell areas.

Accordingly, still another object of the present invention is the provision of improved magnetic drum signal pulse detecting, counting and registering circuits and apparatus which are more economical and reliable than such circuits and apparatus provided herebefore.

In accordance with one aspect of the present invention, the register spaces on the surface of the magnetic drum which are individually associated with the plurality of circuits to be scanned for signal pulses are divided into a plurality of groups. One register space in each of the groups is mated with a corresponding register space in each of the other groups of register spaces on the magnetic drum. For example, if the register spaces of the magnetic drum are divided into four groups, as in the illustrative embodiment of the present invention described hereinafter, each register space on the drum will have three mate register spaces located at equal intervals around the circumference of the drum. Similarly, if the register spaces on the magnetic drum are divided into five groups, each register space in a group will have a mate register space in each of the other groups, making a total of five mated register spaces located at equal intervals around the circumference of the magnetic drum. Each circuit to which signal pulses are applied is scanned a plurality of times during each revolution of the magnetic drum, once when the register space associated therewith passes under the main magnetic read-write heads on the magnetic drum, and an additional scan is made each time a mate register space passes under the main magnetic heads. Information relative to the changes of state of a circuit detected during each of the scans is made available to the logic circuits of the present invention when the register space associated therewith passes under the main magnetic heads. This is accomplished in the present invention by one auxiliary reading head located ahead of the main group of read-write heads around the circumference of the magnetic drum. Because this auxiliary head is a reading head only and no writing flux is involved, the head has wider spacing tolerances and accordingly is less difficult and expensive to position adjacent to the circumference of the magnetic drum than auxiliary writing heads utilized heretofore. Furthermore, the reading amplifier associated with the auxiliary reading head is less expensive than the writing amplifier heretofore used with auxiliary writing heads. The auxiliary reading head is positioned so that a register space passing under the main read-write heads on the drum and a register space passing under the auxiliary reading head are mated. In each of the register spaces on the magnetic drum in the present invention there are two cells allocated to each of the mate register spaces associated therewith. During the home scan of a circuit (when the register space associated therewith passes under the main read-write heads), the state of the circuit is recorded in the home register space. On the next scan of the circuit when the first mate register space passes under the main read-write heads, the home register space is passing under the auxiliary reading head. The state of the circuit as determined by this scan is recorded in one of two cells associated with the home register space in the first mate register space. A comparison is made by the logic circuits of the present invention between the present state of the circuit and the previous state of the circuit as read by the auxiliary reading head from the home register space. If a signal pulse has ended between the two succeeding scans as evidenced by a change of state of the circuit, a 1 will be recorded in the other of the two cells associated with the home register space in the first mate register space. When the second mate register space passes under the main read-write heads, the first mate register space will be under the auxiliary reading head. A scan of the circuit is again made at this time and the state of the circuit is recorded in one of the two cells associated with the home register space in the second mate register space. A comparison is again made by the logic circuits of the present invention between the present state of the circuit and the state of the circuit on the previous scan as read by auxiliary reading head from the first mate register space. If a signal pulse has ended a 1 will be recorded in the second of the two cells associated with the home register space in the second mate register space. If a signal pulse did not end in the interval between the passing of the first mate register space and the second mate register space under the main magnetic heads, but a pulse had ended in the previous interval, the 1 recorded in the first mate register space will be read by the auxiliary reading head and this 1 will be recorded in the second of the two cells associated with the home register space in the second mate register space. This action above described continues for each of the plurality of scans of the circuit during the remainder of the revolution of the magnetic drum. When the home register space of the circuit again passes under the main magnetic read-write heads and a home scan is again made, all the information necessary for the determination of the number of signal pulses that ended in the previous revolution of the magnetic drum is made available to the logic circuits of the present invention and the number of pulses detected and all the supervisory information relating to the scanned circuit are recorded in the home register space associated therewith.

A feature of the present invention relates to the scanning of each of a plurality of circuits a plurality of times during each revolution of a magnetic drum.

A further feature of the present invention relates to means operative a plurality of times during each revolution of a magnetic drum for determining the presence of signal pulses in each of a plurality of circuits.

It is a further feature of this invention that each of a plurality of two state circuits be scanned in a predetermined sequence a plurality of times during each revolution of a magnetic drum, the state of each circuit determined during each scan thereof being recorded on said magnetic drum and compared with the state of the same circuit determined during the next succeeding scan thereof to detect the completion of a signal pulse, and the recording on said drum after each of said scans of the cumulative count of the signal pulses detected thus far in the revolution of said drum.

A still further feature of the present invention relates to means operative a plurality of times during each revolution of a magnetic drum for precessing or shifting data from area to area around the circumference of the drum in a direction opposite to the direction of rotation of the drum.

It is an additional feature of the present invention that at the completion of each revolution of a magnetic drum, the cumulative count of signal pulses detected in each of a plurality of circuits in that revolution be recorded on the magnetic drum in individual areas associated respectively with said circuits.

In magnetic drum data storage systems employed heretofore, the interdigital interval between two successive series of signal pulses representing two separate digits of an item of data to be stored has been detected by counting the revolutions made by the magnetic drum after completion of the last signal pulse of the first series of pulses and before the initiation of the first signal pulse of the succeeding series. The number of revolutions made by the magnetic drum will of course depend upon the duration of the interdigital interval and upon the speed of rotation of the drum. It has heretofore been necessary to limit interdigital intervals to a predetermined number of complete drum revolutions. It is advantageous in systems where the speed of rotation of the magnetic drum is relatively slow and where the interdigital interval is relatively short to be able to detect interdigital intervals having a duration that is not equal to the time required for any number of complete drum revolutions.

It is also advantageous in magnetic drum data storage systems to selectively control interdigital timing for pulses ending in different parts of a revolution of a magnetic drum. It will be observed that the interdigital interval occurring after a signal pulse ending near the completion of a revolution of a magnetic drum and followed by a given number of complete revolutions of the drum will be substantially shorter in duration than the interdigital interval occurring after a signal pulse ending just after the start of a revolution of a magnetic drum and followed the same number of complete revolutions of the drum.

In accordance with another aspect of the present invention, selective interdigital timing is provided. In the illustrative embodiment described in detail hereinafter, if a signal pulse ends in the first three-quarters of a drum revolution and the condition of the circuit remains unchanged for one and three-quarters revolutions thereafter an interdigital timeout is completed, and if a signal pulse ends in the final quarter revolution of a magnetic drum an interdigital timeout is not completed until the circuit condition remains unchanged for two complete revolutions of magnetic drum thereafter. This selective interdigital timing enables interdigital intervals to be detected within closer upper and lower limits and hence minimizes the possibility that the first signal pulse in a succeeding series of signal pulses following an interdigital timeout will be lost.

Accordingly, another feature of the present invention relates to means for determining interdigital intervals between trains of signal pulses which intervals are not equivalent to the time duration of a given number of complete drum revolutions.

It is a further feature of this invention to selectively time interdigital intervals between succeeding series of signal pulses in a magnetic drum data storage system whereby an interdigital timeout is completed after one interval when the last pulse of a series of signal pulses occurs in one part of a revolution of the magnetic drum and an interdigital timeout is completed after a different interval when the last pulse of a series of signal pulses occurs in a later part of a revolution of the magnetic drum.

The foregoing and other objects and features of the present invention may be more readily understood from the following description of an illustrative embodiment thereof when read with reference to the attached drawings in which:

FIG. 1 discloses in block diagram form the magnetic drum and associated control circuits of the signal pulse detecting, counting and registering circuits and apparatus of the present invention;

FIG. 2 shows the typical layout of the magnetic drum, the permanent record tracks thereon, and the location of a typical register space;

FIG. 7 illustrates in shematic form the circuit for a negative OR gate utilized in the present invention;

FIG. 7A shows the convention utilized in the drawings for the negative OR gate illustrated in FIG. 7;

FIG. 8 illustrates in schematic form the circuit for a transmission gate utilized in the present invention;

FIG. 8A shows the convention utilized in the drawings for the transmission gate illustrated in FIG. 8;

FIG. 9 illustrates in schematic form the circuit for a transistor pulse memory flip-flop and a shift register flip-flop utilized in the present invention;

FIG. 9A shows the convention utilized in the drawings for the pulse memory flip-flop illustrated in FIG. 9;

FIG. 9B shows the convention utilized in the drawings for the shift register flip-flop illustrated in FIG. 9;

FIG. 14 illustrates in schematic form the circuit for the reading amplifier utilized in tracks Y, Z, and 1 through 6 on the magnetic drum in the illustrative embodiment of the present invention;

FIG. 14A shows the circuit convention utilized in the drawings to represent the reading amplifier of FIG. 14;

FIG. 15 illustrates in schematic form the circuit for the writing amplifiers utilized in tracks 1 through 6 on the magnetic drum in the illustrative embodiment of the present invention;

FIG. 15A shows the circuit convention utilized in the drawings for the writing amplifier of FIG. 15;

FIG. 18 shows the manner in which FIGS. 19 through 31 may be arranged to provide a detailed schematic representation of an illustrative embodiment of the present invention;

FIG. 19 shows in simplified schematic form the circuit for the scanner utilized in the illustrative embodiment of the present invention;

FIG. 20 shows in block diagram form the scanner detector and a representation of the magnetic drum and associated magnetic heads utilized in the illustrative embodiment of the present invention;

FIG. 21 shows in block diagram form the synchronizing circuit and the reading amplifiers, writing amplifiers, with their associated pulse shaping amplifiers and transient suppressing networks utilized in tracks Y, Z and 1 on the magnetic drum in the illustrative embodiment of the present invention;

FIG. 22 shows a block diagram representation of the reading amplifiers, writing amplifiers, transient suppressing networks, pulse amplifiers and pulse shaping amplifiers utilized with magnetic heads in tracks 2 through 6 on the magnetic drum in the illustrative embodiment of the present invention;

Figure 5A:
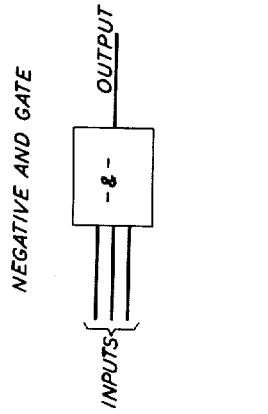
FIG. 5A shows the convention utilized in the drawings for the AND gate illustrated in FIG. 5.

FIG. 30 shows in block diagram form an additional portion of the register space control circuit of the present invention which includes the steering logic circuitry controlling the registration of dial pulses in appropriate digit registers in the register spaces on the magnetic drum; and FIG. 31 shows in block diagram form the final portion of the register space control circuit which includes the logic gates which control the binary accumulation of the count of dial pulses in the appropriate digit registers and the count of drum revolutions in the timer cells in each register space.

*General Description*

Referring now to FIG. 1 of the drawings, the operation of one illustrative embodiment of the magnetic drum signal pulse detecting, counting and registering circuits of the present invention will be described in a general way. This general description will be followed by a detailed description of a more complete schematic diagram of the present invention.

By way of illustration, the manner in which the present invention detects, counts and registers dial pulses received by senders in a common control telephone switching system will be described. It is further assumed that this telephone switching system contains a total of 156 such senders.

In telephone switching systems of this type, when the handset of a calling subscriber's line is lifted to initiate a call, the subscriber's loop to the central office is closed and a sender is seized. The sender then receives and registers the successive groups of dial pulses representing the called subscriber's directory number as dialed by the calling subscriber. The sender is unable to act upon this information until either all the groups of pulses representing digits of the called number have been received or until specific groups of these pulses have been received, such as pulses of the digits identifying the exchange of the called subscriber. Accordingly, the dial pulse information must first be registered and stored in the sender before it can be utilized to set up the desired switching connection in the central office to the called subscriber. With the advent of nationwide customer toll dialing it has been necessary to add additional digits to telephone subscribers' directory numbers. These digits generally comprise directing code or area code digits. This has presented a problem in some instances because some senders in telephone switching systems of the common control type do not contain sufficient registering capacity to accept and to register the additional digits. Accordingly, the dial pulse detecting, counting and registering circuits of the present invention may advantageously be utilized to provide additional register capacity for each of a plurality of senders in a common control telephone switching system. It is to be understood, however, that the signal pulse detecting, counting and registering circuits of the present invention are not limited to auxiliary use of this type and that the present invention may be utilized with equal facility to detect, count, and register dial pulses applied to subscribers' lines in magnetic drum telephone switching systems of the type disclosed in the above Malthaner-Vaughan patent or to detect, count and register signal pulses utilized in computers or data storage systems. It is to be further understood that the present invention is not limited to the detecting, counting and registering of signal pulses applied to 156 circuits.

As shown in FIG. 1 the present invention comprises a drum unit enclosed within the dotted rectangle 10, register space control circuit 16, address circuit 17, scanner 18, and scanner detector 19. These units are utilized in the illustrative embodiment to detect dial pulses in a sender of a common control telephone switching system. The dial pulse repeating relay of one such sender is shown in the dotted rectangle 20 in FIG. 1. As shown in FIG. 1, when a dial pulse repeating relay is operated in response to the closure of a subscriber's loop connected thereto, ground will be applied to lead SCN-1 which is connected to the input of scanner 18, and when the dial pulse repeating relay in the sender is normal or unoperated in response to the open condition of the subscriber's loop connected thereto, —48 volts will be connected to the scanner input lead SCN-1.

Figure 3:
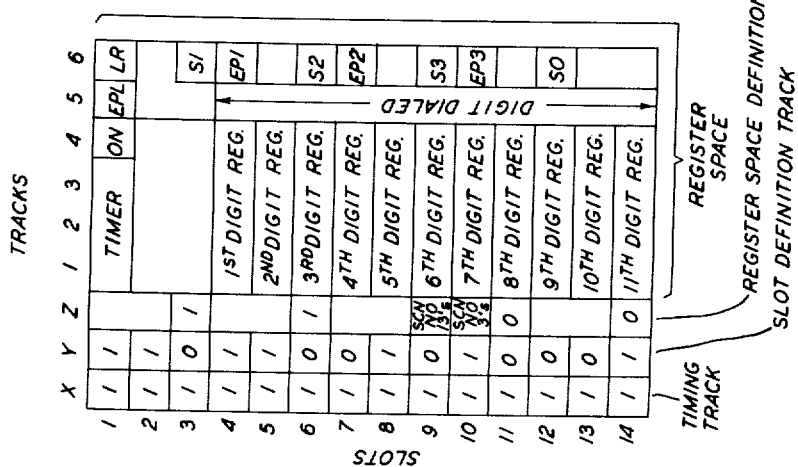
FIG. 3 shows in detail the layout of a register space.
Figure 4:
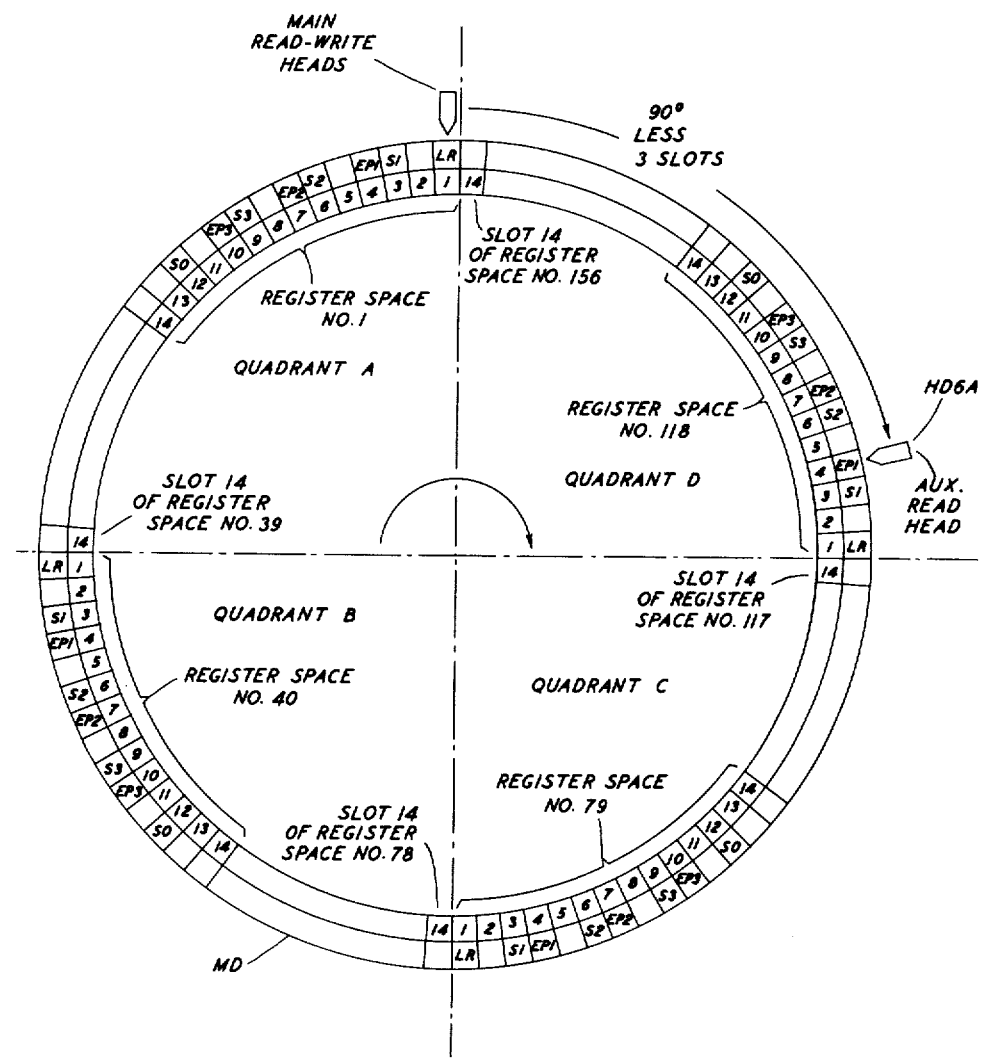
FIG. 4 shows in pictorial form the magnetic drum utilized in the present invention with the relative location of the main read-write heads and auxiliary read head thereon. This figure also shows four typical mated register spaces and the individual cells in track 6 thereof.

As shown in FIG. 1, the drum unit within dotted rectangle 10 comprises magnetic drum MD, synchronizing circuit 15, reading amplifiers 12 and 13, read-write amplifiers 14, main magnetic heads HDX, HDY, HDZ and HD1 through HD6, and auxiliary head HD6A. In the illustrative embodiment of the present invention, magnetic drum MD comprises 9 tracks. These tracks are designated tracks X, Y, Z, and 1 through 6 respectively, as shown in FIGS. 1, 2 and 3. Magnetic marks permanently recorded in track X are read by head HDX, and clock pulse signals or timing signals are supplied to a reading amplifier within synchronizing circuit 15. Information permanently recorded in tracks Y and Z are read by heads HDY and HDZ and corresponding signals are applied to reading amplifiers 13. Reading amplifiers 13 provide properly timed, uniform, low impedance signals via path 22 to control logic circuitry in address circuit 17. Tracks 1 through 6 on magnetic drum MD are utilized to record short-term, frequently-altered information obtained from register space control circuit 16 of the present invention. Heads HD1 through HD6 associated respectively with tracks 1 through 6 on drum MD read the information recorded in these tracks and supply corresponding signals to read-write amplifiers 14. These amplifiers in turn provide properly timed, uniform, low impedance signals via path 28 to the logic circuitry in register space control circuit 16. The output of the logic circuitry in register space control circuit 16 is also supplied via path 28 to the read-write amplifiers 14 which in turn supply the required signals to magnetic heads HD1 through HD6 to control the writing of information on magnetic drum MD in tracks 1 through 6. In addition to the main magnetic heads on drum MD, track 6 thereof has one auxiliary reading head HD6A. This reading head is positioned in the illustrative embodiment of the present invention as shown in FIG. 4, 90 degrees less 3 slots ahead of the main magnetic heads. Auxiliary head HD6A reads information in track 6 of magnetic drum MD and supplies corresponding signals to reading amplifier 12 which in turn provides, via path 27, properly timed, uniform, low impedance signals to the logic circuitry in register space control circuit 16.

Each of the senders in which dial pulse information is to be detected, counted and registered is assigned a group of cells on magnetic drum MD. This group of cells is labeled a register space and, as shown in FIGS. 2 and 3, comprises an area 6 tracks by 14 slots on the surface of magnetic drum MD. FIG. 2 shows the relative location of a typical register space with respect to the permanent record tracks on magnetic drum MD. FIG. 3 shows a detailed layout of a typical register space. In the illustrative embodiment of the present invention, the register spaces on the surface of magnetic drum MD individually associated with the senders in which dial pulses are to be detected, are divided into four groups. One register space in each of the four groups is mated with a corresponding register space in each of the other groups of register spaces. In other words, each register space on magnetic drum MD has three mate register spaces located at equal intervals around the circumference of the drum. FIG. 4 shows an example of four mated register spaces on magnetic drum MD. These register spaces are register spaces No. 1, No. 40, No. 79, and No. 118, and it will be noted that each is located in a separate quadrant of magnetic drum MD. In accordance with the present invention, each of the senders to which dial pulses are applied is scanned four times during each revolution of magnetic drum MD, once when the register space associated therewith passes under the main magnetic heads, and an additional scan is made each time a mate register space passes under the main magnetic heads. Therefore, in the illustrative embodiment of the present invention, during the passage of each register space under the magnetic heads, scanner 18 will be set to scan four senders, the one associated with the particular register space and the three senders associated with the mated register spaces. As shown in FIGS. 3 and 4, there are two cells in track 6 of each register space which are associated with each of the mated register spaces. These cells are designated S1 and EP1, S2 and EP2, S3 and EP3. Referring to FIG. 4, for example, cells S1 and EP1 in register space No. 1 are associated with register space No. 40; cells S2 and EP2 in register space No. 1 are associated with register space No. 79; and cells S3 and EP3 in register space No. 1 are associated with register space No. 118. As will be described hereafter, these cells are utilized to record the condition of the scanned senders and to record a cumulative count of the number of dial pulses completed in each during a revolution of magnetic drum MD.

Figure 17:
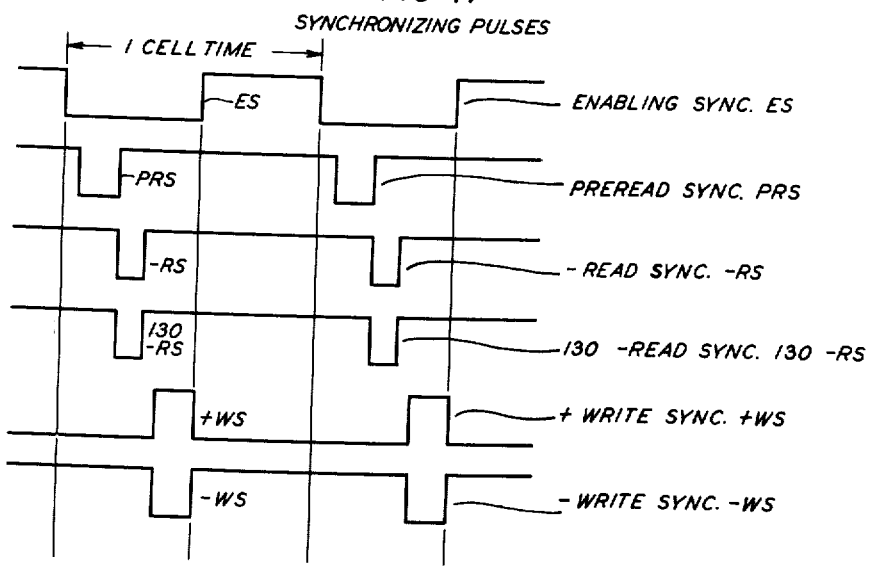
FIG. 17 shows a graphic representation of the synchronizing pulses utilized in the present invention to control the reading and writing functions of the reading and writing amplifiers and the logic functions of the logic circuitry of the present invention.

The so-called "single pass" method of reading and writing information in slots on magnetic drum MD is utilized in the present invention. In other words, information is read from a slot on magnetic drum MD, combined in external logic with other information and new information written in the same slot on drum MD, all while the slot is making one pass under the main magnetic heads. In order to control the reading operation and writing operation in drum unit 10 and to control logic operations in address circuit 17 and register space control circuit 16 during the passage of slots under the main magnetic heads, synchronizing circuit 15 produces a separate train of synchronizing pulses for each required function or operation. These synchronizing pulses are shown in graphic form in FIG. 17. It will be observed with reference to FIG. 17 that all of the operations, that is, reading, writing, et cetera, occur within the duration of one enabling sync pulse. All inputs to the logic circuitry of the present invention are gated with a read sync pulse or a preread sync pulse into pulse amplifiers which remain operated, after the read sync pulse ends, under the control of the enabling sync pulse. The output of the logic is gated with the write sync pulse which starts after the read sync pulse ends and is timed to provide the "single pass" operation on magnetic drum MD. The outputs of the logic, therefore, have no effect on inputs in the same time slot. The various synchronizing pulses shown in FIG. 17 are supplied to read amplifiers 13, address circuit 17, read-write amplifiers 14, read amplifiers 12, and register space control circuit 16, via path 21 shown in FIG. 1.

Address circuit 17 provides a continuous indication of the position of magnetic drum MD with respect to the main magnetic heads. As indicated above, address circuit 17 is controlled by signals permanently recorded in the Y and Z tracks on magnetic drum MD. The signals in track Y are supplied in serial form via read amplifiers 13 and path 22 to address circuit 17 and are registered therein in a four stage shift register. The output of this four stage shift register is then read and translated into a 1-out-of-14 code identifying respectively each of the 14 slots in each register space on magnetic drum MD. This slot code is supplied to register space control circuit 16 from address circuit 17 via path 23 and is used to control the logical operations in register space control circuit 16. Permanent signals recorded in track Z on magnetic drum MD are supplied in serial form via read amplifiers 13 and path 22 to address circuit 17 and are registered therein in shift registers. The outputs of these shift registers provide two codes, a 1-out-of-12 code and a 1-out-of-13 code. These codes are supplied via path 24 to scanner 18 and control the setting of the scanner to scan the senders in which signal pulses are to be detected. In the illustrative embodiment of the present invention, scanner 18, as will be described hereinafter, is set to scan a different sender upon the occurrence of the write sync pulse in slots 3, 6, 11 and 14, of each register space on magnetic drum MD. One further function of address circuit 17 is to provide pulses over the ADV lead to scanner detector 19. These pulses are applied by address circuit 17 to lead ADV when slots 2, 5, 8 and 13 of each register space pass under the main magnetic heads and will be utilized as described hereinafter to unblock scanner detector 19.

Because the illustrative embodiment of the present invention is utilized to detect, count and register dial pulses in 156 senders of a common control telephone switching system, it is necessary to periodically observe every sender on a time shared basis frequently enough to insure that signal pulse information is not lost. In other words, a connection must be periodically established on a time shared basis between each sender and the dial pulse detection circuits in register space control circuit 16 of the present invention. This connection is established under control of scanner 18 and scanner detector 19. As shown in FIG. 1, the scanner input leads SCN– are connected to the dial pulse repeating relay in each of the senders to be scanned. The scanner output lead OPL is connected to scanner detector 19, and the output of scanner detector 19 is supplied via path 26 to register space control circuit 16. The scanner, which is a coordinate selector, will establish a connection between one of its input leads and output lead OPL each time an address is supplied from address circuit 17. As indicated above in the illustrative embodiment of the present invention, the addresses supplied scanner 18 by address circuit 17 via path 24 are changed four times during the passage of each register space on magnetic drum MD under the main magnetic heads. Thus four separate senders are scanned during this interval. Scanner detector 19 samples the output of the scanner 18 on lead OPL each time an advance pulse is supplied over lead ADV from address circuit 17. The condition of the scanned sender upon each of these samplings is recorded in a flip-flop in scanner detector 19. If the subscriber's loop to the scanned sender is open when the scanner detector samples the output of the scanner, this flip-flop will be set to one condition, and if the subscriber's loop is closed to the scanned sender when the sampling occurs, the flip-flop in scanner detector 19 will be set to its other condition. The sequence of operation is as follows: Address circuit 17 causes scanner 18 to be set to scan a different sender during the occurrence of the write sync pulse in slots 3, 6, 11 and 14 of each of the register spaces. When slots 2, 5, 8 and 13 of the register spaces are passing under the main magnetic heads, address circuit 17 sends an advance pulse over lead ADV to scanner detector 19. Scanner detector 19 in each instance samples the output of scanner 18 and records the condition of the scanned sender. The flip-flop in scanner detector 19 will remain set to record the condition of the scanned sender until the occurrence of the next advance pulse of lead ADV from address circuit 17. During the occurrence of the read sync pulse in slots 3, 6, 9 and 14 of each register space, the condition of the scanner sender recorded in scanner detector 19 is transmitted via path 26 to the logic circuitry in register space control circuit 16. For example, address circuit 17 transmits the address of the sender associated with register space No. 1 to scanner 18 when the write sync pulse occurs in slot 11 of register space No. 156, and scanner 18 completes a path from the dial pulse repeating relay in the scanned sender to output lead OPL. When slot 13 of register space No. 156 passes under the main magnetic heads, address circuit 17 sends an advance pulse over lead ADV to scanner detector 19 which causes the flip-flop in scanner detector 19 to be set to record the condition of the sender associated with register space No. 1 scanned by scanner 18. During the occurrence of the read sync pulse in slot 14 of register space No. 156 the condition of the sender associated with register space No. 1 is transmitted from scanner detector 19 via path 26 to register space control circuit 16.

The function of register space control circuit 16 is to interpret the output of scanner detector 19 and to register dial pulses in the register space associated with each scanned sender. In addition, register space control circuit 16 performs timing functions in timing interdigital intervals and sender releases, and also includes circuitry for preliminary pulse rejection. Referring to FIG. 3, the detailed layout for a register space, the general operation and functions of register space control circuit 16 will be described. The cells in slot 1 of tracks 1, 2 and 3 designated "timer" are utilized by register space control circuit 16 to count the number of drum revolutions between changes of state of a subscriber's loop. The cell in track 4 slot 1 designated "On" is utilized by register space control circuit 16 to indicate that the sender associated with the register space is off normal. A 1 is recorded in the On cell when the sender is off normal, that is, when a call is being originated, and a 0 is recorded in the On cell when the sender is normal or unoperated. The EPL cell in slot 1 track 5 of the register space is utilized by register space control circuit 16 to record information pertaining to the location of the last dial pulse. This information differentiates between the first three-quarters and the last one-quarter of a drum revolution. If a dial pulse terminates during the first three-quarters of a drum revolution, register space control circuit 16 will cause a 0 to be written in the EPL cell, and if a dial pulse terminates in the last one-quarter of a drum revolution, register space control circuit 16 will cause a 1 to be written in the EPL cell. The LR cell in slot 1 track 6 of the register space is used by register space control circuit 16 to record the state of a calling subscriber's line. A 1 is written in the LR cell by register space control circuit 16 when the subscriber's loop to the sender associated with the register space is closed, and conversely a 0 is written in the LR cell when the subscriber's loop to the sender associated with the register space is open. The cells in tracks 1 through 4 of slots 4 through 14 of the register space designated "1st digit reg," "2nd digit reg," etc., through "11th digit reg" are binary counters in which register space control circuit 16 counts and registers the dial pulses of the 11 digits dialed into the sender associated with the particular register space. The cells in track 5 of slots 4 through 14 designated "digit dialed" cells adjacent to each digit register are written with a 1 by register space control circuit 16 when a digit register is filled, that is, when an interdigital timeout is detected following the storage of pulses in a particular digit register. As indicated above, the S1, EP1, S2, EP2, S3 and EP3 cells in track 6 of the register space are associated respectively with the three mate register spaces. The S0 cell in slot 12 track 6 of the register space is utilized in the multiple scanning as will be described, and is associated with the register space in which it is located.

For the purpose of explaining the principles of operation of the present invention, assume that the duration of the shortest dial pulse, that is, the shortest open loop interval representing a dial pulse, is 11 milliseconds and that the shortest interval between the pulses, that is, closed loop interval, is 25.3 milliseconds. Thus the shortest time in which a dial pulse can begin and end is 36.3 milliseconds. The reason for making the above assumptions is that these two values of open loop and closed loop interval correspond to the intervals presently used in typical telephone switching systems. Assume further for the purposes of illustrating the principles of operation of the present invention that the maximum time for one revolution of magnetic drum MD is 44 milliseconds. It is, therefore, obvious that more than one dial pulse may end and begin during a single revolution of magnetic drum MD. It is therefore advantageous to be able to detect the begining and ending of more than one dial pulse during a single revolution of magnetic drum MD, and therefore in accordance with the present invention each of the senders to which such dial pulses are applied will be scanned four times per revolution of magnetic drum MD. In the event that the dial pulse intervals, open loop and closed loop, differ from those assumed above, or that the speed of rotation of the magnetic drum differs from that assumed above, it is pointed out that in accordance with the principles of the present invention each of the circuits to which the dial pulses are applied may be scanned a smaller number or a greater number of times per revolution of the magnetic drum as required.

Returning again to the above assumptions, it will be noted that because each of the senders are scanned four times per revolution of drum MD or at approximately 11 millisecond intervals, dial pulse information will not be lost. Two dial pulses can conceivably end during the one revolution of magnetic drum MD, and it is therefore advantageous to break the revolution into two intervals in order to detect whether one or two dial pulses have ended during a revolution. The first portion of the revolution of magnetic drum MD will include, in the illustrative embodiment of the present invention, the first three-quarters of a revolution of drum MD, and the second portion will include the last quarter revolution. The maximum time for three-quarters of a revolution of the magnetic drum under the assumed speed of rotation is therefore approximately 33 milliseconds, and it will be observed that two pulses having the above assumed open and closed loop intervals can not begin and end during this interval. However, one pulse may end during this interval and a second pulse may end during the last quarter revolution of magnetic drum MD.

The operation of the dial pulse detecting circuits of the present invention will be explained in a general way with reference to FIGS. 1, 3 and 4 of the drawings by describing the logical operations performed by register space control circuit 16 with respect to the sender associated with register space No. 1 for one complete revolution of magnetic drum MD. The starting point for this explanation will be with the fourth scan of the sender associated with register space No. 1 in the previous revolution of drum MD made when slot 11 of register space No. 156 passes under the main read-write head on drum MD. Assume that the subscriber's loop to the sender associated with register space No. 1, a portion of which is shown in FIG. 4 of the drawings, is closed. This causes the operation of the dial pulse repeating relay in this sender. Scanner 18 will be set by address circuit 17 to scan this sender during the occurrence of the write sync pulse in slot 11 of register space No. 156. The condition of the subscriber's loop to this sender will be recorded in scanner detector 19 when the advance pulse occurs in slot 13 of register space No. 156. When slot 14 of register space No. 156 passes under the main magnetic heads, the condition of the subscriber's loop to the sender associated with register space No. 1 is made available via path 26 to the logic circuitry in register space control circuit 16. This closed loop condition will cause the operation of a line condition flip-flop in register space control circuit 16 which temporarily records the condition of the subscriber's loop to this sender at the start of the revolution of magnetic drum MD. Because the subscriber's loop is now closed register space control circuit 16 will cause a 1 to be written in the LR cell in slot 1 track 6 of register space No. 1, and because a call is being initiated register space control circuit 16 will cause a 1 to be written in the "On" cell in slot 1 track 4 of the register space No. 1.

Magnetic drum MD now revolves until slot 12 of register space No. 1 is under the main magnetic heads. At this time the condition of the subscriber's loop to the sender associated with register space No. 1 as recorded in the line condition flip-flop in register space control circuit 16 will be recorded in the S0 cell in slot 12 track 6 of register space No. 1. If the loop was closed 12 slots earlier a 1 will be written in the S0 cell, and if the loop was open 12 slots earlier a 0 will be written in the S0 cell. Therefore, under the assumed conditions a 1 will be written in the S0 cell in slot 12 track 6 of the register space No. 1.

Magnetic drum MD now revolves the first quarter revolution until slot 12 of register space No. 1 is under auxiliary head HD6A. At this time due to the three cell displacement of auxiliary head HD6A from 90 degrees as shown in FIG. 4, the S3 cell in slot 9 track 6 of register space No. 40 will be under the main read-write heads. The condition of the subscriber's loop to the sender associated with register space No. 1 as determined on the first scan of this sender in the revolution of magnetic drum MD and recorded in scanner detector 19 will be transmitted from scanner detector 19 to the logic circuitry of register space control circuit 16 via path 26. Scanner 18 was set to scan the sender associated with register space No. 1 by address circuit 17 when the write sync pulse occurred in slot 6 of register space No. 40, and the condition of the subscriber's loop to this sender was recorded in scanner detector 19 upon the occurrence of the advance pulse in slot 8 of register space No. 40. This recorded loop condition is then applied from scanner detector 19 via path 26 to the logic circuitry of register space control circuit 16 when slot 9 of register space No. 40 is under the main magnetic heads. If this scan indicates that the subscriber's loop to the sender is closed, register space control circuit 16 will cause a 1 to be written in the S3 cell in slot 9 track 6 of register space No. 40. If the loop is open on this scan, register space control circuit 16 will cause a 0 to be written in the S3 cell in track 6 slot 9 of register space No. 40. During the occurrence of the read sync pulse while slot 9 of the register space No. 40 is under the main read-write heads, auxiliary head HD6A will read the information recorded in the S0 cell in slot 12 track 6 of register space No. 1.

As indicated above, this information gives an indication of the condition of the subscriber's loop one-quarter revolution earlier. If a dial pulse has ended in the first quarter revolution, a 0 will be written in the S0 cell in slot 12 track 6 of register space No. 1, and the output of scanner detector 19 will indicate that the subscriber's loop is now closed. If these conditions are present an end of pulse flip-flop in register space control circuit 16 will be set. In the event that no dial pulse ended in the first quarter revolution of magnetic drum MD, the end of pulse flip-flop in register space control circuit 16 will remain normal. One slot later, that is, when slot 10 of register space No. 40 is under the main magnetic heads, if the end of pulse flip-flop in register space control circuit 16 is set to indicate a completion of a dial pulse in the first quarter revolution of magnetic drum MD, register space control circuit 16 will cause a 1 to be written in the EP3 cell in slot 10 track 6 of register space No. 40. If a dial pulse did not end during the first quarter revolution of magnetic drum MD, register space control circuit 16 will cause a 0 to be written in the EP3 cell of slot 10 track 6 of register space No. 40. Now that the information concerning the completion or not of a dial pulse during the first quarter revolution of magnetic drum MD has been taken from the end of pulse flip-flop in register space control circuit 16 and recorded in the EP3 cell in slot 10 track 6 of register space No. 40, the end of pulse flip-flop may be reset to normal and this occurs when slot 11 of register space No. 40 passes under the main magnetic heads.

Magnetic drum MD now makes the second quarter revolution and the sender associated with register space No. 1 is scanned a second time. The information from this scan is made available to the logic circuitry in register space control circuit 16 when slot 6 of register space No. 79 is under the main magnetic heads. At this time slot 9 of register space No. 40 is under auxiliary head HD6A. The condition of the loop at the completion of the second scan is recorded by register space control circuit 16 in the S2 cell in slot 6 track 6 of register space No. 79 in the manner similar to that described above. At the same time the condition of the subscriber's loop one-quarter revolution earlier, that is, at the completion of the first quarter revolution of magnetic drum MD, is read by auxiliary head HD6A from the S3 cell in slot 9 track 6 of register space No. 40. The condition of the subscriber's loop one-quarter revolution earlier is compared with the present condition of the subscriber's loop at the end of the second quarter revolution of magnetic drum MD, and if a dial pulse has ended the end of pulse flip-flop in register space control circuit 16 will be set. When the magnetic drum moves one additional slot until slot 7 of register space No. 79 is under the main magnetic heads, two conditions are available which may require the recording of a 1 in the EP2 cell in slot 7 track 6 of register space No. 79. If a 1 is read in the EP3 cell in slot 10 track 6 of register space No. 40 by auxiliary head HD6A indicating that a dial pulse ended during the first quarter revolution of magnetic drum MD, register space control circuit 16 will cause a 1 to be written in the EP2 cell in slot 7 track 6 of register space No. 79. In the event that a dial pulse did not end during the first quarter revolution of magnetic drum MD and a dial pulse ended in the second quarter revolution of magnetic drum MD as evidenced by end of pulse flip-flop being operated as described above, register space control circuit 16 will cause a 1 to be written in the EP2 cell in slot 7 track 6 of register space No. 40. Due to time considerations both of these conditions may not be present at the same time, therefore a pulse may have ended in the first quarter revolution or in the second quarter revolution but not both. When slot 8 of register space No. 79 passes under the main magnetic heads, the end of pulse flip-flop if operated will be restored to normal.

Magnetic drum MD now makes the third quarter revolution until slot 3 of register space No. 118 is under the main magnetic heads. At this time the condition of the subscriber's loop to the sender associated with register space No. 1 after the third scan thereof is made available to the logic circuitry in register space control circuit 16 from the scanner detector 19 via path 26. If this scan indicates that the subscriber's loop is closed, register space control circuit 16 will cause a 1 to be written in the S1 cell in slot 3 of register space No. 118. If the loop is open, a 0 will be written in the S1 cell in register space No. 118. At the same time a comparison is made between the present condition of the subscriber's loop and the condition of the subscriber's loop one-quarter revolution earlier as ready by auxiliary reading head HD6A from the S2 cell track 6 slot 6 of register space No. 79. If a dial pulse has ended during the third quarter revolution of magnetic drum MD, the end of pulse flip-flop in register space control circuit 16 will be operated in the manner described above. If a dial pulse did not end during the third quarter revolution of magnetic drum MD, the end of pulse flip-flop in register space control circuit 16 will remain normal. When slot 4 of register space No. 118 is under the main magnetic heads, a 1 will be written in the EP1 cell in track 6 slot 4 thereof, if a dial pulse ended during the first one-half revolution of magnetic drum MD. This is evidenced by a 1 being read in the EP2 cell in slot 7 track 6 of register space No. 79 by auxiliary reading head HD6A. If a pulse did not end in the first half revolution of magnetic drum MD and a pulse ended during the third quarter revolution of drum MD as evidenced by the setting of the end of pulse flip-flop in register space control circuit 16, a 1 will be written in the EP1 cell in slot 4 track 6 of register space No. 118. Here again, due to time considerations, both of these conditions may not occur at the same time. When slot 5 of register space No. 118 passes under the main magnetic heads, the end of pulse flip-flop in register space No. 118 will be restored to normal if operated.

Magnetic drum MD now makes the fourth quarter revolution and the sender associated with register space No. 1 is scanned the fourth time. As stated above this fourth scan takes place when the write sync pulse occurs in slot 11 of register space No. 156, and the condition of the subscriber's loop to this sender is recorded in scanner detector 19 when address circuit 17 applies an advance pulse in slot 13 of register space No. 156 on lead ADV to scanner detector 19. When slot 14 of register space No. 156 appears under the main magnetic heads, information from the output of scanner detector 19 indicating the condition of the subscriber's loop to the sender associated with register space No. 1 as determined on the fourth scan of the sender is made available to the logic circuitry in register space control circuit 16. The condition of the subscriber's loop as determined from this scan is recorded in the loop condition flip-flop in register space control circuit 16. This information will be used one slot later, that is, in slot 1 of register space No. 1. When slot 14 of register space No. 156 is under the main magnetic heads, auxiliary head HD6A will read the condition of the subscriber's loop one-quarter revolution earlier or, that is, at the end of three-quarters revolution of magnetic drum MD as recorded in the S1 cell of slot 3 track 6 of register space No. 118. No comparison between the present condition of the subscriber's loop and the condition of the loop one-quarter revolution earlier is made at this time. Instead the information from cell S1 in slot 3 track 6 of register space No. 118 causes the operation of the end of pulse flip-flop in register space control circuit 16. If the subscriber's loop was closed at the completion of the first three-quarters revolution of drum MD the end of pulse flip-flop in register space control circuit 16 will be operated, or if the subscriber's loop was open the end of pulse flip-flop will remain unoperated. When slot 1 of register space No. 1 appears under the main magnetic heads, auxiliary head HD6A is reading the information recorded in the EP1 cell in slot 4 track 6 of register space No. 118. As indicated above, a 1 will be read in this cell if a dial pulse ended in the first three-quarters revolution of magnetic drum MD, and a 0 will be read if no dial pulse ended during this same interval.

Magnetic drum MD has made one complete revolution, and the information obtained during this complete revolution is as follows:

(1) The present condition of the subscriber's loop to the sender associated with register space No. 1 as evidenced by the setting of the loop condition flip-flop in register space control circuit 16.

(2) The condition of the subscriber's loop one-quarter revolution earlier as evidenced by the setting of the end of pulse flip-flop in register space control circuit 16.

(3) The condition of the subscriber's loop one complete revolution earlier as evidenced by a 0 or 1 being recorded in the LR cell in track 6 slot 1 of register space No. 1; and (4) The absence or presence of a dial pulse in the first three-quarters of the previous revolution as evidenced by a 0 or 1 respectively appearing in the EP1 cell track 6 slot 4 of register space No. 118.

With the above information available when slot 1 of register space No. 1 passes under the main magnetic heads, the logic circuitry in register space control circuit 16 can determine whether dial pulses ended during the last revolution and, if so, whether one or two pulses ended.

With dial pulses quantitatively detectable as described above, register space control circuit 16 now arranges for the proper registration of these pulses. Referring to FIG. 3 the dial pulses of the first digit will be registered by register space control circuit 16 in the "first digit register" in slot 4 of the register space. Similarly, the pulses of the second digit will be registered in the "second digit register," etc. Register space control circuit 16 contains three control flip-flops, and at the completion of each revolution of magnetic drum MD if one dial pulse has been detected the first control flip-flop will be set. If two dial pulses have been detected the second control flip-flop will be set. With either of these flip-flops thus set the logic circuitry of register space control circuit 16 hunts for the appropriate digit register in which to record the pulses in the following manner:

It will be noted from FIG. 3 that track 5 of the digit register slots in each register space is a "digit dialed" indicator. A 0 appears in this track opposite each digit register until that digit has been completely dialed and recorded at which time a 1 is written there. Accordingly, the logic circuitry of register space control circuit 16 looks for the first of slots 4 through 14 containing a 0 in track 5. When this slot is located, the number of pulses detected on the previous revolution, as recorded by the setting of the appropriate control flip-flop in register space control circuit 16, is added in binary code to the count already appearing in the digit register. Thus, if a single pulse of the second digit is detected during one drum revolution, register space control circuit 16 will add a count of 1 in the second digit register cells in slot 5 of the register space. Similarly, if two pulses are detected on a previous drum revolution, register space control circuit 16 will add a count of 2 in binary code in the appropriate digit register cells in the register space. Finding the proper digit register and the recording therein of the number of pulses detected on a previous revolution of magnetic drum MD also serves to reset the operated control flip-flops to normal.

The addition in binary notation in the digit register cells of a register space proceeds in the following manner:

To add 1—looking from right to left, change all 1's to 0's until a 0 is encountered whereupon that 0 is changed to a 1 and all digits to its left remain unchanged. To add a count of 2—ignore the least significant digit and follow the same procedure as above on the digits to its left.

In the illustrative embodiment of the present invention described herein, it is assumed for purposes of illustration that the interdigital interval between successive trains of dial pulses is at least 88 milliseconds in duration. Therefore, as long as dial pulses characterized by closed loop intervals less than 88 milliseconds continue to be received, they will be recorded in the same digit register.

The manner in which the logic circuitry of register space control circuit 16 recognizes the interdigital intervals between successive trains of dial pulses will now be described. For the purpose of interdigital timing there must be a bit of information recorded in the EPL cell in slot 1 track 5 of the register space. This information differentiates between the first three-quarters and the last one-quarter of a drum revolution. Upon the completion of a drum revolution, if a dial pulse ended in the first three-quarters of the revolution, the logic circuitry in register space control circuit 16 will cause a 0 to be written in the EPL cell in slot 1 track 5 of the associated register space. On the other hand, if a pulse ended in the last one-quarter of the previous drum revolution, the logic circuitry in register space control circuit 16 will cause a 1 to be written in the EPL cell in slot 1 track 5 of the register space. Selective interdigital timing is performed by the logic circuits of register space control circuit 16 in the present invention. This is accomplished as follows:

If the last dial pulse of the digit ended in the first three-quarters of the preceding drum revolution and the subscriber's loop remains closed for one and three-quarters drum revolutions thereafter, an interdigital timeout will be completed. On the other hand, if the last dial pulse of a digit ended in the final quarter of the preceding revolution of magnetic drum MD, the subscriber's loop must remain closed thereafter for two complete revolutions before an interdigital timeout is completed. Register space control circuit 16 counts the number of revolutions of closed loop condition in the timer cells in slot 1, tracks 1, 2 and 3, in each register space in the same manner that dial pulses are counted in the digit register. When an interdigital timeout is detected the first and third control flip-flops in register space control circuit 16 will be operated. The logic circuitry in register space control circuit 16 then hunts for the first of slots 4 through 14 in the register space containing a 0 in track 5. When this is located (with the provision that there must be a number registered in the register opposite this 0 except for slot 4), a 1 is written in the digit dial cell in track 5 signifying that the digit recorded in the associated register has been completely dialed. The first and third control flip-flops are reset on this same slot in which the digit dial indication is recorded.

The logic circuitry in register space control circuit 16 governing interdigital timeouts following the last dial pulse of the first digit which is recorded in slot 4 of the register space is more selective. Provision is made in the logic circuitry of register space control circuit 16 to reject all 1's (preliminary pulses) as first digits dialed. This preliminary pulse rejection is necessary because a subscriber may jiggle the switch hook accidentally when lifting the handset and thereby get an incorrect number if this accidental break in the loop condition is recorded as a pulse. Accordingly, if only one dial pulse is detected and recorded in the first digit register in slot 4 of the register space and is then followed by an interdigital timeout, register space control circuit 16 will reject this 1 by simply erasing the 1 in track 4 rather than writing a 1 in track 5. This rejection of 1's as first digits dialed will continue indefinitely.

If at any time during which either open or closed loop conditions are being counted in the timer cells in slot 1, tracks 1, 2 and 3, of a register space, a change in the subscriber's loop condition to the sender associated with the particular register space is noted (either dial pulses, that is, open loop to closed loop, or a change from closed loop to open loop), the count in the timer cells is erased.

When a calling subscriber terminates or abandons a call, the successive revolutions during which the subscriber's loop remains open are counted by register space control circuit 16 in the timer cells in slot 1, tracks 1, 2 and 3 of the register space. When the count in the timer cells stands at 111 (seven revolutions), a signal is fed to the logic circuitry in register space control circuit 16 signifying a sender release. This gives an indication that all information recorded in the register space should be erased. Because the timer in slot 1 has recycled, 0's will appear in tracks 1, 2 and 3 in slot 1. Because the condition of the subscriber's loop is open a 0 will appear in the LR cell in track 6 of slot 1. Logic circuitry in register space control circuit 16 in response to this sender release indication will cause 0's to be written in the ON cell in track 4 and the EPL cell in track 5 of slot 1. The sender release indication causes the operation of the third control flip-flop in register space control circuit 16. With this flip-flop alone being operated, logic circuitry in register space control circuit 16 causes the erasure of the information recorded in the digit registers and digit dial cells in slots 4 through 14 as the drum rotates. When slot 14 of the register space passes under the main magnetic heads, logic circuitry in register space control circuit 16 will cause this third control flip-flop to be reset to normal. The register space is now erased of all information and all control flip-flops are normal. A new call may be handled by the register space whenever its associated sender requires it.

*Explanaion of Circuit Components and Conventions*

In the detailed description of the illustrative embodiment of the present invention given hereinafter, certain circuit components and logic circuits known in the art have been depicted in block schematic form in the drawings to simplify both the drawings and the description. Therefore, prior to a discussion of the nature and operation of the illustrative embodiment of the invention, the details and conventions of these circuit components and logic circuits will be described.

Both positive and negative signal logic is utilized in the illustrative embodiment of the present invention. With negative signal logic an active signal condition is represented by a potential more negative than —25 volts (for example, —30 volts) and a passive signal condition is represented by a potential less negative than —20 volts (for example, —15 volts). With positive signal logic the active and passive potential conditions are reversed. With the positive signal logic an active signal condition is represented by a potential more positive than —20 volts (for example, —15 volts) and a passive signal condition is represented by a potential more negative than —25 volts (for example, —30 volts).

Figure 5:
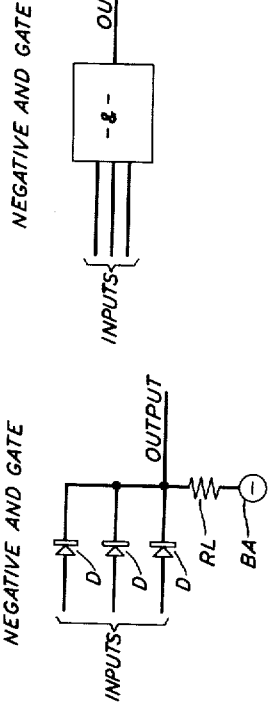
FIG. 5 illustrates in schematic form the circuit for a negative AND gate utilized in the present invention.

Two basic types of diode logic "building blocks" that are used extensively in the illustrative embodiment of the present invention are the AND gate and the OR gate which are known in the art. The negative AND gate responsive to negative signal logic is shown in FIG. 5 and consists of a load resistor RL fed from a negative battery BA (—50 volts in the illustrative embodiment) and a number of diodes D, one per input, arranged as shown. The negative logic signal potentials applied to the inputs are either less negative than —20 volts (for example, —15 volts) or more negative than —25 volts (for example, —30 volts). It will be observed that the most positive input potential determines the output potential so that all inputs must be negative to produce an output from the negative AND gate. Therefore, the AND gate output lead is active (at a potential more negative than —25 volts) only when all of the input leads are active (at potentials more negative than —25 volts). If one or more of the input leads are passive, that is, at a potential more positittive than —20 volts, the output lead is passive (more positive than —20 volts). The convention utilized in the drawings for the negative AND gate is shown in FIG. 5A. Each negative AND gate in the drawings is designated by the ampersand symbol &— preceded by a minus sign and followed by a numerical and/or letter designation identifying the negative AND gate. For example, a negative AND gate may be designated —&—W15B.

Figure 6A:
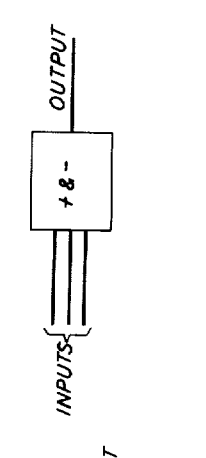
FIG. 6A shows the convention utilized in the drawings for the positive AND gate illustrated in FIG. 6.
Figure 6:
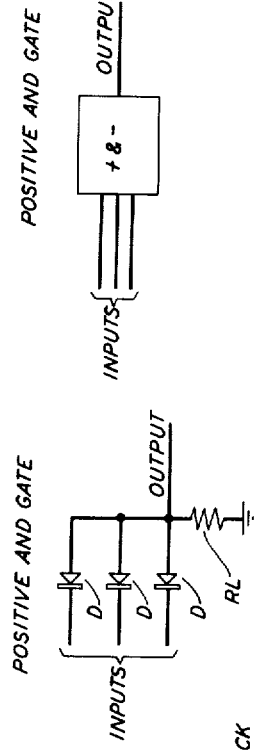
FIG. 6 illustrates in schematic form the circuit for a positive AND gate utilized in the present invention.

The positive AND gate responsive to positive signal logic is shown in FIG. 6 and consists of a load resistor RL fed from ground and a number of diodes D, one per input, arranged as shown. The positive logic signal potentials applied to the inputs are either more positive than —20 volts (for example, —19 volts) or more negative than —25 volts (for example, —30 volts). It will be observed that the most negative input potential determines the output potential so that all inputs must be positive to produce an output from the positive AND gate. Therefore, the AND gate output lead is active (at a potential more positive than —20 volts) only when all the input leads are active (at potentials more positive than —20 volts). If one or more input leads are passive (more negative than —25 volts), the output lead is passive (more negative than —25 volts). The convention utilized in the drawing for the positive AND gate is shown in FIG. 6A. Each positive AND gate in the drawings is designated by the ampersand symbol preceded by a plus sign and followed by a numerical and/or letter designation identifying the positive AND gate. For example, a positive AND gate may be designated +&—0C1D13.

The negative OR gate responsive to negative signal logic is shown in FIG. 7 and consists of a load resistor RL fed from ground and a number of diodes D, arranged as shown in FIG. 6, one diode for each input. The potentials applied to the inputs of the negative OR gates are the same as for the negative AND gates but, in the negative OR gate, the most negative input potential determines the output potential. As a result, an active signal (more negative than —25 volts) on a single input to a negative OR gate produces an active signal (more negative than —25 volts) on the output of the negative OR gate. Thus, the output lead of the negative OR gate will be active if one or more of the input leads is active. The convention utilized in the drawings for the negative OR gate is shown in FIG. 7A. Each of the negative OR gates shown in the drawings is designated by the word OR preceded by a minus sign and followed by a numerical and/or letter designation identifying the OR gate. For example, an OR gate may be designated —OR—L369.

The AND and OR gates described above may have any desired number of inputs and the diodes utilized in the gates may comprise such diodes as vacuum tubes, varistors, oxide rectifiers or germanium diodes.

Another type of gate utilized in the present invention is a transmission gate and is utilized to gate the input to a transmission pulse amplifier. The circuit is shown in detail in FIG. 8 with the convention for the transmission gate shown in FIG. 8A. In the transmission gate a relatively small input current resulting from a positive going voltage pulse applied through resistance R and diode D1 charges condenser C to a potential of approximately —15 volts in the illustrative embodiment of the present invention. Condenser C shown dotted in FIG. 8 is the coupling condenser in the transmission pulse amplifier to be described later. At some time later, a negative preread sync pulse applied over lead PRS to the transmission gate through diode D2 discharges condenser C producing a strong negative pulse at the output of the gate. If condenser C has not been charged, its potential will be approximately —30 volts and the preread sync pulse can neither charge nor discharge the condenser. The transmission gate integrates a relatively small current over a time interval of the order of seven microseconds and delivers a pulse of two microseconds duration and correspondingly higher current. The transmission gate also converts positive signal logic to negative signal logic, that is, it converts a positive going voltage pulse into a shorter negative going voltage pulse. Transmission gates in the drawings are designated TG followed by a numerical and/or letter designation identifying the transmission gate. For example, one such transmission gate is designated TG-S1.

A further circuit element utilized in the present invention is the conventional flip-flop or bistable circuit. The flip-flop may advantageously comprise a double stability, twin triode vacuum tube stage of the type disclosed in the co-pending application of C. E. Brooks, W. O. Fleckenstein, R. C. Lee and H. N. Seckler, Serial No. 554,280 filed December 20, 1955, now Patent 2,876,288 granted March 3, 1959, or it may advantageously comprise symmetrical bistable circuits utilizing junction transistors of the type disclosed in the copending application of F. M. Pearsall, Jr. and R. E. Staehler, Serial No. 502,678 filed on April 20, 1955, now Patent 2,877,357 granted March 10, 1959. Two types of flip-flops are utilized in the present invention. These are designated pulse memory flip-flops and shift register flip-flops. Both utilize the same circuit configuration but with different valued circuit components and elements. The circuit for the flip-flop utilized in the present invention is shown in FIG. 9 and is described in detail in the above-cited Pearsall-Staehler application. The pulse memory flip-flop is more sensitive than the shift register flip-flop while the shift register flip-flop is capable of supplying more output current and is somewhat more stable.

In the illustrative embodiment of the present invention the flip-flop is designed to be set and reset by negative logic active signal pulses and to provide positive logic active signal output indications. Referring to FIG. 9, when a negative logic active signal pulse (more negative than −25 volts) is applied to the "set" input lead of the flip-flop, conduction will be halted in transistor B and initiated in transistor A and the flip-flop is said to be set or operated. In the set condition, the flip-flop output lead designated "1" will provide a positive logic active signal (more positive than −20 volts) and the "0" output lead will provide a positive logic passive signal (more negative than −25 volts). The flip-flop is reset to normal when a negative logic active signal pulse (more negative than −25 volts) is applied to the "reset" input lead. This negative pulse halts conduction in transistor A and reinitiates conduction in transistor B. In the reset or normal condition, output lead "0" provides a positive logic active signal (more positive than −20 volts) and output lead "1" provides a positive logic passive signal less positive than −25 volts.

The convention utilized in the drawings for the pulse memory flip-flop is shown in FIG. 9A. The letters "S" and "R" within the block identify, respectively, the "set" and "reset" input leads of the circuit shown in FIG. 9 and the numerals "1" and "0" within the block identify, respectively, the "1" and "0" output leads shown in FIG. 9. The pulse memory flip-flop is used in the illustrative embodiment of the present invention with a transmission gate shown in FIG. 8 and described above and a pulse amplifier to be described hereinafter. Pulse memory flip-flops are designated in the drawings by PMFF− followed by a numerical or letter designation identifying the pulse memory flip-flop. For example, one such pulse memory flip-flop is designated PMFF−S.

The shift register flip-flop advantageously utilized in the present invention has the same circuit configuration as shown in FIG. 9 but with different valued circuit elements and components from that of the pulse memory flip-flop and is capable of supplying more output current and is somewhat more stable than the pulse memory flip-flop. The convention used in the drawings for the shift register flip-flop is shown in FIG. 9B and, as indicated, has two inputs designated "S" for "set" and "R" for "reset" and two outputs designated "1" and "0." The input and output leads correspond to the input and output leads shown in FIG. 9. A negative logic active signal applied to the S input, for example, will cause the right-hand stage of the flip-flop (stage B shown in FIG. 9) to cease conduction and to initiate conduction in the left-hand stage (stage A). The corresponding 1 output from the shift register flip-flop will thereby be at a positive logic active signal potential. Similarly, if a negative logic active signal potential is applied to the R input of the shift register flip-flop, stage A or the left-hand stage shown in FIG. 9 will cease conduction and conduction will be initiated in the right-hand stage. In this case, the corresponding 0 output lead will have a positive active signal potential applied thereto. The shift register flip-flop is used in the illustrative embodiment of the present invention with a direct current amplifier in each output lead for required current gain and each direct current amplifier is alternating current coupled through a shift register gate to the next succeeding stage of the shift register. The positive logic output signals from the shift register flip-flop are converted to negative logic signals in the shift register gate before being applied to the input of the next succeeding stage of the shift register. The shift register flip-flops, direct current amplifiers and shift register gates are described in detail in the above-cited Pearsall-Staehler application. Shift register flip-flops are designated in the drawings by SRFF− followed by a numerical or letter designation identifying the shift register flip-flop. For example, one such shift register flip-flop is designated SRFF−LA.

Figure 10:
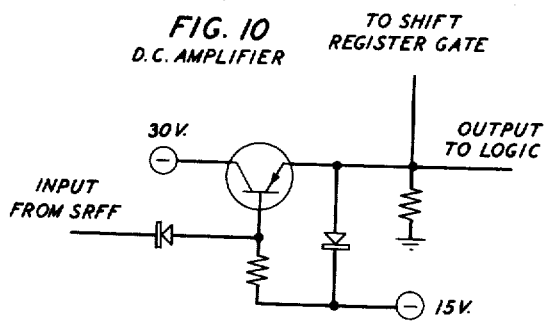
FIG. 10 illustrates in schematic form the circuit for a direct current amplifier utilized in the present invention.
Figure 10A:
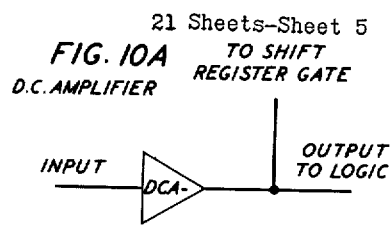
FIG. 10A shows the convention utilized in the drawings for the direct current amplifier illustrated in FIG. 10.

As indicated above, direct current amplifiers are utilized in the present invention to provide current gain at the output of the shift register flip-flops. The circuit for the direct current amplifier is shown in FIG. 10 and employs a transistor. This circuit may be considered an emitter follower which is the transistor equivalent of a cathode follower in conventional vacuum tube circuitry. It provides a current gain without phase inversion. The output voltage applied to the logic of the present invention is limited to −30 volts by the collector battery voltage. Any voltage applied to the base is duplicated at the emitter which is the output of the direct current amplifier. The convention utilized in the drawings to represent the direct current amplifier is shown in FIG. 10A. The direct current amplifiers are designated in the drawings by DCA− followed by a numerical or letter designation identifying the direct current amplifier. For example, one such direct current amplifier is designated DCA−LA1.

Figure 11:
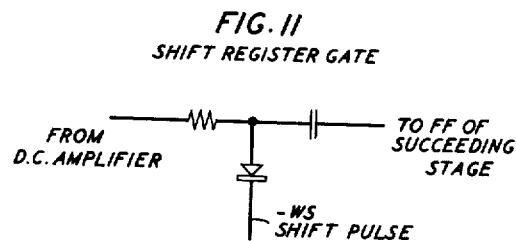
FIG. 11 illustrates in schematic form the circuit for a shift register gate utilized in the present invention with the shift register flip-flop illustrated in FIG. 9.
Figure 11A:
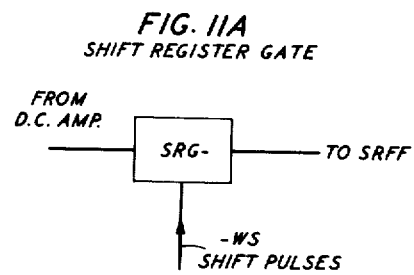
FIG. 11A shows the convention utilized in the drawings for the shift register gate illustrated in FIG. 11.

As indicated above, direct current amplifiers in the outputs of the shift register flip-flops are alternating current coupled to the succeeding shift register flip-flop stage through an alternating current coupled shift register gate. The circuit for the shift register gate is shown in FIG. 11. Shift register gates are utilized to shift the binary information read from a track on a magnetic drum from stage to stage in the shift register gate. If the direct current amplifier associated with any gate is in the on or conducting condition, a negative pulse is applied to the succeeding shift register flip-flop stage when a minus write sync shift pulse is applied over the −WS lead to the shift register gate. The shift register gate like the transmission gate described above and shown in FIG. 8, converts positive signal logic to negative signal logic. The operation of the shift register flip-flop, direct current amplifier and shift register gate is described in detail in the above-cited Pearsall-Staehler application. The convention utilized in the drawings for the shift register gate is shown in FIG. 11A. The shift register gate is designated in the drawings by SRG− followed by a numerical or letter designation identifying the shift register gate. For example, one such shift register gate is designated SRG−LD1.

Figure 12:
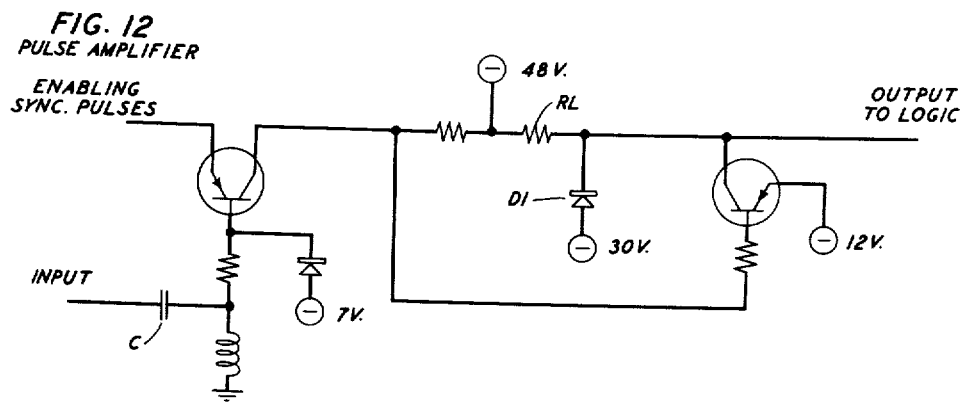
FIG. 12 illustrates in schematic form the circuit for a pulse amplifier and a transmission pulse amplifier utilized in the present invention.
Figure 12A:
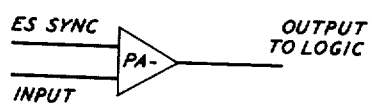
FIG. 12A shows the convention utilized in the drawings for the pulse amplifier illustrated in FIG. 12.

Pulse amplifiers are utilized in the illustrative embodiment of the present invention to regenerate the various signals required in the logic circuitry and to provide memory between a read interval and write interval of the slots on the magnetic drum. The circuit configuration for the pulse amplifier is shown in FIG. 12 and comprises two junction transistors. The pulse amplifier operates on a current of approximately 1 milliampere and is capable of delivering an output current of the order of 80 milliamperes. The pulse amplifier acts as a switch. In the passive state, the output voltage is of the order of −12 volts and the internal impedance is the collector to emitter resistance which is only a few ohms in the saturated state. In the active state, the output transistor is cut off and the output voltage is of the order of −30 volts. In this condition, the impedance is determined by the load resistance RL and the diode D1 which limit the negative swing to −30 volts. In operation, a negative enabling sync pulse of the order of 6 volts minimum is applied over the ES lead to the base of the input transistor. The emitter potential is at approximately −4 volts. Conduction from emitter to base turns on the transistor and because of the trigger characteristics of the point contact transistor, it remains in a conducting state until the emitter potential is lowered. This stage acts as a bistable pulse amplifier and drives the output transistor which is an alloy junction type. When the trigger stage turns on, the output stage turns off. The trigger stage remains on for the duration of the enabling sync pulse applied to the emitter of the input stage. At the end of the enabling sync pulse, the emitter of the input stage is lowered to −12 volts which back-biases the emitter because the base is held at −7 volts. This turns off the trigger stage which turns on the output transistor, returning the pulse amplifier to −12 volts. The output signals from the pulse amplifier feed diode logic of the present invention. It will be observed that a pulse amplifier may be switched to its on condition during a preread interval or a read interval and it will remain on until the termination of the enabling sync pulse. Thus, the pulse amplifiers are utilized in the illustrative embodiment of the present invention as a short term (slot interval) memory element. A detailed description and discussion of the pulse amplifier advantageously utilized in the present invention is given in the copending application of F. E. Blount, Serial No. 580,630 filed April 25, 1956, now Patent No. 2,985,769 granted May 23, 1961. Two types of pulse amplifiers are utilized in the illustrative embodiment of the present invention and they differ only in the size or value of the input coupling condenser C shown in FIG. 12. The convention for the normal pulse amplifier designated PA is shown in FIG. 12A and is utilized at all locations in the illustrative embodiment of the present invention where the output signal can supply the necessary 1.1 milliampere current without the use of a transmission gate. The normal pulse amplifiers as shown in FIG. 12A are designated PA− followed by a numerical or letter designation identifying the pulse amplifier. For example, a pulse amplifier may be designated PA−R11.

Figure 12B:
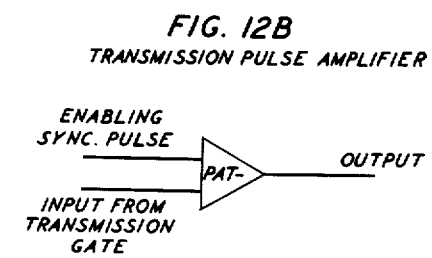
FIG. 12B shows the convention utilized in the drawings for the transmission pulse amplifier illustrated in FIG. 12.

The other type of pulse amplifier utilized in the present invention is the transmission type pulse amplifier, the convention for which is shown in FIG. 12B. The transmission type pulse amplifier, as indicated above, is gated by a transmission gate and the input capacitor C of the transmission type pulse amplifier is part of the transmission gate shown in FIG. 8 and described above. Transmission pulse amplifiers are designated PAT− followed by a numerical or letter designation identifying the transmission pulse amplifier. For example, one such transmission pulse amplifier is designated PAT−SL1.

Figure 13:
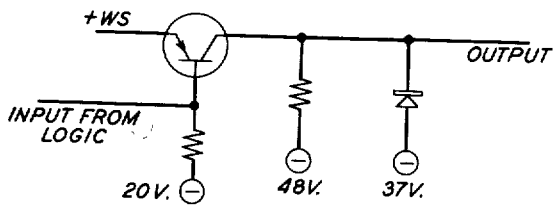
FIG. 13 illustrates in schematic form the circuit for a pulse shaping amplifier utilized in the present invention.
Figure 13A:
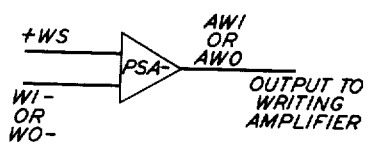
FIG. 13A shows the circuit convention utilized in the drawings for the pulse shaping amplifier illustrated in FIG. 13.

Another type of transistor pulse amplifier utilized in the present invention is the transistor pulse shaping amplifier disclosed in FIG. 13. This amplifier is utilized to obtain sharply defined rapid rise positive pulses required for operating or triggering the write amplifiers utilized to write information on the magnetic drum. The rise time of the pulse signals obtained from the logic is slowed by wiring capacities; therefore, the pulse shaping amplifier is designed to convert the output of the diode logic to the sharp positive pulses needed to trigger the amplifier. As shown in FIG. 13, the pulse shaping amplifier combines the rather long (7 microseconds) pulse from the logic with the positive write sync pulse +WS which occurs near the end of the logic signal in a transistor amplifier. The resulting output pulse to the writing amplifier is low impedance and has rapid rise time. The convention utilized in the drawings for the pulse shaping amplifier is shown in FIG. 13A. In the drawings the pulse shaping amplifier is designated PSA− followed by a numerical or letter designation identifying the pulse shaping amplifier. For example, one such pulse shaping amplifier is designated PSA−W01.

In the illustrative embodiment of the present invention, two kinds of information are stored on the magnetic drum, permanent or semipermanent and short term frequently altered information. Tracks containing the permanent information are tracks X, Y and Z as shown in FIG. 1. Track X is associated with the synchronizing circuit and tracks Y and Z are associated with the address circuit and contain the binary numbers identifying the register spaces and slots within each register space. The tracks on the magnetic drum which contain changeable information are tracks 1 through 6. The present invention utilizes the socalled "single pass" method of reading and writing information in tracks 1 through 6. This method is disclosed in Patent 2,700,148, granted to J. H. McGuigan and O. J. Murphy on January 18, 1955, in the copending application of C. E. Brooks, W. O. Fleckenstein, R. C. Lee and H. N. Seckler, Serial No. 554,280 filed December 20, 1955, now Patent 2,876,288 granted March 3, 1959, and in the copending application of W. A. Cornell, J. H. McGuigan and O. J. Murphy, Serial No. 307,108 filed August 29, 1952, now Patent 2,845,610 granted July 29, 1958. Reading and writing amplifiers which may advantageously be utilized in the present invention are disclosed in this patent and these copending applications.

Another reading amplifier which may advantageously be utilized in the present invention is disclosed in FIG. 14 of the drawings. This reading amplifier comprises a three stage linear amplifier, a cathode follower stage, a threshold stage and a phase inverter stage. As shown in FIG. 14, tubes A1, A2 and A3 form a linear feedback amplifier, tube A4 is a cathode follower, tube A5 is a threshold stage and tube A6 is an inverter stage. The peak-to-peak voltage appearing on the input of the reading amplifier resulting from the reading of a recorded 1 on the magnetic drum is approximately .05 volt to .1 volt, while the peak-to-peak voltage appearing on the input lead as a result of a recorded 0 on the magnetic drum is within the range of .01 to .03 volt. To provide the requisite output signals with input signals of this magnitude, the gain of the reading amplifier must be relatively great. However, means must be provided to prevent overloading of the amplifier as a result of the application of higher voltages (of the order of 90 volts peak to peak) when the reading amplifier is utilized in a track on the magnetic drum in which single pass reading and writing operations occur during the passage of a single cell under the associated magnetic head. This is accomplished in the reading amplifier disclosed in FIG. 14 through the use of a limiting circuit comprising resistance R1 and silicon alloy diodes V1 and V2. Due to the action of this limiting circuit, the signal voltage applied to the grid of the first stage of the linear amplifier, that is, tube A1, will be limited to a total excursion of approximately 0.4 of a volt and the parameters of the limiting circuit are selected so that this excursion will take place above a negative potential of about −0.2 of a volt. It is apparent that a reading voltage applied to the input lead will not be attenuated appreciably whereas a writing voltage will be substantially attenuated. The stages of the linear amplifier are direct current coupled through the use of silicon alloy diodes V3, V4 and V5 operating in their breakdown mode. Between the first and second stages, however, diode V3 is bypassed by condenser C1 to provide a capacity compensated resistor voltage divider of low time constant so as to eliminate or reduce the characteristic noise inherent in the diode V3. To provide a closely controlled negative direct current standing potential at the output of the linear amplifier stages in order to insure the proper operation of the threshold stage, a shunt direct current feedback path is provided from the cathode of the cathode follower stage A4 to the grid of stage A1 of the linear amplifier and this feedback path is utilized to provide the required bias on stage A1. The output of the linear amplifier stage A3 is fed through cathode follower stage A4 and through a limiting resistance R2 to the grid of the threshold stage A5. Limiting resistance R2 serves the dual purpose of limiting the positive drive on the grid of the threshold stage for strong signals and insuring that positive going feedback voltage swings are not restricted by "catching" action of the threshold tube grid.

In the quiescent or no signal condition, the grid of threshold stage A5 is biased at −9.5 volts with a cutoff potential for this stage being in the neighborhood of −5 volts. The output of the linear amplifier applied to the threshold stage A5 when a recorded 1 is read from the magnetic drum will be a signal of approximately 40 volts peak to peak and, therefore, the threshold stage will be raised above cutoff and will conduct plate current. As shown in the drawing, the plate current for threshold stage A5 which furnishes the "1" signal is supplied through an external plate feed resistance RP–1 from +130 volts. Two diodes in series, V1–1 and V1–2, are connected to the plate resistance RP–1 and returned to a reference potential of +109 volts to prevent the potential of the amplified output from rising above +109 volts even when the tube is cut off. The output to the logic circuitry over lead R1–X is taken from a junction point of the two diodes and that circuitry is here represented by resistance RL–1 to ground. Diodes V1–1, V1–2 and VRS–1 shown in FIG. 15, with resistance RL–1, operate as an AND gate. It will be noted that the input of varistors VR–1 is connected to the 130–RS lead which is the read synchronizing pulse lead. The read sync pulses utilized to synchronize the reading operations of the reading amplifier comprise negative going pulses of about 40 volts magnitude from a reference potential of +130 volts. Therefore, when a recorded 1 is read by the reading amplifier, threshold stage A5 is raised above cutoff, plate current conducts and the voltage at the input of varistor V1—1 drops from the order of +109 volts to around +70 volts. When this drop coincides with the drop of potential of the read sync pulse applied to the input of diode VRS–1 which, as indicated above, is from +130 volts to +90 volts, a negative going output signal pulse will be applied to the read 1 lead, R1–X.

Stage A6 of the reading amplifier is an inverted stage which provides a socalled "prime" or complementary output of the output provided from stage A5. The plate feed arrangements for this stage are similar to those described for stage A5 except that the grid of stage A6 is positively biased by means of a series of resistances RD–1, RD–2, RD–3 and RD–4 shown in FIG. 14 so that stage A6 is conducting current. Diodes V0–1, V0–2 and VRS–0 with resistance RL–0 operate as an AND gate. The standing potential on the input of diode V0–1 is adjusted so as to be at substantially the same direct current value as the peak of the negative going signal potential at the plate of stage A5, that is, about +70 volts. The plate of stage A5 is coupled by way of varistor V6 poled as shown in the drawing to a 100-volt point on the string of resistances RD–1 through RD–4 which supplied grid current to stage A6. Therefore, the first nine volts of negative swing at the plate of stage A5 from +109 volts to +100 volts is ineffective in altering the potential on the grid of stage A6. After this threshold (which is independent of and should not be confused with the grid bias threshold of stage A5) has been passed, further negative plate excursion of stage A5 then brings diode V6 into its low impedance condition and the next five volts negative swing of the plate of stage A5 will carry the grid of stage A6 to cutoff because condenser C2 shunting the resistances RD–2 and RD–3 insures that the full voltage swing at diode V6 is communicated to the grid of stage A6. When stage A6 is cut off, the potential at its plate then rises until it is caught at +109 volts through the action of diodes V0–1 and V0–2. It will therefore be observed that when a recorded 1 is read, the input potential of diode V0–1 is raised from 70 volts to +109 volts and when the negative going read sync pulse is applied to diode VRS–0, the output on the R0–X lead will be at a reference potential of approximately 109 volts. When a recorded 0 is read from the magnetic drum, the peak-to-peak amplitude of this signal applied through resistance R2 to the grid of threshold stage A5 is insufficient to raise stage A5 above cutoff and therefore the potential at the plate of stage A5 remains at +109 volts.

Under this condition, no negative voltage swing is communicated to the grid of stage A6 and stage A6 remains in a conducting state with its plate potential at approximately +70 volts. A negative going read sync pulse applied to the 130–RS lead will cause a negative going voltage pulse to be applied to the output lead R0–X but output lead R1–X will remain at +109 volts.

The convention utilized in the drawings for the reading amplifier is shown in FIG. 14A and each is designated RA– followed by a numerical or letter identifying designation. For example, one such reading amplifier is designated RA–1 identifying the reading amplifier in track 1 on the magnetic drum. In the illustrative embodiment of the persent invention, reading amplifiers of the type described above may be advantageously used in tracks Y and Z and in tracks 1 through 6 on the magnetic drum. This reading amplifier may also advantageously be utilized as the auxiliary reading amplifier in track 6 on the magnetic drum. The reading amplifier for track X, the timing track on the drum, is included in the synchronizing circuit.

A writing amplifier which may advantageously be utilized in the present invention is discolsed in FIG. 15. In reality, this amplifier consists of two pulse generating circuits, one for writing 1 and one for writing 0. Each consists of a blocking oscillator such as oscillator B0–1 and a trigger tube such as tube TR–1. When it is desired to write a 1, for example, a positive voltage pulse will be applied to the grid of trigger tube TR–1 from the output of a pulse shaping amplifier in the manner to be described hereinafter. Operation of trigger tube TR–1 actuates the normally quiescent blocking oscillator tube B0–1. The output on the anode of blocking oscillator tube B0–1 is applied through transformer T–1 over the lead to the magnetic recording head in the manner described in the above-cited Cornell et al. application and a 1 is recorded on the surface of the rotating magnetic drum. The positive voltage pulse applied to the write input leads AW–1 and AW–0 are controlled by the pulse shaping amplifier as indicated hereinbefore. The convention utilized in the drawings for the writing amplifier is shown in FIG. 15A. Each is designated WA– followed by a numeral identifying the track on the magnetic drum with which it is associated.

Figure 16:
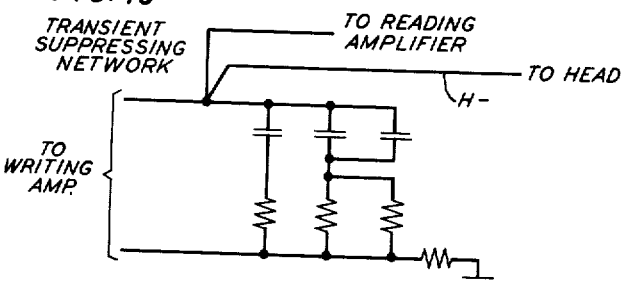
FIG. 16 illustrates in schematic form the transient suppressing network utilized in the present invention as a termination for a writing amplifier, a reading amplifier, and a magnetic head.
Figure 16A:
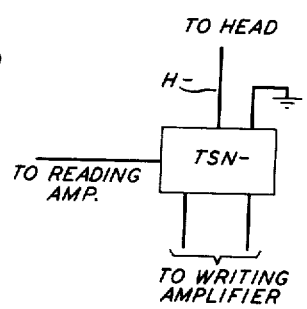
FIG. 16A shows the convention utilized in the drawings for the transient suppressing network of FIG. 16.

In tracks 1 through 6 on the magnetic drum where combined reading and writing in a single pass is utilized, the reading and writing amplifiers are coupled to the magnetic head on the drum through a transient suppressing network. This network is shown in detail in FIG. 16 and the convention for the network is shown in FIG. 16A. The networks are designated TSN– followed by a numerical designation identifying the network. The network damps the trailing edge of the write pulse from the output of the writing amplifier so that any tendency to ring is damped out before the next cell is reached and thus prevents malfunctioning of the reading amplifier. Another type of transient suppressing network which may advantageously be utilized to couple the reading and writing amplifiers to a magnetic head is disclosed in the copending application of O. J. Murphy, Serial No. 383,778 filed on October 2, 1953, now Patent 2,886,800 granted May 12, 1959.

It is to be understood that the present invention is not to be limited to the particular circuits or circuit components described above and employed in the illustrative embodiment to be described hereinafter. It is to be further understood that the present invention is not to be limited to the illustrative potential values shown in the drawings and described hereinbefore. The type of circuits employed and the circuit conventions utilized in the description of the illustrative embodiment of the present invention have been described above solely to facilitate an understanding of the invention as given in the drawings and description which follows.

Detailed Description

Referring now to the drawings, the operation of one illustrative embodiment of the dial pulse detecting, counting and registering circuits of the present invention will be described in detail with reference to FIGS. 19 through 31 of the drawings when arranged as shown in FIG. 18 of the drawings. The illustrative embodiment of the present invention shown in the drawings is adapted to be associated with 156 senders of a common control telephone switching system. As indicated hereinbefore, however, it is to be understood that the present invention is not limited to use as an auxiliary dial pulse detecting, counting and registering facility for association with senders in a common control telephone switching system but may be utilized as initial signal pulse detecting, counting and registering circuitry in a magnetic drum telephone switching system, in a computor or in a data storage system. It is to be further understood that this number of senders, i.e., 156, is illustrative only as the present invention may be adapted to cooperate with a greater or lesser number as required.

In a manner well known in the art, the senders in the common control telephone switching system with which the illustrative embodiment of the present invention are associated will be called in on every call to return dial tone to a calling subscriber and to receive the dial pulses over a subscriber's loop. Therefore, to observe, count and register the dial pulses dialed by a calling subscriber, it is necessary to observe every sender on every call and to record this information on the magnetic drum. The circuits of the present invention will observe the digits dialed by a calling subscriber into a sender by scanning the pulsing relay of the sender, that is, the condition of the pulsing relay of a sender is detected periodically on a time division basis. Because as indicated above, the illustrative embodiment of the present invention is arranged to cooperate with 156 senders, a scanner must be provided which is able to observe the 156 senders on a time division basis at a rate which is fast enough to insure that no dial pulse information is lost. The scanner and the magnetic drum used for storing the essential information are synchronized so that the control circuits of the present invention will know at all times which sender is being observed.

The Scanner

Various types of scanners may advantageously be used in the present invention. For example, a pentode gate multifrequency electronic scanner of the type disclosed in the copending application of W. Ulrich, Serial No. 391,900 filed November 13, 1953, now Patent No. 2,858,524 granted October 28, 1958, may be utilized to scan the pulsing relays of the 156 senders. Another scanner which may advantageously be utilized with the present invention is the direct current diode gate scanner of the type disclosed in the copending application of C. E. Brooks, W. O. Fleckenstein, R. C. Lee and H. N. Seckler, Serial No. 554,280 filed December 20, 1955, now Patent No. 2,876,288 granted March 3, 1959. Still another type of scanner which may advantageously be utilized in the present invention is a carrier frequency diode gate scanner disclosed in FIG. 19 of the drawings.

Referring to FIG. 19 of the drawings, the carrier frequency diode gate scanner will now be described in detail. This scanner comprises a coordinate selector having 12 horizontal row leads designated RW-1 through RW-12 and 13 vertical column leads designated CL-1 through CL-13, an oscillator OSC for generating a single frequency signal which may be, for example, of the order of 180 kilocycles per second, a scanner detector shown within the dotted rectangle 2001 in FIG. 20 for detecting the presence of the oscillator signal on the output lead OPL of the coordinate selector, 12 row gates designated RG-1 through RG-12 connected to the output of scanner row amplifiers designated SRA-1 through SRA-12, respectively, 13 column gates designated CG-1 through CG-13 connected, respectively, to the output of scanner column amplifiers designated SCA-1 through SCA-13. The scanner row amplifiers SRA-1 through SRA-12 are connected, respectively, to scanner row input leads SR-1 through SR-12 which extend via cable 1 to the address circuit. Similarly, scanner column amplifiers SCA-1 through SCA-13 connect to scanner column input leads SC-1 through SC-13, respectively, which extend via cable 2 to the address circuit. At the junction of each of the coordinate selector row leads RW-1 through RW-12 and column leads CL-1 through CL-13 is a gate designated, respectively, SCG-1 through SCG-156. The SCG- gates are connected, respectively, through filter networks FIL-1 through FIL-156 to the scanner input leads SCN-1 through SCN-156.

As shown in FIG. 1, each SCN- scanner input lead connects to a dial pulse repeating relay in a sender to be scanner and it will be observed that the SCN- leads will be at a potential of −48 volts when the associated dial pulse repeating relay is normal or unoperated indicating that the subscriber's loop is open and at ground potential when the associated dial pulse repeating relay is operated indicating that the subscriber's loop is closed. Filter networks FIL-1 through FIL-156 of which the circuit for filter network FIL-1 is shown in detail in FIG. 19, serve to filter out noise which may be present on the SCN- scanner input leads.

Row gates RG-1 through RG-12 respond to positive logic active signal conditions on the scanner row input leads SR-1 through SR-12 from the address circuit to switch in rapid succession the output of oscillator OSC applied to lead OSCIN to the coordinate selector horizontal row leads RW-1 through RW-12. The action of gates SCG- is to let the signal from oscillator OSC applied to a horizontal row lead pass to a vertical column lead if the associated scanner input lead SCN- is at a potential of −48 volts (dial pulse repeating relay unoperated) and to severely attenuate the signal if the associated scanner input lead SCN- is at ground potential (dial pulse repeating relay operated). Column gates CG-1 through CG-13 respond to positive logic active signal conditions on scanner column input leads SC-1 through SC-13 from the address circuit to switch in rapid succession the column leads CL-1 through CL-13 to the coordinate selector output lead OPL to the scanner detector 2001 shown in FIG. 20.

Only one of the row gates RG-1 through RG-12 will be operated at any instant and only one of the column gates CG-1 through CG-13 will be operated at any instant. Therefore, the SCG- gate at the intersection of the row lead RW- and column lead CL- connected, respectively, to an actuated row gate RG- and column gate CG- will pass the oscillator output signal on lead OSCIN to the output lead OPL or not, depending upon the condition of the dial pulse repeating relay in the sender associated therewith.

The circuit for scanner row amplifier SRA-1 is shown in detail in FIG. 19 and it will be observed that this amplifier is an emitter follower which provides current gain without phase inversion. The remaining scanner row amplifiers designated SRA-2 through SRA-12 and the scanner column amplifiers designated SCA-1 through SCA-13 are identical. As indicated hereinbefore, the positive logic active signal conditions on the scanner row input leads SR-1 through SR-12 and scanner column input leads SC-1 through SC-13 are represented by a potential less negative than −20 volts (for example, −15 volts) and a positive logic passive signal condition is represented by a potential more negative than −25 volts (for example, −30 volts). The output of each of the scanner row amplifiers SRA- is applied to a respective row gate RG- in the coordinate selector. Similarly, the output of each of the scanner column amplifiers SCA– is applied to a respective column gate CG– in the coordinate selector. As shown in FIG. 19, the output of scanner row amplifier SRA–1 is applied to row gate RG–1 and the output of scanner column amplifier SCA–1 is applied to column gate CG–1. Similarly, the outputs of scanner row amplifiers SRA–2 through SRA–12 are applied, respectively, to row gates RG–2 through RG–12 and the outputs of scanner column amplifiers SCA–2 through SCA–13 are applied to column gates CG–2 through CG–13, respectively. Row gates RG–1 through RG–12 are the gates which are controlled by the SR– scanner row input leads to connect the output of oscillator OSC on lead OSCIN to one of the 12 row leads RW–1 through RW–12 of the coordinate selector. Column gates CG–1 through CG–13 are the gates controlled by the SC– scanner column input leads to connect the oscillator signal on one of the 13 column leads CL–1 through CL–13 to the output lead OPL through condenser COD to the scanner detector 2001 shown in FIG. 20.

One row gate designated RG–1 is shown in detail in FIG. 19 and comprises resistances RRG–1 and RRG–2 with diode DRG. The other row gates RG–2 through RG–12 are identical. As shown in FIG. 19, the output of scanner row amplifier SRA–1 is applied to resistance RRG–1 in the row gate RG–1. This resistance is in turn connected through resistance RRG–2 to a —10 volt potential source. In row gate RG–1, diode DRG is connected between the common terminal of resistances RRG–1 and RRG–2 and lead OSCIN from the output of oscillator OSC. Each of the row gates RG–2 through RG–12 are similarly connected. Resistance ROSC connected between lead OSCIN and a —20 volt potential source provides a common biasing means for maintaining a bias of the order of —15 volts on the left-hand terminal of the diode DRG– in each of the row gates RG–. In operation, all of the scanner row input leads except one will be passive. For example, assume that scanner row input lead SR–1 is active (at —15 volts) and the other scanner input row leads SR–2 through SR–12 are passive (at —30 volts). The output potential from scanner row amplifier SRA–1 applied to row gate RG–1 will therefore be at —15 volts. This will cause the potential at the junction of resistances RRG–1 and RRG–2 in row gate RG–1 to be of the order of —12½ volts. As indicated above, the potential at the left-hand terminal of diodes DRG– in each of the row gates RG– is approximately —15 volts and therefore DRG– in row gate RG–1 will be forward biased and row gate RG–1 will be actuated to pass the single frequency signal present on lead OSCIN to row lead RW–1 in the coordinate selector. Because, as assumed above, scanner row input leads SR–2 through SR–12 are passive, the output potenials from scanner row amplifiers SRA–2 through SRA–12 are at approximately —25 volts. Therefore, the right-hand terminal of diode DRG in each of the row gates RG–2 through RG–12 will be at a potential of approximately —17.5 volts. This potential will back bias the DRG diodes therein and prevent the single frequency signal present on lead OSCIN from being applied to row leads RW–2 through RW–12 of the coordinate selector.

Assume now that scan lead SCN–1 which is connected through filter network FIL–1 to gate SCG–1 at the intersection of coordinate row lead RW–1 and column lead CL–1 is at a ground potential, indicating that the dial pulse repeating relay in the associated sender is operated. Gate SCG–1 is shown in detail in FIG. 19. The remaining gates SCG–2 through SCG–156 are identical. Each of these gates comprises condensers CSCG–1 and CSCG–2 with a diode DSCG connected to a —32 volt potential source. It will be observed that diode DSCG in gate SCG–1 will be at a low impedance when its associated scan lead SCN–1 is connected to a ground potential and at a high impedance when lead SCN–1 is connected to a —48 volt potential. Therefore, gate SCG–1 operates either to shunt the single frequency signal applied to row lead RW–1 through diode DSCG when the diode is in its low impedance state or to pass the single frequency signal through condensers CSCG–1 and CSCG–2 to column lead CL–1 when diode DSCG is in its high impedance condition.

Each of the column gates CG–1 through CG–13 shown in FIG. 19 contains a resistance RCG–2, a resistance RCG–1 and a diode DCG connected as shown in column gate CG–1. Resistance RDET connected between output lead OPL and a —20 volt potential source provides a common biasing means for maintaining a bias of the order of —15 volts on the right-hand terminal of the diode DCG in each of the column gates CG–. Column gates CG– operate in the same manner as row gates RG– described above. For example, when an active signal condition (—15 volts) is present on scanner column input lead SC–1, the output potential from scanner column amplifier SCA–1 will be of the order of —15 volts and the junction of resistances RCG–1 and RCG–2 and the left-hand terminal of diode DCG in column gate CG–1 will be at a potential of approximately —12.5 volts. Diode DCG in column gate CG–1 is therefore forward biased and will pass the single frequency signal on column lead CL–1 to output lead OPL. Because the DCG diodes in the remaining column gates CG–2 through CG–13 are back biased by a potential of approximately —17.5 volts applied to the left-hand terminals of their respective diodes DCG, these gates will not be actuated to pass the single frequency signal to the output lead OPL.

It will be observed that only one of the row leads RW–1 through RW–12 and one of the column leads CL–1 through CL–13 are at a low impedance at any given time so that only one row lead RW– is receiving the single frequency signal from oscillator OSC and only one column lead CL– is connected to scanner detector 2001. The sender connected to the gate SCG– at the intersection of the low impedance row lead RW– and column lead CL– will therefore be scanned. If the scan lead connected to this sender is at a potential of —48 volts indicating that the dial pulse repeating relay in the sender is normal, no signal will be applied to output lead OPL to the scanner detector. However, if the scan lead is at ground potential indicating that the dial pulse repeating relay in the associated sender is operated, the gate SCG– will pass the single frequency signal present on the low impedance row lead to the low impedance column lead and to output lead OPL and scanner detector 2001.

Referring to FIG. 20, the scanner detector 2001 is shown in block diagram form within the dotted rectangle. The output from the coordinate selector on lead OPL is coupled through condenser COD to a signal amplifier designated AMP in the scanner detector. Amplifier AMP may advantageously be a two stage alternating current amplifier with the gain stabilized to a certain extent by leaving the cathode resistors unbypassed. The time constants are kept short in order to allow the switching transients to decay quickly. The amplified signal from amplifier AMP constitutes one of the inputs to a pentode gate designated PG within the dotted rectangle. Pentode gate PG is normally biased beyond cutoff on both its control and suppressor grids. The other input to pentode gate PG is an unblocking pulse obtained from monostable multivibrator MV. When a coincidence of the amplified signal from amplifier AMP and an unblocking pulse from monostable multivibrator MV occurs, pentode gate PG will be actuated to apply a negative signal pulse to the "set" input of pulse memory flip-flop PMFF–SCN. Monostable multivibrator MV is triggered to generate the unblocking pulse required for pentode gate PG by negative pulses applied over the ADV lead from the address circuit. As will be described in detail hereinafter, these negative pulses occur when slots 2, 5, 8 and 13 of each register space on the magnetic drum are read. The same negative pulses applied over the ADV lead to trigger monostable multivibrator MV are connected to the "reset" input of pulse memory flip-flop PMFF–SCN to reset this flip-flop to normal if it is set. The circuit constants of monostable multivibrator MV are selected so as to provide a sufficient delay in the unblocking pulse applied to pentode gate PG to prevent operation of pulse memory flip-flop PMFF–SCN on switching transients present on lead OPL. In this manner, the output of the scanner on lead OPL is sampled during the occurrence of the unblocking pulse in slots 2, 5, 8 and 13 of each register space and the condition of the scanned sender during each of these slots is recorded in pulse memory flip-flop PMFF–SCN. For example, if a signal is present on OPL lead during the unblocking pulse in slot 2, pulse memory flip-flop PMFF–SCN will be set and will remain set until the next advance pulse on the ADV lead occurring in slot 5 of the register space. This advance pulse in slot 5 will reset pulse memory flip-flop PMFF–SCN.

The output leads from the 1 and 0 outputs of pulse memory flip-flop PMFF–SCN are connected along with the preread sync lead PRS to respective transmission gates TG–SCN1 and TG–SCN0. The output leads from these transmission gates are connected to the input of respective transmission pulse amplifiers PAT–SCN1 and PAT–SCN0. The output leads from the transmission pulse amplifiers PAT–SCN1 and PAT–SCN0 are in turn connected to inputs of respective AND gates —&—SCN0 along with the read sync lead 130–RS. The outputs of these AND gates are applied to respective pulse amplifiers PA–SCN1 and PA–SCN0. The output of these pulse amplifiers is connected to the R1S and the R0S leads which feed the logic circuitry in the sender space control circuit.

A negative logic active signal on the R1S lead gives an indication that the dial pulse repeating relay in a scanned sender is operated and that the associated subscriber's loop is closed. A negative logic active signal on the R0S lead gives an indication that the dial pulse repeating relay in a scanned sender is normal and that the associated subscriber's loop is open.

As indicated hereinbefore, the presence of the single frequency signal on the OPL lead from the coordinate selector indicates that the dial pulse repeating relay in the scanned sender is operated. This signal is applied through coupling condenser COD to signal amplifier AMP. The amplified signal when applied in coincidence with an unblocking pulse from monostable multivibrator MV causes the operation of pentode gate PG. The operation of pentode gate PG in turn operates pulse memory flip-flop PMFF–SCN. A positive logic active signal will be applied from the 1 output lead of pulse memory flip-flop PMFF–SCN to transmission gate TG–SCN1. When the negative preread sync pulse is applied to the transmission gate TG–SCN1, a negative pulse will be applied to transmission pulse amplifier PAT–SCN1. The output of transmission pulse amplifier PAT–SCN1 is applied to AND gate —&—SCN1 and when a negative sync pulse applied over the 130–RS sync lead occurs, a negative logic active signal pulse will be applied to pulse amplifier PA–SCN1 which in turn will apply a negative logic active signal condition to the R1S lead.

If the dial pulse repeating relay in the scanned sender is operated, no single frequency signal will be applied over the OPL lead. Therefore, pentode gate PG will not be actuated to set pulse memory flip-flop PMFF–SCN. However, the occurrence of a negative pulse on the ADV lead will cause the pulse memory flip-flop PMFF–SCN to be reset to its normal condition as described above. In this condition, a positive logic active signal will be applied from the 0 output of pulse memory flip-flop PMFF–SCN to transmission gate TG–SCN0. When a negative sync signal is applied over the preread sync lead PRS, transmission gate TG–SCN0 will be actuated and will apply a negative pulse to transmission pulse amplifier PAT–SCN0. The output of transmission pulse amplifier PAT–SCN0 is applied to AND gate —&—SCN0 and when a negative pulse occurs on the read sync lead 130–RS, a negative signal will be applied to pulse amplifier PA–SCN0 which in turn will apply a negative logic active signal condition on the R0S lead.

As indicated hereinbefore and as will be described in detail hereinafter, the address circuit in the illustrative embodiment of the present invention sets the scanner to scan four different senders during the passage under the magnetic heads of each register space on the magnetic drum. The scanner is set in the manner described hereinbefore by the application of a positive logic active signal condition to one of the 13 scanner column input leads SC–1 through SC–13 and to one of the 12 scanner row input leads SR–1 through SR–12. As will be described hereinafter and as indicated by reference to FIG. 3, the scanner code applied to the scanner column input leads SC–1 through SC–13 is read in slot 9 of each register space and the scanner code applied to the scanner row input leads SR–1 through SR–12 (a combination of the scanner 3's code and scanner quadrant code) is read in slots 3, 6, 10, 11 and 14 of each register space. As will be described, the changes in the respective scanner row input code and scanner column input code are such that the coordinate selector of the scanner is set to scan a respective sender during the occurrence of the write sync pulse WS in each of slots 3, 6, 11 and 14 of each of the register spaces.

As indicated above, the scanner detector samples the output of the coordinate selector of the scanner during the unblocking pulse occurring in slots 2, 5, 8 and 13 of each of the register spaces and registers the condition of the respective scanned senders in pulse memory flip-flop PMFF–SCN. During each of these samplings, the condition of the sender to which the scanner was previously set is determined. For example, during the occurrence of the unblocking pulse in slot 2 of a register space, the condition of the sender to which the scanner was set during the occurrence of the write sync pulse in slot 14 of the preceding register space is registered in pulse memory flip-flop PMFF–SCN. Similarly, during the occurrence of the unblocking pulse in slot 5 of a register space, the condition of the sender to which the scanner was set during the occurrence of the write sync pulse in slot 3 of the register space is registered in pulse memory flip-flop PMFF–SCN. When pulse memory flip-flop PMFF–SCN is set or reset during any of slots 2, 5, 8 or 13 of a register space to register the condition of a scanned sender, it remains unchanged until the occurrence of the advance pulse ADV in the next one of slots 2, 5, 8 or 13. For example, when pulse memory flip-flop PMFF–SCN is set in slot 2, it remains unchanged until slot 5, when it is reset by the advance pulse ADV. Accordingly, the condition of a sender registered in pulse memory flip-flop PMFF–SCN may be determined in any of the slots intervening between the slot in which it was set and the slot in which the next advance pulse occurs. Therefore, during the occurrence of the read sync pulse on the 130–RS read sync lead in slots 3 and 4 following slot 2, in slots 6 and 7 following slot 5, in slots 9, 10, 11 and 12 following slot 8 and in slots 14 and 1 following slot 13 in each of the register spaces, the setting of pulse memory flip-flop PMFF–SCN may be read to determine the condition of the dial pulse repeating relay in each of the respective scanned senders. For example, during the reading of slot 2 of a register space, pulse memory flip-flop PMFF–SCN of the scanner detector is set in accordance with the output of the coordinate selector. The setting in pulse memory flip-flop PMFF–SCN at this time records the condition of the sender which the scanner was set to scan during the occurrence of the write sync pulse in slot 14 of the preceding register space. During the occurrence of the read sync pulse in slots 3 and 4, the setting of pulse memory flip-flop PMFF–SCN may be read and, as described above, an active signal condition will be applied to the R1S or R0S lead accordingly. The setting of pulse memory flip-flop PMFF–SCN remains unchanged until the occurrence of the advanced pulse in slot 5. Therefore, the setting of the scanner may be changed during the interval between slot 2 to slot 5 without affecting the output from the scanner. During the occurrence of the read sync pulse in slot 3, the scanner is set to scan a different sender. The condition of this sender will not be recorded in the pulse memory flip-flop PMFF–SCN of the scanner detector until the occurrence of the unblocking pulse in slot 5.

The sequence of operations during the passage of one complete register space under the magnetic heads is as follows. When slot 2 of a register space is under the magnetic heads, pulse memory flip-flop PMFF–SCN of the scanner detector is set in accordance with the output of the coordinate selector of the scanner to record the condition of a first sender to which the scanner was set during the occurrence of the write sync pulse in slot 14 of the preceding register space. During the occurrence of the read sync pulse in slot 3 of the register space, the setting of pulse memory flip-flop PMFF–SCN is read to determine the condition of the dial pulse repeating relay in the first sender and an active signal condition is applied to the R1S or R0S lead accordingly. During the occurrence of the write sync pulse in slot 3 of the register space, the scanner is set to scan the second sender. However, the condition of the dial pulse repeating relay in the second sender is not recorded in pulse memory flip-flop PMFF–SCN until the occurrence of the advance pulse in slot 5. Therefore, when slot 4 of the register space is read, the output applied to the R1S or R0S lead gives an indication of the condition of the dial pulse repeating relay of the first sender scanned. When slot 5 of the register space is under the magnetic heads, pulse memory flip-flop PMFF–SCN is reset to normal during the occurrence of the advance pulse ADV and during the occurrence of the unblocking pulse, pulse memory flip-flop PMFF–SCN is set in accordance with the condition of the dial pulse repeating relay in the second scanned sender. During the occurrence of the read sync pulse in slot 6 of the register space, the setting of pulse memory flip-flop PMFF–SCN is read to determine the condition of the dial pulse repeating relay in the second sender to which the scanner was set during the occurrence of the write sync pulse in slot 3 of the register space and an active signal condition is applied to the R1S or R0S lead accordingly. During the occurrence of the write sync pulse in slot 6 of the register space, the scanner is set to scan a third sender. The condition of this third sender, however, is not recorded in pulse memory flip-flop PMFF–SCN until the occurrence of the unblocking pulse in slot 8 of the register space and, therefore, during the occurrence of slot 7 of the register space, the active signal condition on the R1S and R0S leads represents the condition of the dial pulse repeating relay in the second scanned sender. When slot 8 of the register space is under the magnetic heads, the advance pulse on the ADV lead resets pulse memory flip-flop PMFF–SCN and during the occurrence of the unblocking pulse in slot 8, pulse memory flip-flop PMFF–SCN is set in accordance with the condition of the third sender scanned. During the occurrence of the read sync pulse in slots 9, 10, 11 and 12, the setting of pulse memory flip-flop PMFF–SCN is read and an active signal condition is applied to the respective R1S or R0S lead accordingly. Because the condition of the third sender scanned is recorded in pulse memory flip-flop PMFF–SCN, the scanner may be set to scan a fourth sender. Therefore, during the occurrence of the write sync pulse in slots 9, 10 and 11, the scanner is set to scan the fourth sender. During the occurrence of the advance pulse ADV in slot 13 of the register space, pulse memory flip-flop PMFF–SCN is restored and during the occurrence of the unblocking pulse in slot 13, the condition of the fourth sender scanned is recorded in pulse memory flip-flop PMFF–SCN. During the occurrence of the read sync pulse in slot 14, the setting of pulse memory flip-flop PMFF–SCN is read and an active signal condition is applied to the respective R1S or R0S lead accordingly. Because the condition of the fourth sender scanned is recorded in pulse memory flip-flop PMFF–SCN, the scanner may be set to scan a first sender for the next succeeding register space to pass under the magnetic heads. Therefore, during the occurrence of the write sync pulse in slot 14, the scanner is set to scan the first sender for the next register space. During the occurrence of the read sync pulse in slot 1 of the next register space, the condition of the fourth sender scanned during the preceding register space is still recorded in pulse memory flip-flop PMFF–SCN and an active signal condition will be applied to the R1S and R0S leads accordingly. When slot 2 of the next register space passes under the magnetic heads, the advance pulse restores pulse memory flip-flop PMFF–SCN and during the unblocking pulse, pulse memory flip-flop PMFF–SCN is set in accordance with the condition of the sender scanned during slot 14 of the preceding register space. The sequence of operations described above is repeated as each subsequent register space passes under the magnetic heads.

*The Magnetic Drum Unit*

The magnetic drum unit of the illustrative embodiment of the present invention is shown in FIGS. 20, 21 and 22 of the drawings. This unit comprises magnetic drum MD shown in FIG. 20 with associated magnetic heads, synchronizing circuit 2100 shown in block form in FIG. 21 and the reading amplifiers, writing amplifiers, pulse amplifiers and pulse shaping amplifiers shown in block diagram form in FIGS. 20, 21 and 22. The reading amplifiers and pulse amplifiers are required to provide properly timed, uniform, low impedance signals to the diode logic of the register space control circuit to be described hereinafter. The pulse shaping amplifiers are direct current amplifiers designed to convert the output of the diode logic of the register space control circuit into sharp positive pulses required to trigger the writing amplifiers.

Referring to FIG. 20, magnetic drum MD consists of a motor driven cylinder (a driving motor not being shown in the drawing) coated with a magnetic material. As indicated hereinbefore, small individual spots called "cells" on the surface of magnetic drum MD are magnetized in either of two directions. These two directions or conditions are termed (1) and (0) with (0) being normal. Initially, the entire drum is magnetized to saturation in the (0) direction and to record a bit of information on the drum, a cell is magnetized to saturation in the opposite direction by the application of a magnetic field. Each group of cells which pass under a single magnetic head as magnetic drum MD revolves is called a track and each group of cells along the drum which are simultaneously under the magnetic heads is called a slot. In the illustrative embodiment of the present invention, magnetic drum MD comprises nine tracks. These tracks are designated tracks X, Y, Z and tracks 1 through 6, respectively, as shown in FIGS. 1, 2 and 20. Magnetic marks permanently recorded in track X or placed in track X in the form of gear teeth, control the synchronizing circuit 2100 in the generation of the required synchronizing pulses for the illustrative embodiment of the present invention. Signals permanently recorded in tracks Y and Z of magnetic drum MD provide address information for the address circuit from which the individual slots on the magnetic drum and the individual register spaces on the magnetic drum are identified. Tracks 1 through 6 on magnetic drum MD are utilized to record the short-term frequently-altered information obtained from the register space control circuit of the present invention. As indicated hereinbefore, magnetic drum MD is divided into a plurality of register spaces. Each of these register spaces is associated with one of the 156 senders with which the illustrative embodiment of the present invention is utilized. The layout of a register space is shown in FIG. 3 of the drawings and its location on magnetic drum MD with respect to tracks X, Y and Z is shown in FIG. 2 of the drawings. As shown in FIGS. 2 and 3, each register space is an area on magnetic drum MD 6 tracks wide and 14 slots long.

Magnetic drum MD is divided into four groups of quadrants in the illustrative embodiment of the present invention. Each register space is associated with three "mate" register spaces located at quarter-revolution intervals of magnetic drum MD. The arrangement of a register space and its associated mate register spaces on magnetic drum MD is illustrated in FIG. 4 of the drawings. As shown in FIG. 4, register spaces Nos. 1, 40, 79 and 118 are mated. Each of these register spaces is in a different quadrant of magnetic drum MD. FIG. 4 also shows the relative position of the main read-write heads HD–X, HD–Y, HD–Z and HD–1 through HD–6 shown at the top of the drawing with respect to auxiliary head HD–6A located 90 degrees less three slots ahead of the main read-write heads on magnetic drum MD. It will be observed from FIG. 4 that when slot 1 of register space No. 1, for example, is passing under the main read-write heads, slot 4 of register space No. 118 is passing under the auxiliary head HD–6A. The purpose of dividing magnetic drum MD into quadrants, mating the register spaces in each of the quadrants and auxiliary head HD–6A will be described hereinafter.

Referring to FIG. 21, the amplifiers associated with magnetic head HD–Y in track Y on magnetic drum MD will be briefly described. These amplifiers are typical of the amplifiers utilized with magnetic head HD–Z in track Z, with auxiliary head HD–6A in track 6 and with heads HD–1 through HD–6 to read signals recorded in tracks 1 through 6 on magnetic drum MD. The 1 and 0 output signals read in track Y on magnetic drum MD by magnetic head HD–Y are transmitted over lead HY to reading amplifier RA–Y. The 0 and 1 outputs from reading amplifier RA–Y are connected to respective pulse amplifiers PA–RY0 and PA–RY1. The negative logic outputs of pulse amplifiers PA–RY0 and PA–RY1 are then applied over the R0–Y and R1–Y leads, respectively, to the diode logic circuitry in the address circuit. The reading amplifier and pulse amplifiers utilized with magnetic head HD–Z in track Z are indicated by the block labeled 2102 shown in FIG. 21 of the drawings. These circuits are identical to the circuits within dotted rectangle 2101 for track Y. Negative logic signals are applied over the R1–Z or R0–Z lead to the address circuit when a 1 or a 0, respectively, is read in track Z on magnetic drum MD. The amplifiers associated with auxiliary head HD–6A in track 6 are indicated by the block labeled 2002 shown in FIG. 20 and are identical to that described above and shown within the dotted rectangle 2101 for track Y. When a 1 is read in track 6 by auxiliary head HD–6A, a negative logic active signal condition is applied to lead R1–6A. Similarly, when a 0 is read in track 6 by auxiliary head HD–6A, a negative logic active signal condition is applied to lead R0–6A. The reading amplifiers RA– and pulse amplifiers PA– utilized with heads HD–1 through HD–6 in tracks 1 through 6, respectively, are also identical to the corresponding amplifiers described above in connection with track Y. Also, in each of tracks 1 through 6, a writing amplifier WA– is utilized to control the writing of the 1 and 0 signals in the respective tracks on the magnetic drum. As shown in FIG. 21, writing amplifier WA–1 is controlled by pulse shaping amplifiers PSA–W01 and PSA–W11 which are required to convert the negative logic active signal pulses applied over the W0–1 and W1–1 leads from the diode logic of the register space control circuit into sharp positive pulses required to trigger writing amplifier WA–1. Writing amplifier WA–1 and reading amplifier RA–1 are both terminated in transient suppressing network TSN–1 as shown in FIG. 21. Signals read from track 1 on magnetic drum MD and the signals to be recorded in track 1 of magnetic drum MD are applied to magnetic head HD1 over lead H1. The amplifiers and transient suppressing networks for tracks 2 through 6 are indicated in block form in FIG. 22 of the drawings. The amplifiers RA–, PA–, WA– and PSA– and the transient suppressing networks TSN– within the blocks 2201 through 2205 are identical to that shown within the dotted rectangle 2103 associated with track 1 on magnetic drum MD. When a 1 is read in any of tracks 1 through 6 on magnetic drum MD, the output from the drum unit to the diode logic circuitry in the register space control circuit will be a negative logic active signal condition on the correspondng R1– lead, for example, the R1–2 for track 2 or R1–5 for track 5. Similarly, when a 0 is read in any of the tracks 1 through 6 on magnetic drum MD, a negative logic active signal condition will be applied on the corresponding R0– lead to the diode logic circuitry, for example, the R0–1 lead for track 1 and the R0–6 for track 6. When it is desired to write a 1 in one of tracks 1 through 6 on magnetic drum MD, a negative logic active signal condition is applied to the W1– lead, for example, to write a 1 in track 4, an active signal will be applied to the W1–4 lead. Similarly, an active signal will be applied to the W0–5 lead if it is desired to write a 0 on track 5 on the magnetic drum.

In order to control a reading operation and a writing operation and the operation of transmission pulse amplifiers and regular pulse amplifiers in each slot on magnetic drum MD, synchronizing unit 2100 shown in block form in FIG. 21 produces the required synchronizing pulses. In order to control the repeated occurrences of these operations and functions in each successive slot on magnetic drum MD, a separate train of synchronizing pulses for each required function or operation is produced by synchronizing unit 2100. The relative phasing and polarity of the various trains of synchronizing pulses utilized in the illustrative embodiment of the present invention are illustrated in FIG. 17 of the drawings. It will be observed with reference to FIG. 17 that all of the operations, that is, reading, writing, preread, occur within the duration of the enabling sync pulse. Synchronizing unit 2100 is controlled by signals read from permanent cell marks recorded in track X on magnetic drum MD. These cell marks may be written electrically in track X or may be permanently inscribed in track X by gear hobbing techniques. The cell mark signals read from track X by magnetic head HDX are transmitted to synchronizing unit 2100 via lead HX. The required trains of synchronizing pulses may be produced by any of several techniques well known in the art. For example, a plurality of monopulsers may be utilized to produce the required trains of synchronizing pulses. This type of synchronizing unit is disclosed, for example, in the copending application of C. E. Brooks, W. O. Fleckenstein, R. C. Lee and H. N. Seckler, Serial No. 554,280 filed on December 20, 1955, now Patent No. 2,876,288 granted March 3, 1959. Another type of synchronizing unit which may advantageously be utilized in the present invention is disclosed in the copending application of O. J. Murphy, Serial No. 586,544 filed on May 22, 1956, now Patent No. 3,007,145, granted October 31, 1961. The various synchronizing pulses ES, PRS, –RS, 130–RS, +WS and –WS shown in FIG. 17 and required in the illustrative embodiment of the present invention are applied over correspondingly designated leads in cable 4 to the logic circuitry of the present invention.

Address Circuit

The address circuit of the illustrative embodiment of the present invention is shown in FIGS. 23 through 26 of the drawings. This circuit provides a continuous indication of the position of magnetic drum MD with respect to the magnetic heads and accomplishes this by generating coded signals corresponding to the particular slot and register space passing under the magnetic heads. The address circuit is controlled by signals permanently recorded in the Y and Z tracks of magnetic drum MD. The information recorded in the Y track defines the number of the slot within each register space passing under the magnetic heads. The information recorded in the Z track defines the number of the register space passing under the magnetic heads.

Figure 23:
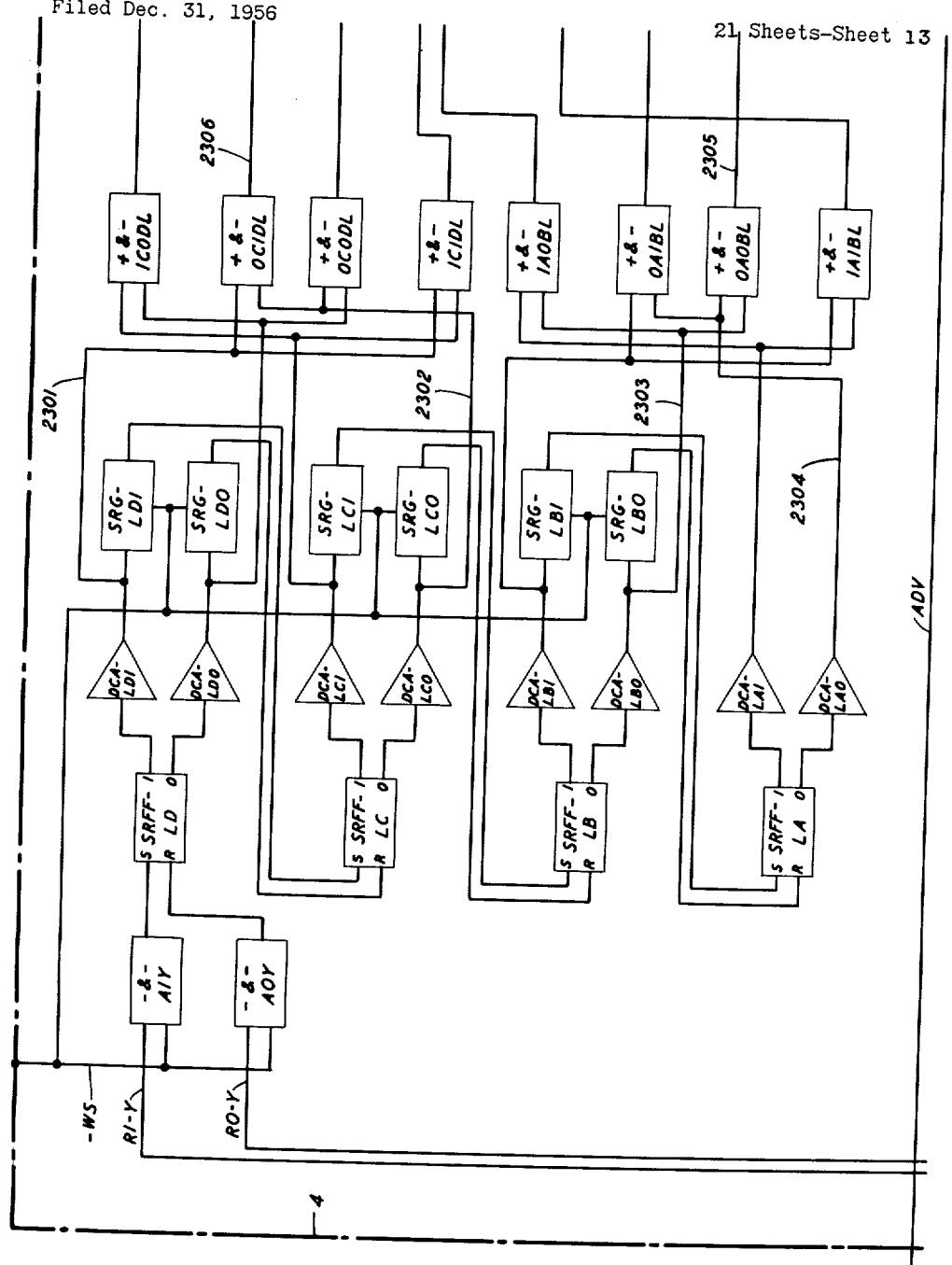
FIG. 23 shows in block diagram form the four stage shift register in the address circuit of the present invention which converts binary signals received in serial form from track Y on the magnetic drum into a four bit binary code.

The arrangement of the signals recorded in the Y track advantageously utilizes a special cyclic sequence code which repeats every 14 slots. Within the 14-slot cycle, every contiguous group of four signals is different. The signals recorded in track Y of each register space are shown in FIG. 3 of the drawings. Referring to FIG. 23 of the drawings, it will be noted that the R1–Y and R0–Y leads which are connected to the output of the reading amplifier circuits associated with track Y on magnetic drum MD, connect to respective AND gates −&−A1Y and −&−A0Y. If a 1 is read in track Y, a negative logic active signal will be applied over the R1–Y lead to AND gate −&−A1Y. Similarly, when a 0 is read in track Y on magnetic drum MD, a negative logic active signal will be applied over the R0–Y lead to AND gate −&−A0Y. The output from the reading amplifier stages of track Y is sampled during the occurrence of the write sync pulse on the −WS synchronizing lead and the 1 or 0 read in track Y on magnetic drum MD will be set in the first stage of a four stage shift register. As shown in FIG. 23, the four stage shift register comprises shift register flip-flops SRFF–LD through SRFF–LA with associated D.C. amplifiers DCA–LD1, DCA–LD0 through DCA–LA1 and DCA–LA0 and shift register gates SRG–LD1, SRG–LD0 through SRG–LB1 and SRG–LB0. The 1 and 0 signals read in track Y on magnetic drum MD progress through the stages of the shift register under control of shift pulses applied over the −WS write sync lead. As a result of the reading of a 1 or 0 in track Y and of the successive shifting of the signals read through the four stages of the shift register, th elast four signals read from track Y are stored in the four shift register flip-flops SRFF–LA through SRFF–LD. These four signals represent the binary code for the next slot which is to pass under the magnetic heads.

The following table illustrates the code utilized in the illustrative embodiment of the present invention to identify slots 1 through 14 of each register space on magnetic drum MD.

Slot Code

| Slot No. | Shift Registers | | | |
|---|---|---|---|---|
| | AL | BL | CL | DL |
| 1 | 0 | 0 | 0 | 1 |
| 2 | 0 | 0 | 1 | 1 |
| 3 | 0 | 1 | 1 | 1 |
| 4 | 1 | 1 | 1 | 0 |
| 5 | 1 | 1 | 0 | 1 |
| 6 | 1 | 0 | 1 | 1 |
| 7 | 0 | 1 | 1 | 0 |
| 8 | 1 | 1 | 0 | 0 |
| 9 | 1 | 0 | 0 | 1 |
| 10 | 0 | 0 | 1 | 0 |
| 11 | 0 | 1 | 0 | 1 |
| 12 | 1 | 0 | 1 | 0 |
| 13 | 0 | 1 | 0 | 0 |
| 14 | 1 | 0 | 0 | 0 |

A method of devising the above code and of serially recording the signals in accordance therewith in track Y of magnetic drum MD is disclosed in the copending application of A. E. Joel, Jr., and J. J. Yostpille, Serial No. 493,721 filed March 11, 1955, now Patent 2,892,184 granted June 23, 1959.

With reference to FIG. 3, assume by way of illustration, that upon the occurrence of the write sync pulse in slot 14 of a register space, the 1 read there is set in shift register flip-flop SRFF–LD. Under this condition, the previous three signals read in track Y are 0's and will be recorded in shift register flip-flops SRFF–LC, SRFF–LB and SRFF–LA. The settings of the four shift register flip-flops for these four signals read in track Y correspond to the code in the above table for the next slot to pass under the magnetic heads which, under the assumed example, will be slot 1 of the succeeding register space.

Figure 24:
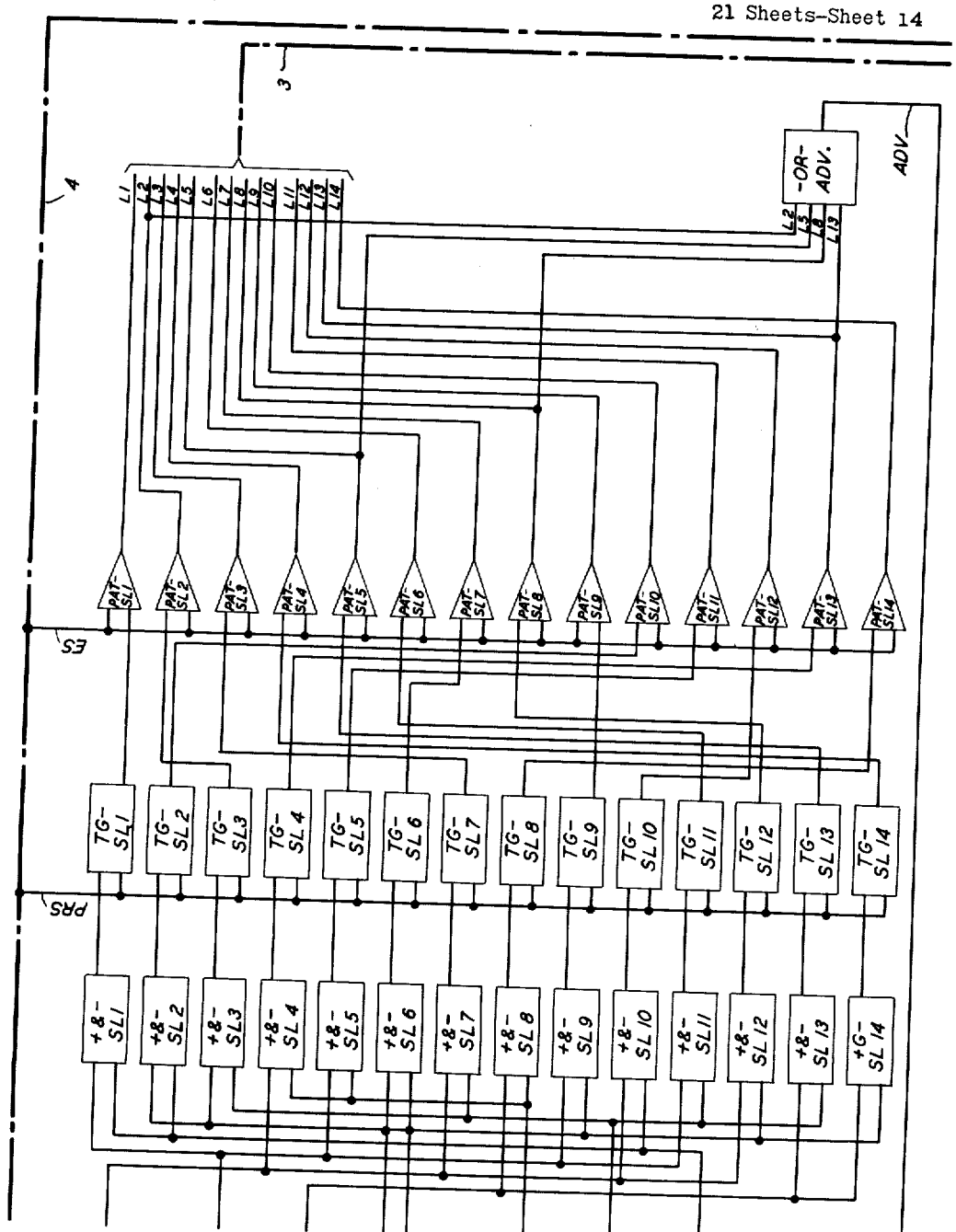
FIG. 24 shows an additional portion of the address circuit which translates the binary code registered in the four stage shift register shown in FIG. 23 into a 1-out-of-14 code defining the respective 14 slots in each register space on the magnetic drum in the present invention.

The slot codes obtainable from the output of the four stage shift register described above are translated by the AND gate translator shown in FIGS. 23 and 24. This translator comprises AND gates +&−1C0DL, +&−0C1DL, +&−0C0DL, +&−1C1DL, +&−1A0BL, +&−0A1BL, +&−0A0BL, +&−1A1B1 and +&−SL1 through +&−SL14.

Referring to the above example, assume that the shift register flip-flops are set to represent the code for slot 1 of a register space which is indicated by shift register flip-flop SRFF–LD being set to a 1 and the remaining shift registers SRFF–LC, SRFF–LB and SRFF–LA being set to 0. Under these conditions, the 1 output of shift register flip-flop SRFF–LD applied through direct current amplifier DCA–LD1 applies a positive logic active signal to lead 2301. The 0 output of shift register flip-flop SRFF–LC applies a positive logic active signal through direct current amplifier DC–LC0 to lead 2302. The 0 output of shift register flip-flop SRFF–LB applies to a positive logic active signal through direct current amplifier DCA–LB0 to lead 2303 and, similarly, the 0 output of shift register flip-flop SRFF–LA applies a positive logic active signal through direct current amplifier DCA–LA0 to conductor 2304. The active signals on conductors 2303 and 2304 are combined in AND gate +&−0A0BL to provide an active signal condition on lead 2305. Similarly, the active signals on leads 2301 and 2302 are combined in AND gate +&−0C1DL to provide an active signal on lead 2306. The active signals on leads 2306 and 2305 are combined in AND gate +&−SL1 shown in FIG. 24 to provide a positive logic active signal to the input of transmission gate TG–SL1. The translator network comprising the groups of AND gates described above operates in a similar manner to translate all of the four bit binary codes set in the four stage shift register into a 1-out-of-14 decimal code identifying slots 1 through 4.

As shown in FIG. 24 of the drawings, the outputs of AND gates +&−SL1 through +&−SL14 are applied to respective transmission gates TG–SL1 through TG–SL14. These transmission gates are triggered by the negative signal pulse applied over the preread sync lead PRS to apply negative logic active signal conditions to respective transmission pulse amplifiers PAT–SL1 through PAT–SL14. The outputs of transmission pulse amplifiers PAT–SL1 through PAT–SL14 are connected to respective leads L1 through L14 which extend via cable 3 to the register space control circuit to control the logical operations of this circuit.

It will be observed that the four stage shift register shown in FIG. 23 is set during the occurrence of the write sync pulse and that the output of this shift register is sampled during the occurrence of the preread sync pulse of the next succeeding slot. Therefore, the setting of the shift register from the binary code read on track Y in magnetic drum MD represents the code for the next slot to pass under the magnetic heads.

Figure 25:
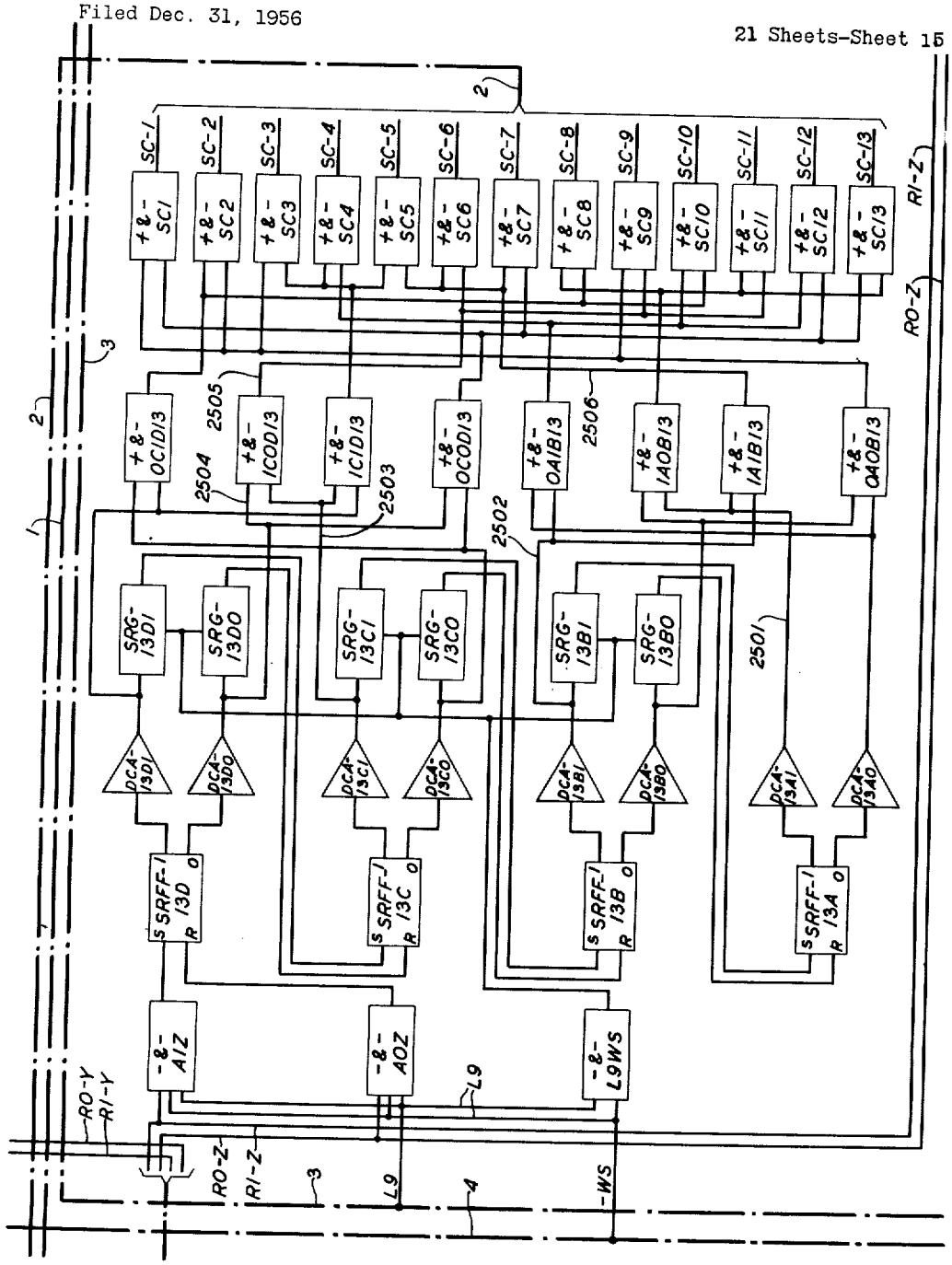
FIG. 25 shows in block diagram form the four stage shift register in the address circuit of the present invention which connects binary signals received in serial form from track Z on the magnetic drum into a four bit binary code and a circuit which translates this binary code into a 1-out-of-13 code to control the column input leads to the scanner.
Figure 26:
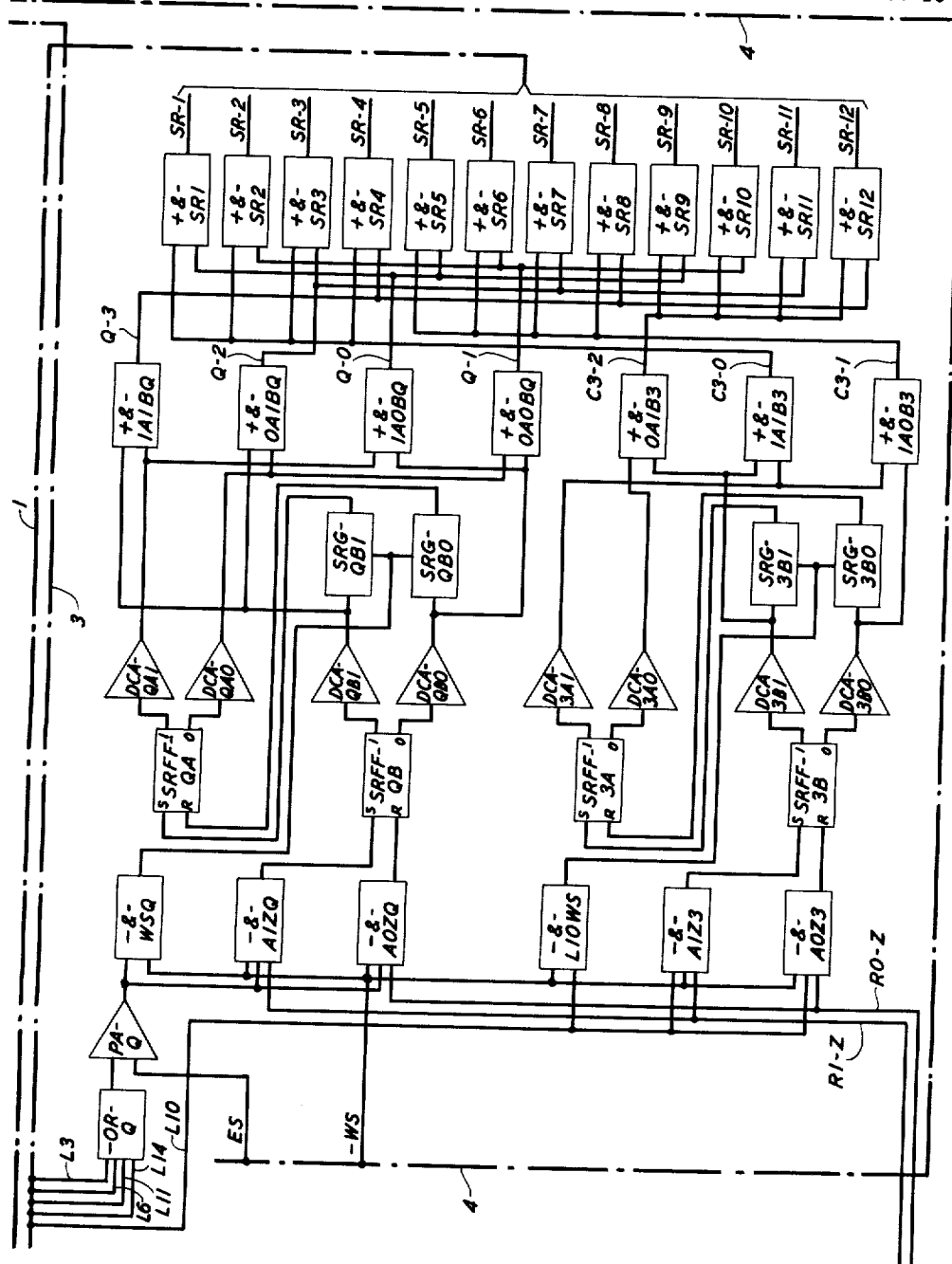
FIG. 26 shows in block diagram form the two stage shift registers and associated transistor circuits in the address circuit of the present invention which convert binary signals received in serial form from track Z on the magnetic drum into a 1-out-of-12 code to control the row input leads to the scanner.

The portion of the address circuit shown in FIGS. 25 and 26 comprises the register space number logic and is similar in operation to the slot number logic described above in connection with FIGS. 23 and 24. As indicated hereinbefore, the scanner is controlled by two sets of leads, the scanner column input leads SC–1 through SC–13 and the scanner row input leads SR–1 through SR–12. A positive logic active signal is appplied to one lead in each group concurrently and these signals open a pair of coordinates in the scanner in the manner described hereinbefore. The generation of these signals is accomplished by three shift registers and associated logic circuits, a four stage shift register comprising shift register flip-flops SRFF–13D through SRFF–13A shown in FIG. 25, a two stage shift register comprising shift register flip-flops SRFF–3A and SRFF–3B shown in FIG. 26 and a two stage shift register comprising shift register flip-flops SRFF–QA and SRFF–QB shown in FIG. 26.

The positive logic active signals applied to the scanner column input leads SC–1 through SC–13 which extend to the scanner via cable 2 are controlled by a special cyclic sequence code recorded in slot 9 of track Z in each of the register spaces on magnetic drum MD. This cyclic code repeats every 13 register spaces and within the 13 cycle code code every contiguous group of four signals is different. As slot 9 track Z of each register space on magnetic drum MD is read, the 1 or 0 recorded there is set in shift register flip-flop SRFF–13D. Referring to FIG. 25, it will be noted that the R1–Z lead and R0–Z lead which are connected to the output of the reading amplifier circuits associated with track Z on magnetic drum MD terminate in respective AND gates —&—A1Z and —&—A0Z together with the write sync lead –W3 and lead L9. Therefore, if a 1 is read in slot 9 track Z of a register space, AND gate —&—A1Z will be actuated to set shift register flip-flop SRFF–13D to its 1 condition. Similarly, if a 0 is read in slot 9 track Z of a register space, AND gate —&—A0Z will be actuated to reset shift register flip-flop SRFF–13D to its 0 condition. The 1 or 0 signal read in slot 9 track Z of each register space progresses through the stages of the shift register under control of shift pulses applied from the output of AND gate —&—L9WS. Referring to FIG. 25, it will be noted that an active output signal is obtained from AND gate —&—L9WS when the write sync pulse on the –WS lead occurs in slot 9 (lead L9 active). The four stage shift register shown in FIG. 25 in which the code controlling the generation of active signal conditions on the scanner column input leads is registered, comprises shift register flip-flops SRFF–13D through SRFF–13A with associated direct current amplifiers DCA–13D1 and DCA–13D0 through DCA–13A1 and DCA–13A0 and shift register gates SRG–13D1 and SRG–13D0 through SRG–13B1 and SRG–13B0. As a result of the reading of a 1 or 0 in slot 9 track Z of each of the register spaces and the successive shifting of the signals read through the four stages of the shift register, the signals read in slot 9 track Z of the last four register spaces to pass under the magnetic head on magnetic drum MD are stored in the four shift register flip-flops. These four signals represent the binary code used to designate the scanner column input lead to which the positive logic active signal condition is to be applied.

The following table illustrates the code utilized in the illustrative embodiment of the present invention to identify or designate the scanner column input leads.

Scanner Column Input Lead Code

| Scanner Column Input Lead | Shift Registers | | | |
|---|---|---|---|---|
| | 13A | 13B | 13C | 13D |
| SC–1 | 0 | 0 | 0 | 0 |
| SC–2 | 0 | 0 | 0 | 1 |
| SC–3 | 0 | 0 | 1 | 1 |
| SC–4 | 0 | 1 | 1 | 1 |
| SC–5 | 1 | 1 | 1 | 0 |
| SC–6 | 1 | 1 | 0 | 0 |
| SC–7 | 1 | 0 | 0 | 0 |
| SC–8 | 0 | 0 | 1 | 0 |
| SC–9 | 0 | 1 | 0 | 1 |
| SC–10 | 1 | 0 | 1 | 0 |
| SC–11 | 0 | 1 | 0 | 0 |
| SC–12 | 1 | 0 | 0 | 0 |
| SC–13 | 1 | 0 | 0 | 0 |

The above code may be devised and the binary signals in accordance therewith serially recorded in slot 9 track Z of each of the register spaces in the manner disclosed in the above-cited copending application of A. E. Joel, Jr., and J. J. Yostpille. The binary bits read in slot 9 track Z of successive register spaces on magnetic drum MD are set into the four stage shift register shown in FIG. 25 in a manner similar to that described above in FIG. 25 in connection with FIG. 23. The successive signals are shifted from stage to stage upon occurrence of the shift pulse from the output of AND gate —&—L9WS.

The output of the four stage shift register shown in FIG. 25 is translated by the AND gate translator shown in FIG. 25. This translator comprises AND gates +&—0C1D13, +&—1C0D13, +&—1C1D13,

+&—0C0D13

+&—0A1B13, +&—1A0B13, +&—1A1B13,

+&—0A0B13 and +&—SC1 through +&—SC13.

through +&—SC13.

Assume by way of illustration that the shift register flip-flops are set to represent the code for scanner column input lead SC–6. Referring to the above table, it will be noted that shift register flip-flops SRFF–13A, SRFF–13B and SRFF–13C are set to their 1 condition while shift register flip-flop SRFF–13D is set to its 0 condition. Under these conditions, the 0 output of shift register flip-flop SRFF–13D applied through direct current amplifier DCA–13D0 applies a positive logic active signal to lead 2504. The 1 output of shift register flip-flop SRFF–13C applies a positive logic active signal through direct current amplifier DCA–13C1 to lead 2503. The 1 output of shift register flip-flop SRFF–13B applies a positive logic active signal through direct current amplifier DCA–13B1 to lead 2502 and, similarly, the 1 output of shift register flip-flop SRFF–13A applies a positive logic active signal through direct current amplifier DCA–13A1 to lead 2501. The active signals on leads 2504 and 2503 are combined in AND gate +&—1C0D13 to provide an active signal condition on lead 2505. Similarly, the active signal conditions on leads 2502 and 2501 are combined in AND gate +&—1A1B13 to provide an active signal condition on lead 2506. The active signal conditions on leads 2505 and 2506 are combined in AND gate +&—SC6 which in turn applies a positive logic active signal to the scanner column input lead SC–6. By means of the AND gate translator shown in FIG. 25, the four bit binary code obtained from the four stage shift register is converted into a 1-out-of-13 code which is fed to the scanner over the scanner column input leads. It will be noted that the code controlling the scanner column input leads changes during the reading of slot 9 of each register space and remains unchanged until slot 9 of the next succeeding register space is read.

The positive logic active signals applied to the scanner row input leads SR–1 through SR–12 which extend to the scanner via cable 1 are controlled by two special cyclic sequence codes recorded in track Z in the register spaces on magnetic drum MD. The first of these codes, designated the Scanner 3's Lead Code, is recorded in slot 10 track Z of each register space. This code repeats every three register spaces and within the three cycle code every contiguous group of two signals is different. The other code, designated the Scanner Quadrant Code, is recorded in slots 3, 6, 11 and 14 of each register space. This four cycle code repeats every register space.

As slot 10 track Z of each register space is read, the 1 or 0 recorded there is set in shift register flip-flop SRFF–3B. Referring to FIG. 26, it will be noted that the R1–Z lead and the R0–Z lead which are connected to the output of the reading amplifier circuits associated with track Z on magnetic drum MD terminate in respective AND gates —&—A1Z3 and —&—A0Z3 together with the write sync lead –WS and lead L10. Therefore, if a 1 is read in slot 10 track Z of a register space, AND gate —&—A1Z3 will be actuated to set shift register flip-flop SRFF–3B to its 1 condition. Similarly, if a 0 is read in slot 10 track Z of a register space, AND gate —&—A0Z3 will be actuated to reset shift register flip-flop SRFF–3B to its 0 condition. The 1 and 0 signals read in slot 10 track Z of each register space progress through the stages of the two stage shift register comprising shift register flip-flops SRFF–3A and SRFF–3B under control of shift pulses applied from the output of AND gate —&—L10WS. Referring to FIG. 26, it will be noted that an active output signal is obtained from AND gate —&—L10WS when the write sync pulse on the –WS lead occurs in slot 10 (lead L10 active). The two stage shift register shown in FIG. 26 in which the code controlling the generation of active signal conditions on the scanner 3's leads is registered, comprises shift register flip-flops SRFF–3A and SRFF–3B with associated direct current amplifiers DCA–3A1, DCA–3A0, DCA–3B1 and DCA–3B0 and shift register gates SRG–3B1 and SRG–3B0. As a result of the reading of a 1 or 0 in slot 10 track Z of each of the register spaces and the successive shifting of the signals read through the two stages of the shift register, the signals read in slot 10 track Z of the last two register spaces to pass under the magnetic heads of magnetic drum MD are stored in the two shift register flip-flops. These two signals represent the two bit binary code used to designate the scanner 3's leads which, in the manner to be described, are combined with the scanner quadrant leads to provide positive logic active signal conditions on the scanner row input leads.

The following table illustrates the code utilized in the illustrative embodiment of the present invention to designate the scanner 3's leads.

*Scanner 3's Lead Code*

| Leads | Shift Registers | |
|---|---|---|
| | 3A | 3B |
| C3–0 | 1 | 1 |
| C3–1 | 1 | 0 |
| C3–2 | 1 | 1 |

The above code and the binary signals in accordance therewith may be serially recorded in slot 10 track Z of the register spaces in the manner disclosed in the above-cited copending application of A. E. Joel, Jr., and J. J. Yostpille. The two bit binary code registered in shift register flip-flops SRFF–3A and SRFF–3B is translated into a one-out-of-three code in AND gates +&—0A1B3, +&—1A1B3 and +&—1A0B3 and applied to leads C3–0, C3–1 and C3–2.

The Scanner Quadrant Lead Code is generated from signals recorded in slots 3, 6, 11 and 14 of track Z of each register space. Referring to FIG. 26, it will be noted that the R1-Z lead and the R0-Z lead which are connected to the output of reading amplifier circuits associated with track Z on magnetic drum MD terminate in respective AND gates —&—A1ZQ and —&—A0ZQ. The write sync lead also terminates in each of these AND gates together with a lead from the output of pulse amplifier PA–Q. The input of pulse amplifier PA–Q is obtained from the output of OR gate —OR–Q. The inputs to this OR gate extend via cable 3 from the slot definition portion of the address circuit shown in FIG. 24 and consist of leads L3, L6, L11 and L14. If a 1 is read in track Z of slots 3, 6, 11 or 14 of a register space, AND gate —&—A1ZQ will be actuated to set shift register flip-flop SRFF–QB to its 1 condition. Similarly, if a 0 is read in slots 3, 6, 11 or 14 of track Z of a register space, AND gate —&—A0ZQ will be actuated to reset shift register flip-flop SRFF–3B to its 0 condition. The 1 or 0 signals read in slots 3, 6, 11 and 14 of track Z of each register space progress through the stages of the two stage shift register comprising shift register flip-flops SRFF–QA and SRFF–QB under control of shift pulses applied from the output of AND gate —&—WSQ. Referring to FIG. 26, it will be noted that AND gate —&—WSQ will be actuated to apply an active signal output when the write sync pulse occurs on the –WS lead in slots 3, 6, 11 or 14 of each register space. The two stage shift register shown in FIG. 26 in which the code controlling the generation of active signal conditions on the scanner quadrant leads is registered, comprises shift register flip-flops SRFF–QA and SRFF–QB with associated direct current amplifiers DCA–QA1, DCA–QA0, DCA–QB1 and DCA–QB0 and shift register gates SRG–QB1 and SRG–QB0. As a result of the reading of a 1 or 0 in slots 3, 6, 11 and 14 of track Z of each register space and of the successive shifting of the signals through the two stages of the shift register, the last two signals read in these slots in track Z are stored in the two shift register flip-flops. These two signals represent the two bit binary code used to designate the scanner quadrant leads which, in the manner to be described, are combined with the scanner 3's leads to provide positive logic active signal conditions on the scanner row input leads.

The following table illustrates a typical code utilized in the illustrative embodiment of the present invention to designate the scanner quadrant leads in one quadrant on magnetic drum MD. The code is different for each quadrant of drum MD.

*Scanner Quadrant Lead Code*

| Leads | Shift Registers | |
|---|---|---|
| | QA | QB |
| Q–0 | 1 | 0 |
| Q–1 | 0 | 0 |
| Q–2 | 0 | 1 |
| Q–3 | 1 | 1 |

The quadrant code and the binary signals in accordance therewith may be serially recorded in track Z slots 3, 6, 11 and 14 of each register space on magnetic drum MD in the manner disclosed in the above-cited copending application of A. E. Joel, Jr., and J. J. Yostpille. The two bit binary code registered in shift register flip-flops SRFF–QA and SRFF–QB is translated into a 1-out-of-4 code in AND gates +&—1A1BQ, +&—0A1BQ, +&—1A0BQ and +&—0A0BQ and applied to leads Q–0 through Q–3.

Referring to the above code and to FIG. 26 and assuming that this code is recorded, as shown in FIG. 3, in slot 3, 6, 11 and 14 of the register spaces located in the first quadrant of magnetic drum MD (quadrant A as shown in FIG. 4), it will be observed that as slots 3, 6, 11 and 14 of each register space in quadrant A of drum MD successively pass under the main magnetic heads, a positive logic active signal is successively applied to respective leads Q–0, Q–3, Q–2 and Q–1 in this order. The quadrant code recorded in slots 3, 6, 11 and 14 of the register spaces located in the second quadrant of magnetic drum MD (quadrant B as shown in FIG. 4) is changed so that a positive logic active signal will be successively applied to leads Q-3, Q-2, Q-1 and Q-0 respectively as slots 3, 6, 11 and 14 of the register spaces in the second quadrant of drum MD pass under the main magnetic heads. Similarly the quadrant code recorded in slots 3, 6, 11 and 14 in the register spaces of the third quadrant (quadrant C as shown in FIG. 4) of magnetic drum MD is arranged so that a positive logic active signal will be successively applied to leads Q-2, Q-1, Q-0 and Q-3 respectively as these slots pass under the main magnetic heads on drum MD. Likewise the quadrant code recorded in slots 3, 6, 11 and 14 of the register spaces in the fourth quadrant (quadrant D as shown in FIG. 4) of magnetic drum MD is arranged so that a positive logic active signal will be successively applied to leads Q-1, Q-0, Q-3 and Q-2 respectively as these slots pass under the main magnetic heads on drum MD. By changing the quadrant code in this manner in each quadrant of magnetic drum MD each sender is scanned four times per revolution of magnetic drum MD.

The 1-out-of-3 code on leads C3-0 through C3-2 from the output of the Scanner 3's Code shift register and the 1-out-of-4 code on the Q-0 through Q-3 leads from the output of the Scanner Quadrant Code shift register are combined in AND gates +&—SR1 through +&—SR12 to provide a 1-out-of-12 code for the scanner row input leads SR-1 through SR-12. It will be observed that four of the scanner row input leads have a positive logic active signal condition applied thereto during the passage of each of the register spaces on magnetic drum MD under the magnetic heads. This permits the scanner to scan four senders during this interval in the manner described hereinbefore.

The address circuit of the present invention also provides one other function, that being to provide pulses on the ADV lead which control the unblocking of the scanner detector described hereinbefore. Referring to FIG. 24, the pulses applied to the ADV lead are obtained from OR gate —OR-ADV. The inputs to this OR gate consist of leads L2, L5, L8 and L13 and, hence, a negative logic active signal is applied over the ADV lead whenever slots 2, 5, 8 and 13 are passing under the magnetic heads.

*Register Space Control Circuit*

The register space control circuit of the illustrative embodiment of the present invention is shown in FIGS. 27 through 31 of the drawings. The purpose of this circuit is to interpret the output of the scanner, that is, to recognize dial pulses and to register the detected dial pulses in the register space associated with the sender being scanned. As described above, the scanner is controlled by the address circuit to scan each sender associated with the illustrative embodiment of the present invention four times per revolution of magnetic drum MD and the output of the scanner is shaped and converted into two rail logic and fed to the register space control circuit over the R1S and R0S leads in cable 5. A negative logic active signal on the R1S lead indicates that the dial pulse repeating relay in a scanned sender is operated and the loop to the calling subscriber is closed. Similarly, a negative logic active signal condition on the R0S lead indicates that the dial pulse repeating relay in a scanned sender is normal and the loop to the subscriber is open.

As indicated previously, each of the scanned senders is associated with a respective register space on magnetic drum MD. This register space is shown in detail in FIG. 3 of the drawings. The cells in slot 1 of tracks 1, 2 and 3 designated "TIMER" are utilized by the register space control circuit to count the number of drum revolutions between changes in state of the subscriber's loop. The cell in track 4 slot 1 designated "ON" is used by the register space control circuit to indicate that the sender associated with the register space is "off normal." A 1 is recorded in the "ON" cell when the sender is off normal, that is, when a call is being originated and a 0 is recorded in the "ON" cell when the sender is normal or unoperated. The EPL cell in slot 1 track 5 will be utilized by the register space control circuit to record information pertaining to the location of the last dial pulse. This information differentiates between the first three-quarters and the last one-quarter of a drum revolution. If a dial pulse terminates during the first three-quarters of a drum revolution, a 0 is written in the EPL cell and if a dial pulse terminates in the last one-quarter of a drum revolution, a 1 is written in the EPL cell. The LR cell in slot 1 track 6 of the register space records the state of the calling subscriber's line. A 1 is written in the LR cell of a register space by the register space control circuit when the subscriber's loop to the sender associated with the register space is closed and, conversely, a 0 is written in the LR cell when the subscriber's loop to the sender associated with the register space is open. The cells in tracks 1 through 4 of slots 4 through 14 of each register space designated "1st Digit Reg," "2nd Digit Reg," etc. through "11th Digit Reg" are binary counters in which the register space control circuit counts and registers the dial pulses of the eleven digits dialed in the sender associated therewith. The cells in track 5 of slots 4 through 14 designated "Digit Dialed" cells adjacent to each digit register are written with a 1 when the digit register is filled, that is, when an interdigital time out is detected following the storage of pulses in the digit register.

As indicated hereinbefore, the magnetic drum in the illustrative embodiment of the present invention is divided into four groups or quadrants each containing 39 register spaces and each register space is associated with three mate register spaces located at one-quarter revolution intervals. There are six cells per register space allotted to its mate registers. These cells are in track 6 and are designated S1, EP1, S2, EP2, S3 and EP3 in each of the register spaces. Information stored in these cells serves to detect ends of dial pulses at one-quarter revolutions and, once detected, to carry this information from one mate register space to the next in such a manner that it is available when the home register space appears under the main heads. Referring to FIG. 4, an abbreviated outline of track 6 on magnetic drum MD is shown with four mated register spaces. These register spaces, designated register spaces No. 1, No. 40, No. 79 and No. 118, are each located in a different quadrant of magnetic drum MD. FIG. 4 also shows the position of auxiliary reading head HD6A with respect to the main read-write heads as being 90 degrees less three slots ahead of the main read-write heads. The six cells in track 6 of magnetic drum MD associated with register space No. 1 are cells S3 and EP3 in register space No. 40, cells EP2 and S2 in register space No. 79 and cells S1 and EP1 in register space No. 118. Similarly, cells S3 and EP3 in register space No. 79, cells S2 and EP2 in register space No. 118 and cells S1 and EP1 in register space No. 1 are associated with register space No. 40. Likewise, cells S3 and EP3 in register space No. 118, cells S2 and EP2 in register space No. 1 and cells S1 and EP1 in register space No. 40 are associated with register space No. 79 and, lastly, cells S3 and EP3 in register space No. 1, cells S2 and EP2 in register space No. 40 and cells S1 and EP1 in register space No. 79 are associated with register space No. 118.

*Recognizing Incoming Calls and Seizing Register Spaces*

When a calling subscriber originates a call, the subscriber's loop is closed. This causes the subsequent operation of a dial pulse repeating relay in a sender and an active signal to be applied over the R1S lead in cable 5 from the scanner to the register space control circuit when the sender is scanned. As indicated above, each sender is associated with a particular register space on magnetic drum MD and due to the synchronization between the drum rotation and the scanning, the "home scan" of a particular sender is made at the moment the read-write heads on magnetic drum MD stand over slot 14 of the register space immediately preceding the space associated with the sender being scannned.

Figure 27:
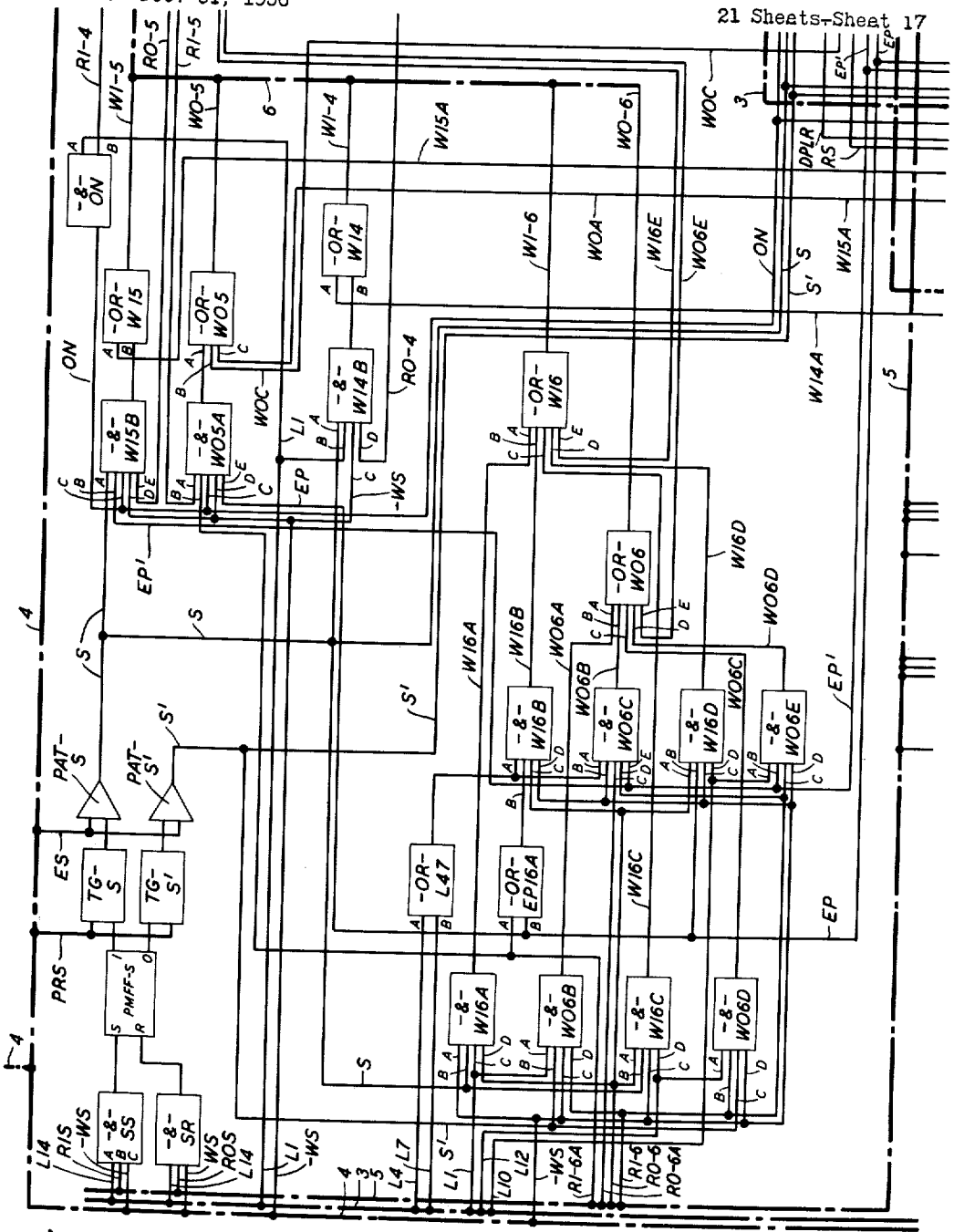
FIG. 27 shows in block diagram form a portion of the register space control circuit of the present invention which controls the logic operation associated with tracks 4, 5 and 6 on the magnetic drum.

Referring to FIG. 27, when the R1S lead is active indicating a closed loop, pulse memory flip-flop PMFF-S will be set. It will be noted that the active signal on the R1S lead is applied to input B of AND gate —&—SS along with an active signal on the L14 lead on input A and an active signal on the -WS write sync lead on input C. When active signals are present on these three leads, pulse memory flip-flop PMFF-S is set and will apply from its 1 output on active signal condition to the S lead through transmission gate TG-S and transmission pulse amplifier PAT-S. Referring to FIG. 27, it will be noted that when the subscriber's loop is open or normal, an active signal condition will be applied to the R0S lead which is connected to input B of AND gate —&—SR. This active signal in coincidence with the active signal conditions on the L14 lead connected to input A of AND gate —&—SR and the active signal on the write sync lead -WS connected to input C will cause the pulse memory flip-flop PMFF-S to be reset to its normal condition. This will cause an active signal condition to be applied to the S' lead from the 0 output of pulse memory flip-flop PMFF-S through transmission gate TG-S' and transmission pulse amplifier PAT-S'. Therefore, lead S will have an active signal applied thereto when slot 14 of a register space is under the magnetic heads if the subscriber's loop is closed and lead S' will be active if the subscriber's loop is open.

When slot 1 of a register space is passing under the magnetic heads, a 1 is written in the ON cell in track 4 to indicate that the sender associated with the register space is off normal. Referring to FIG. 27, it will be noted that input A of AND gate —&—W14B is connected to the S lead which will be active if the subscriber's loop is closed. Input B of this AND gate is connected to the L1 lead which will be active when slot 1 of the register space is under the main read-write heads, input C is connected to the -WS write sync lead and input D is connected to the R0-4 lead. Therefore, when slot 1 of a register space passes under the main read-write head, if a 0 is read in the ON cell in track 4 and the subscriber's loop is closed (lead S active), AND gate —&—W14B will be actuated to apply an active signal to input B of OR gate —OR-W14. The actuation of OR gate —OR-W14 in this manner will apply an active signal condition to the W1-4 lead which extends via cable 6 to the writing amplifier circuits associated with track 4 of magnetic drum MD to cause a 1 to be written in the ON cell in slot 1. The 1 in the ON cell indicates that the register space is off normal and is ready to receive digits as they are dialed.

A second operation which occurs in slot 1 of a register space is the recording of the present condition of the subscriber's loop as indicated by the setting of pulse memory flip-flop PMFF-S in the LR cell in track 6. If the loop is closed, a 1 is written in the LR cell. If the loop is open and a 1 is read in the LR cell, a 0 is written in the LR cell. Referring to FIG. 27, input A of AND gate —&—W16A is connected to the -WS write sync lead, input B is connected to the S lead, input C is connected to the L1 lead and input D is connected to the R0-6 lead. Therefore, if lead S is active and a 0 is read in track 6 of slot 1, AND gate —&—W16A will be actuated when the -WS write sync pulse occurs to apply an active signal over the W16A lead to input A of OR gate —OR-W16. The actuation of OR gate —OR-W16 in turn will apply an active signal on the W1-6 lead which extends via cable 6 to the writing amplifier circuits associated with track 6 on magnetic drum MD. In a similar manner, if the subscriber's loop is open as indicated by the active signal on the S' lead and if a 1 is read in track 6 as indicated by an active signal on the R1-6 lead, AND gate —&—W06B shown in FIG. 27 will be actuated to apply an active signal over the W06A lead to input A of OR gate —OR-W06. The actuation of OR gate —OR-W06 will apply an active signal over the W0-6 lead which extends via cable 6 to the writing amplifier circuits associated with track 6 on magnetic drum MD. In this manner, a 0 is written in the LR cell in track 6 slot 1 of a register space if the subscriber's loop to the sender associated therewith is open and a 1 is recorded in the LR cell if the subscriber's loop is closed. The information recorded in the LR cell is useful in the various timing operations to be described hereinafter and on the next revolution of magnetic drum MD this bit will furnish information relative to the condition of the subscriber's loop one revolution earlier.

With the register space now marked as off normal and the call not yet begun, each consecutive revolution of magnetic drum MD characterized by a closed loop condition adds 1 to a binary timer located in tracks 1, 2 and 3 of slot 1 of the register space. Referring to FIG. 31 of the drawings, the gates which control the binary timer in slot 1 of a register space include AND gates —&—W13A, —&—W03A, —&—W12A, —&—W02A, —&—W11A, —&—W01A and OR gates —OR-W13, —OR-W03, —OR-W12, —OR-W02, —OR-W11 and —OR-W01. For each successive revolution of magnetic drum MD, which is characterized by a closed loop condition, AND gate —&—CL shown in FIG. 31 is actuated. Input A of this AND gate is connected to the EP lead which will be active as will be described hereinafter if the subscriber's loop to the sender being scanned was closed one-quarter revolution earlier (or at the completion of three-quarters of the previous revolution of magnetic drum MD). Input B of AND gate —&—CL is connected to the L1 lead and is active during the passage of slot 1 under the magnetic heads, input C of AND gate —&—CL is connected to the S lead which, an indicated above, is active when a closed loop is detected during the reading of slot 14 of the preceding register space and input D of AND gate —&—CL is connected to the R0-6A lead and will be active when a 1 is read by auxiliary reading head HD6A in the EP1 cell in track 6 slot 4 of the mate register space which passed under the main read-write heads one-quarter revolution earlier of magnetic drum MD. As will be described hereinafter, a 1 will be recorded in the EP1 cell of this mate register space when a dial pulse ended during the first three-quarters of the previous revolution of magnetic drum MD. The actuation of AND gate —&—CL in this manner applies an active signal to lead CL which extends to input C of OR gate —OR-W10A. The actuation of OR gate —OR-W10A applies an active signal to the W10A lead. Thus, for each revolution of magnetic drum MD characterized by a closed loop condition, an active signal will be applied to the W10A lead. These active signals are counted in the timer cells in slot 1 through the gates listed above and shown in FIG. 31.

At the completion of the first revolution of closed loop condition, the active signal on lead W10A will cause the actuation of AND gate —&—W13A. As shown in FIG. 31, the other inputs to AND gate —&—W13A consist of the -WS write sync lead and the R0-3 lead. Therefore, if a 0 is read in track 3 of slot 1 and the W10A lead is active, AND gate —&—W13A will be actuated and in turn cause the actuation of OR gate —OR-W13. The actuation of OR gate —OR-W13 applies an active signal condition on the W1-3 lead which extends via cable 6 to the writing amplifier circuits associated with track 3 of magnetic drum MD to cause a 1 to be written in the timer cell in track 3 slot 1 of the register space.

At the completion of the second revolution of magnetic drum MD, if the loop remains closed, the active signal on the W10A lead will cause the actuation of AND gate —&—W03A shown in FIG. 31. Because a 1 was written in the timer cell in track 3 slot 1 of the register space on the completion of the first revolution of magnetic drum MD, a 1 will now be read in this cell which will apply an active signal condition to the R1–3 lead. The active signal on the R1–3 lead will combine with the active signal on the —WS write sync lead and the W10A lead in AND gate —&—W03A. The actuation of AND gate —&—W03A in turn causes the actuation of OR gate —OR—W03 which in turn will apply an active signal over the W0–3 lead which extends via cable 6 to the writing amplifier circuits associated with track 3 to cause a 0 to be written in the timer cell in track 3 slot 1 of the register space. The active signal from the output of AND gate —&—W03A is also applied to an input of AND gate —&—W12A and AND gate —&—W02A. A 0 will be read in track 2 slot 1 of the register space and the active signal on the R0–2 lead will be combined with the active signal from the output of AND gate —&—W03A in AND gate —&—W12A which in turn will cause the actuation of OR gate —OR—W12. The actuation of this OR gate will apply an active signal over the W1–2 lead extending via cable 6 to the writing amplifier circuits associated with track 2 of the magnetic drum to cause a 1 to be written in the timer cell in track 2 slot 1 of the register space.

At the completion of the third revolution of magnetic drum MD, if a closed loop condition still persists, the active signal on the W10A lead will be combined with the active signal on the R0–3 lead in AND gate —&—W13A to actuate OR gate —OR—W13 to cause a 1 to be written in the timer cell in track 3 slot 1 of the register space. No further changes in the binary bits recorded in the three timer cells in slot 1 are made at the completion of this revolution of magnetic drum MD.

At the completion of the fourth revolution of magnetic drum MD while the closed loop condition remains, the active signal conditions on leads R1–3, W10A and —WS are combined in AND gate —&—W03A to actuate OR gate —OR—W03 to cause a 0 to be written in track 3. The active signal conditions on leads R1–2 and —WS are combined with the active signal condition on the output lead from AND gate —&—W03A in AND gate —&—W02A to actuate OR gate —OR—W02 to cause a 0 to be written in track 2 and the active signal condition on the R1–0 lead and the —WS lead are combined with the active signal condition on the output lead from AND gate —&—W02A in AND gate —&—W11A to actuate OR gate —OR—W11 to cause a 1 to be written in track 1 slot 1 of the register space.

The operation of the AND and OR gates which control the recording of 1's and 0's in the three timer cells in slot 1 of a register is similar to that described above for the fifth, sixth and seventh revolutions of magnetic drum MD. The following binary code is utilized to record the number of revolutions made by magnetic drum MD while the condition of the loop remains unchanged.

| Number of Revolutions | Tracks | | |
|---|---|---|---|
| | 1 | 2 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Addition in the above binary notation proceeds in the following manner. To add a count of 1 to the code registered in the three-cell timer, moving from right to left all 1's are changed to 0's until a 0 is encountered, whereupon that 0 is changed to a 1 and all digits to the left remain unchanged.

The timer cells and associated gates described above are also utilized to count the number of consecutive revolutions of magnetic drum MD made while a subscriber's loop to an associated sender is open. Referring to FIG. 31, AND gate —&—0L will be actuated when a subscriber's loop is open (lead S' connected to input C active), when the loop was open on the previous revolution (lead R0–6 active from reading a 0 in the LR cell in slot 1), when the register space is off normal (lead ON connected to input B active) and when lead R0–6A connected to input D is active from the reading of a 0 by auxiliary reading head HD6A in the EP1 cell in track 6 slot 4 of the mate register space which passed under the main read-write heads one-quarter revolution of magnetic drum MD earlier. As will be described hereinafter, a 0 will be recorded in the EP1 cell of this mate register space when no dial pulse ended during the first three-quarters of the previous revolution of magnetic drum MD. The actuation of AND gate —&—0L will apply an active signal pulse over the 0L lead to input D of OR gate —OR—W10A which will add a count of 1 to the previously accumulated count in the timer cells in tracks 1, 2 and 3 of slot 1 as described above.

When a change in state of the subscriber's loop is detected, the count in the timer cells is erased. AND gate —&—R16S' shown in FIG. 31 will be actuated when the subscriber's loop changes from a closed condition (lead R1–6 active from reading a 1 in the LR cell) to an open condition (lead S' active). AND gate —&—SEP' shown in FIG. 31 will be actuated when the subscriber's loop changes from an open condition one-quarter revolution earlier (lead EP' active as will be described hereinafter) to a closed condition (lead S active). The actuation of AND gate —&—R16S' or AND gate —&—SEP' or the ending of a dial pulse during the first three-quarters of the previous revolution of magnetic drum MD (lead R1–6A active as will be described hereinafter) will cause the actuation of OR gate —OR—R6SS' which in turn will apply an active signal to input C of AND gate —&—W0B. As shown in FIG. 31, inputs A and B of AND gate —&—W0B are connected, respectively, to the —WS and L1 leads. Accordingly, AND gate —&—W0B will be actuated when slot 1 of a register space passes under the main read-write heads when a change of state of the subscriber's loop is detected to apply an active signal to the W0B lead which will cause the actuation of OR gates —OR—W03, —OR—W02 and —OR—W01. The actuation of these OR gates will cause active signals to be applied over the W0–3, W0–2 and W0–1 leads, respectively, extending via cable 6 to the writing amplifier circuits associated with tracks 3, 2 and 1, respectively, on magnetic drum MD to cause 0's to be recorded in these tracks in slot 1.

The timer and the associated AND and OR gates described above which control the recording in the timer cells in slot 1 of a register space are utilized in the illustrative embodiment of the present invention to time or count the number of revolutions between changes of state of the subscriber's loop to the sender associated with the register space. This timer will also be utilized in the manner described hereinafter for interdigital timing and sender release timing.

*Dial Pulse Recognition*

As indicated hereinbefore, the shortest dial pulse duration, that is, the shortest open loop interval representing a dial pulse is 11 milliseconds and the shortest interval between pulses is 25.3 milliseconds. Thus, the shortest time in which a dial pulse can begin and end is 36.3 milliseconds. Also, as indicated hereinbefore, the maximum time for one revolution of magnetic drum MD in the illustrative embodiment of the present invention is 44 milliseconds and it is therefore obvious that more than one dial pulse may end during a single revolution of magnetic drum MD. To be able to detect the beginning and ending of dial pulses, it is therefore advantageous to provide a system of multiple scanning which, in the illustrative embodiment of the present invention, includes provision for scanning each sender associated with the present invention four times per revolution of magnetic drum MD. Because a dial pulse cannot begin and end in less than one-quarter revolution or approximately 10 to 11 milliseconds, no pulses will be lost. However, two dial pulses can conceivably end during the same drum revolution and it is therefore advantageous to break the revolution into two intervals in order to be able to detect whether one or two pulses have ended. The first portion of the revolution of magnetic drum MD will include in the illustrative embodiment of the present invention, the first three-quarters of the revolution and the second portion will include the last one-quarter revolution. The minimum time for three-quarters of a revolution is therefore approximately 33 milliseconds and it will be observed that two pulses cannot end during this interval. However, one pulse may end during this interval and the second pulse may end during the last one-quarter portion of the revolution.

As indicated above, each register space in each quadrant of magnet drum MD is mated with three other register spaces located in different quadrants of the drum and each register space contains cells allotted to its mate register spaces for the purpose of detecting the ends of dial pulses in the senders associated therewith at one-quarter revolution intervals. In order to facilitate an understanding of the multiple scanning utilized in the present invention, it will be advantageous to consider the scanning and dial pulse detecting circuits for one complete drum revolution rather than an explanation of the system as a whole.

The explanation of the operation of the dial pulse detecting circuits in the register space control circuit shown in FIGS. 27 through 31 of the present invention will be made with reference to FIG. 4 where it will be assumed that magnetic drum MD shown therein makes one complete drum revolution and the sender which is being scanned in this illustrative example is the sender associated with register space No. 1. The starting point for this illustrative example will be with the fourth scan (home scan) of the sender associated with register space No. 1 during the revolution preceding the one to be described. This scan of the sender associated with register space No. 1 takes place in slot 11 of register space No. 156 and the condition of the subscriber's loop is recorded in the scanner detector upon the occurrence of the advance pulse in slot 13 of register space No. 156. This information is available to the logic circuitry of the register space control circuit in slot 14 of register space No. 156 and slot 1 of register space No. 1 and serves to indicate the subscriber's loop condition at the conclusion of the revolution. As described hereinbefore, pulse memory flip-flop PMFF–S shown in FIG. 27 is set if the subscriber's loop is closed and remains normal if the loop is open. This loop condition is recorded in the LR cell in track 6 slot 1 as explained hereinbefore and a 1 is also written in the ON cell in track 4 slot 1 to indicate an off normal condition. Pulse memory flip-flop PMFF–S remains in the condition set on slot 14 of the preceding register space (register space No. 156) until slot 12 of register space No. 1 passes under the magnetic heads. At this point, the subscriber's loop condition of 12 slots ago is recorded in the S0 cell in track 6 slot 12 of register space No. 1. If pulse memory flip-flop PMFF–S is set, AND gate —&—W16C shown in FIG. 27 will be actuated. As shown in FIG. 27, input A of this AND gate is connected to the R0–6 lead and will be active if a 0 is read in the S0 cell in track 6 slot 12. Input B of AND gate —&—W16C is connected to the S lead which will be active if pulse memory flip-flop PMFF–S is set. Input C of this AND gate is connected to the –WS write sync lead and input D of AND gate —&—W16C is conected to lead L12 which will be active when slot 12 is under the main read-write heads. Therefore, if during the passage of slot 12 under the magnetic heads, pulse memory flip-flop PMFF–S is set and a 0 is read in the S0 cell in track 6, AND gate —&—W16C will be actuated to apply an active signal condition to the W16C lead which extends to input C of OR gate —OR–W16. The actuation of OR gate —OR–W16 will in turn apply an active signal to the W1–6 lead which extends via cable to the writing amplifier circuits associated with track 6 on magnetic drum MD. In this manner, a 1 will be written in the S0 cell in track 6 of slot 12 of register space No. 1.

If, during the reading of slot 12 of register space No. 1, pulse memory flip-flop PMFF–S is normal and a 1 is read in the S0 cell in track 6 slot 12, AND gate —&—W06D shown in FIG. 27 will be actuated to apply an active signal over the W06C lead to input C of OR gate —OR–W06. The actuation of this OR gate in turn applies an active signal over the W0–6 lead extending via cable 6 to the writing amplifier circuits associated with track 6 on magnetic drum MD to cause a 0 to be written in the S0 cell in track 6. Therefore, if 12 slots previously the loop was closed during the scan of the sender associated with register space No. 1, a 1 will be written in the S0 cell in track 6 slot 12 of register space No. 1 and, if the subscriber's loop was open when the sender associated with register space No. 1 was scanned 12 slots previously, a 0 will be written in the S0 cell in track 6 slot 12 of register space No. 1.

Figure 28:
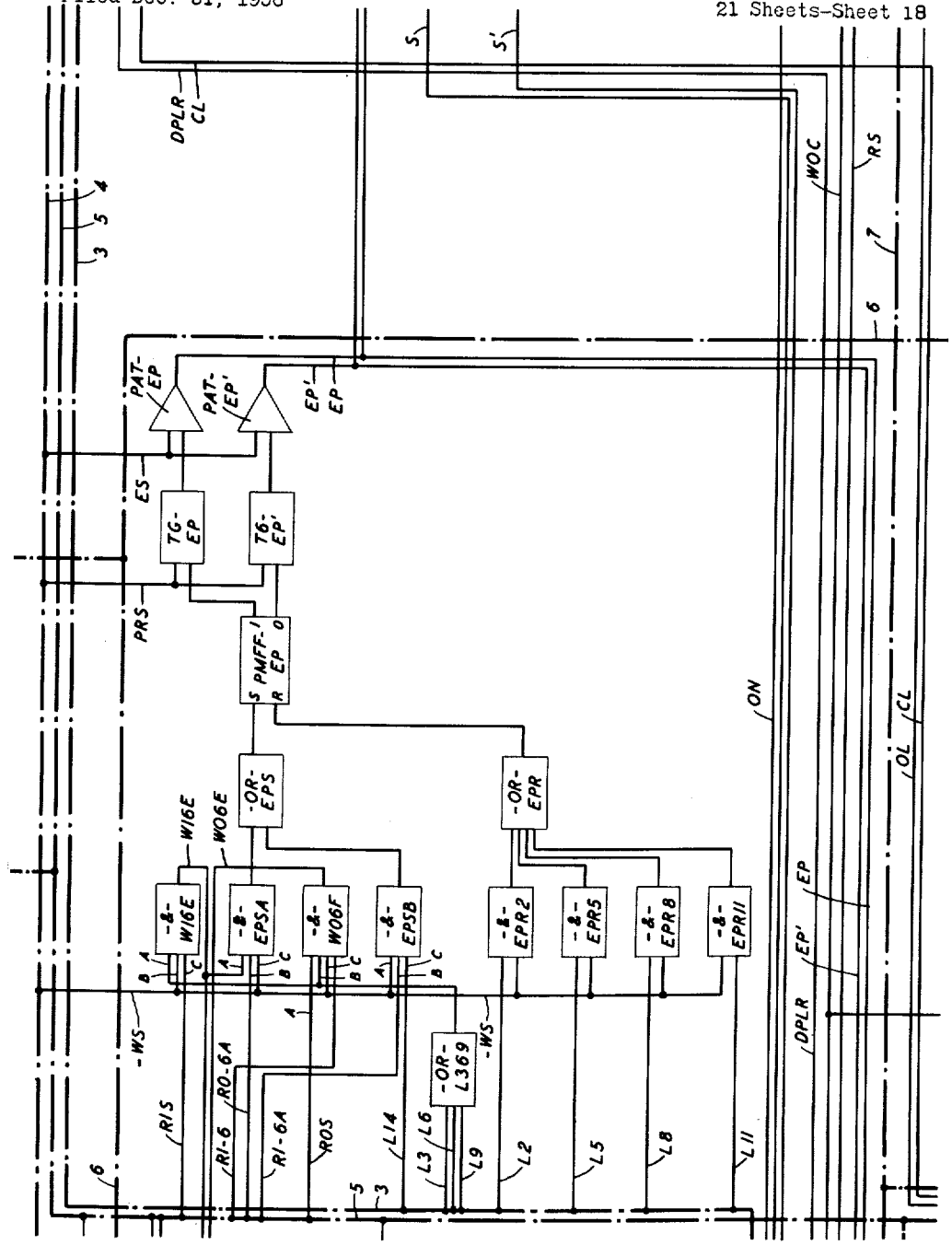
FIG. 28 shows in block diagram form an additional portion of the register space control circuit of the present invention which controls the detection of the end of dial pulses.

Magnetic drum MD now revolves the first one-quarter revolution until slot 12 of register space No. 1 is under auxiliary head HD6A. At this time, due to the three-cell displacement of auxiliary head HD6A from 90 degrees as shown in FIG. 4, slot 9 of register space No. 40 will be under the main read-write heads. The first scan of the sender associated with register space No. 1 is made during the passage of slot 9 of register space No. 40 under the magnetic heads. It will be recalled from the description of the scanner and address circuit that the scanner will be set to scan this sender by the address circuit when the write sync pulse occurs in slot 6 of register space No. 40 and the condition of the scanned subscriber's loop will be recorded in the scanner detector upon the occurrence of the unblocking pulse occurring in slot 8 of register space No. 40. This recorded loop condition is then applied to the R1S or R0S lead as negative logic active signal condition during the occurrence of the read sync pulse in slots 9, 10, 11 and 12 of register space No. 40. The condition of the subscriber's loop to the sender associated with register space No. 1 as determined during the scan of this sender when slot 9 of register space No. 40 is under the main read-write heads is recorded in the S3 cell in track 6 slot 9 of register space No. 40. Referring to FIG. 28 of the drawings, it will be noted that OR gate —OR–L369 is actuated during the passage of slots 3, 6 or 9 under the magnetic heads. The actuation of OR gate —OR–L369 applies an active signal condition to input A of AND gate —&—W16E and input B of AND gate —&—W06F shown in FIG. 28. Referring to AND gate —&—W16E, it will be noted that input B thereof is connected to the –WS write sync lead and input C is connected to the R1S lead extending from the output of the scanner detector. If the output of the scanner indicates that the loop is closed, the R1S lead will be active and AND gate —&—W16E will be actuated. The actuation of this AND gate will apply an active signal over the W16E lead which extends to input E of OR gate —OR–W16 shown in FIG. 27. The actuation of OR gate —OR–W16 will apply an active signal condition over the W1–6 lead extending via cable 6 to the writing amplifier circuits associated with track 6 on the magnetic drum to cause a 1 to be written in the S3 cell in slot 9 track 6 of register space No. 40.

If, during the scan of the sender associated with register space No. 1 when slot 9 of register space No. 40 is under the main read-write heads, the subscriber's loop is open, an active signal will be applied over the R0S lead connected to input A of AND gate —&—W06F shown in FIG. 28. It will be observed that input B of this AND gate is connected to the output of OR gate —OR—L369, input C of this AND gate is connected to the —WS write sync lead and input D is connected to the R1–6 lead. Accordingly, if a 1 is read in the S3 cell in slot 9 track 6 of register space No. 40 and the output from the scanner over the R0S lead indicates that the subscriber's loop to the sender associated with register space No. 1 is open, AND gate —&—W06F will be actuated and apply an active signal over the W06E lead to input E of OR gate —OR-W06. The actuation OR gate —OR-W06 will in turn apply an active signal over the W0–6 lead extending via cable 6 to the writing amplifier circuits associated with track 6 on magnetic drum MD to cause a 0 to be written in the S3 cell in slot 9 track 6 of register space No. 40.

During the occurrence of the reading interval while slot 9 of register space No. 40 is under the main read-write heads, the bit of information in the S0 cell in slot 12 of register space No. 1 is read by auxiliary head HD6A and a comparison is made with the present condition of the loop as indicated by the scanner leads. If a dial pulse has ended in the first one-quarter revolution of magnetic drum MD, pulse memory flip-flop PMFF–EP shown in FIG. 28 is set. Referring to FIG. 28, AND gate —&—EPSA is actuated when an active signal is present on the W16E lead from the output of AND gate —&—W16E, when an active signal is present on the R0–6A lead and when the write sync pulse on the —WS lead occurs. The end of a dial pulse during the first quarter revolution of magnetic drum MD is detected when the subscriber's loop to the sender associated with register space No. 1 is closed at the completion of the first quarter revolution of magnetic drum MD and was open at the start of the first quarter revolution. Therefore, if the loop is closed, the R1S lead applied to input C of AND gate —&—W16E when slot 9 of register space No. 40 passes under the main read-write heads will cause the actuation of AND gate —&—W16E. This will apply an active signal on the W16E lead which extends to input A of AND gate —&—EPSA. If a dial pulse has ended in the past one-quarter revolution of magnetic drum MD as evidenced by a closed loop condition on the present scan, the condition of the loop one-quarter revolution earlier will be open. This open loop condition will be evidenced by an active signal on the R0–6A lead which is made active when the auxiliary head HD6A reads a 0 in the S0 cell in slot 12 of register space No. 1. As shown in FIG. 28, the R0–6A lead is connected to input B of AND gate —&—EPSA. Upon the occurrence of the write sync pulse on the —WS lead, AND gate —&—EPSA will be actuated if a dial pulse has ended. The actuation of this AND gate will in turn cause the actuation of OR gate —OR–EPS shown in FIG. 28 which in turn will apply an active signal condition to set pulse memory flip-flop PMFF–EP to its 1 or "set" condition. With pulse memory flip-flop PMFF–EP set to its one condition an active signal condition will be applied to the EP lead through transmission gate TG–EP and transmission pulse amplifier PAT-EP.

In the event that no dial pulse has ended and that the subscriber's loop remains open when the scan of the sender associated with register space No. 1 is made in slot 9 of register space No. 40, the R0S lead from the scanner will be active and, hence, AND gate —&—W16E will not be actuated. Therefore, AND gate —&—EPSA and OR gate —OR–EPS will not be actuated to set pulse memory flip-flop PMFF–EP to its 1 condition and this flip-flop will remain normal or unoperated. With pulse memory flip-flop PMFF–EP normal or unoperated, an active signal condition will be applied from its 0 output through transmission gate TG–EP' and transmission pulse amplifier PAT-EP' to lead EP'.

One slot later, that is, when slot 10 of register space No. 40 passes under the main read-write heads, if pulse memory flip-flop PMFF–EP is set, a 1 is recorded in cell EP3 in track 6 slot 10 of register space No. 40. Referring to FIG. 27, AND gate —&—W16D will be actuated when an active signal is applied over the R0–6 lead which occurs when a 0 is read in the EP3 cell in slot 10 track 6 of register space No. 40, when an active signal is applied over the EP lead which is active, as described above, when pulse memory flip-flop PMFF–EP is set and when a sync pulse occurs on the —WS write sync lead during the time slot 10 of register space No. 40 is passing under the main read-write heads. The actuation of AND gate —&—W16D in this manner applies an active signal over the W16D lead to input D of OR gate —OR–W16. The actuation of OR gate —OR–W16 in the manner described previously causes a 1 to be written in the EP3 cell in track 6 slot 10 of register space No. 40.

In the event that a dial pulse did not end during the first quarter revolution of magnetic drum MD and pulse memory flip-flop PMFF–EP is not set, a 0 will be written in the EP3 cell in slot 10 track 6 of register space No. 40. Referring to FIG. 27, AND gate —&-W06E will be actuated when an active signal is applied to its input A on the L10 lead, to its input B over the EP' lead which is active when pulse memory flip-flop PMFF–EP is normal, to its input C over the R1–6 lead which is active when a 1 is read in track 6 slot 10 of register space No. 40 and on the —WS write sync lead. The actuation of AND gate —&—W06E in this manner causes an active signal to be applied over the W06D lead to input D of OR gate —OR–W06. The actuation of OR gate —OR–W06 in the manner described previously causes a 0 to be written in the EP3 cell in track 6 slot 10 of register space No. 40.

Now that information concerning the completion or not of a dial pulse during the first quarter revolution of magnetic drum MD has been taken from pulse memory flip-flop PMFF–EP shown in FIG. 28 and recorded in the EP3 cell in track 6 slot 10 of register space No. 40, pulse memory flip-flop PMFF–EP may be restored to normal (if operated) in preparation of the second quarter revolution of magnetic drum MD. When slot 11 of register space No. 40 passes under the main read-write heads on magnetic drum, MD, AND gate —&—EPR11 shown in FIG. 28 will be actuated which in turn will cause the actuation of OR gate —OR–EPR. The actuation of OR gate —OR–EPR in turn will apply an active signal to the resetting input of pulse memory flip-flop PMFF–EP, resetting this flip-flop to normal.

After the second quarter revolution of magnetic drum MD, the sender associated with register space No. 1 is scanned a second time. In the manner described hereinbefore, this scanning takes place during the passage of slot 6 of register space No. 79 under the main read-write heads. While slot 6 of register space No. 79 is under the main read-write heads, the S3 cell in slot 9 of register space No. 40 is under the auxiliary head HD6A. The condition of the subscriber's loop to the sender associated with register space No. 1 is again determined and active signals are applied over the R1S and R0S leads to AND gates —&—W16E and —&—W06F, respectively, shown in FIG. 28. These AND gates will be actuated in the manner described previously to cause a 1 or 0 to be recorded in the S2 cell in track 6 slot 6 of register space No. 79 to indicate the present condition of the subscriber's loop to the sender associated with register space No. 1. A comparison is made between the present condition of the subscriber's loop as recorded in the S2 cell in track 6 slot 6 of register space No. 79 and the condition of the loop one-quarter revolution earlier as recorded in the S3 cell in slot 9 track 6 of register space No. 40. This comparison is made in AND gate —&—EPSA in the manner described above. If a dial pulse has ended during the second one-quarter revolution of magnetic drum MD, pulse memory flip-flop PMFF–EP shown in FIG. 28 is set to its 1 condition.

When slot 7 of register space No. 79 passes under the main read-write heads, a 1 will be recorded in the EP2 cell in track 6 slot 7 of register space No. 79 if a dial pulse has ended during the second quarter revolution of magnetic drum MD as evidenced by pulse memory flip-flop PMFF–EP being set to its 1 condition. This is accomplished by AND gate —&—W16D and OR gate —OR–W16 shown in FIG. 27 in the same manner as the 1 was recorded in the EP3 cell in slot 10 track 6 of register space No. 40 described above. If a dial pulse ended during the first quarter revolution of magnetic drum MD as evidenced by a 1 being recorded in the EP3 cell in slot 10 track 6 of register space No. 40, a dial pulse cannot end, due to time considerations as explained hereinbefore, in the second quarter revolution of the magnetic drum. If this is the situation, a 1 will still be recorded in the EP2 cell in slot 7 track 6 of register space No. 79 to indicate that one dial pulse ended during the first half revolution of magnetic drum MD. Referring to FIG. 27, input A of OR gate —OR–EP16A is connected to the R1–6A lead. Therefore, if a 1 is read in the EP3 cell in track 6 slot 10 of register space No. 40 by auxiliary head HD6A, the R1–6A lead will be active. The active signal on this lead will cause the actuation of OR gate —OR–EP16A which in turn will apply an active signal condition on input B of AND gate —&—W16B shown in FIG. 27. As shown in FIG. 27, input A of AND gate —&—W16B is connected to the output of OR gate —OR–L47. The inputs to this OR gate are connected to the L4 and L7 leads and therefore the OR gate will be actuated when slot 7 of register space No. 79 is passing under the main read-write heads. The actuation of OR gate —OR–L47 will cause an active signal to be applied to input A of AND gate —&—W16B. Input C of AND gate —&—W16B is connected to the R0–6 lead which will be active when a 0 is read in the EP2 cell in track 6 slot 7 of register space No. 79. Input D of AND gate —&—W16B is connected to the –WS write sync lead. Accordingly, AND gate —&—W16B will be actuated when slot 7 of register space No. 79 passes under the main read-write heads if a 0 is read in the EP2 cell in slot 7 track 6 of register space No. 79 and if a 1 is read in the EP3 cell in slot 10 track 6 of register space No. 40 by auxiliary head HD6A. The actuation of AND gate —&—W16B applies an active signal over the W16B lead to input B of OR gate —OR–W16. The actuation of OR gate —OR–W16 applies an active signal over the W1–6 lead extending via cable 6 to the writing amplifier circuits associated with track 6 on magnetic drum MD to cause a 1 to be written in the EP2 cell in track 6 slot 7 of register space No. 79. The second condition described above for which a 1 is written in the EP2 cell in slot 7 track 6 of register space No. 79 may not coexist with the first condition described above because of time considerations. In other words, a pulse cannot end in the quarter revolution preceding the one just described and in the present quarter revolution.

In the event that a pulse did not end in the second quarter revolution of magnetic drum MD and a pulse had not ended in the first quarter revolution of magnetic drum MD, a 0 will be written in the EP2 cell of track 6 slot 7 of register space No. 79. Referring to FIG. 27, it will be observed that AND gate —&—W06C will be actuated when an active signal is applied to input A thereof from the output of OR gate —OR–L47 as slot 7 of register space No. 79 passes under the main read-write heads, when an active signal is applied to input B thereof over the –WS write sync lead, when an active signal is applied to input C thereof over the R0–6A lead, when an active signal is applied to input D thereof over the R1–6 lead and when an active signal is applied to the EP' lead connected to input E thereof. If a pulse did not end in the second quarter revolution of magnetic drum MD, pulse memory flip-flop PMFF–EP shown in FIG. 28 will be normal and lead EP' will be active. If no pulse was completed in the first quarter revolution of magnetic drum MD, a 0 will be read in the EP3 cell in slot 10 track 6 of register space No. 40 by auxiliary reading head HD6A and an active signal will be applied to the R0–6A lead. If a 1 is read in the EP2 cell in track 6 slot 7 of register space No. 79, lead R1–6 will be active. Therefore, AND gate —&—W06C will be actuated to apply an active signal over the W06B lead to input B of OR gate —OR–W06. The actuation of OR gate —OR–W06 will cause an active signal to be applied over the W0–6 lead extending via cable 6 to the writing amplifier circuits associated with magnetic drum MD to cause a 0 to be written in the EP2 cell in track 6 slot 7 of register space No. 79.

Magnetic drum MD now rotates until slot 8 of register space No. 79 is passing under the magnetic heads. When this occurs, pulse memory flip-flop PMFF–EP shown in FIG. 28 will be reset to normal if it is operated. As shown in FIG. 28, AND gate —&—EPR8 will be actuated when slot 8 of register space No. 79 is passing under the main read-write heads. The actuation of AND gate —&—EPR8 will in turn cause the actuation of OR gate —OR–EPR. The actuation of OR gate —OR–EPR will in turn apply an active signal to the resetting input of pulse memory flip-flop PMFF–EP, resetting this flip-flop to normal.

Magnetic drum MD now rotates through its third quarter revolution until cell S1 in slot 3 track 6 of register space No. 118 is under the main read-write heads. At this time, cell S2 in slot 6 track 6 of register space No. 79 will be under the auxiliary reading head HD6A. The third scan of the subscriber's loop connected to the sender associated with register space No. 1 is made and active signals are applied over the R1S or R0S leads to AND gates —&—W16E or —&—W06F, respectively, shown in FIG. 28. These AND gates will be actuated in the manner previously described to cause a 1 or 0 representing the present condition of the subscriber's loop to be recorded in Cell S1 in slot 3 track 6 of register space No. 118. Again, a comparison is made between the present condition of the subscriber's loop as evidenced by the scanner leads and the condition of the subscriber's loop one-quarter revolution previously as determined by reading the S2 cell in track 6 slot 6 of register space No. 79. If a dial pulse has ended in the third quarter revolution, pulse memory flip-flop PMFF–EP shown in FIG. 28 is set in the manner described previously. When the next slot passes under the main read-write heads, that is, slot 4 of register space No. 118, there are again two possible conditions which necessitate writing a 1 in the EP1 cell in track 6 slot 4 of register space No. 118. The first condition is if pulse memory flip-flop PMFF–EP has been set to indicate that a dial pulse has ended in the third quarter revolution of the drum and the second, a 1 is read by auxiliary reading head HD6A in the EP2 cell in track 6 slot 7 of register space No. 79, indicating that a dial pulse had ended during the first half revolution of magnetic drum MD. If either of these conditions is present (and only one may be present due again to time considerations), a 1 is written in the EP1 cell in slot 4 track 6 of register space No. 118. This 1 is written in the EP1 cell in the manner described above. Pulse memory flip-flop PMFF–EP will be reset to normal if it is operated when slot 5 of register space No. 118 passes under the main read-write heads. Referring to FIG. 28, it will be observed that AND gate —&—EPR5 will be actuated when slot 5 of the register space No. 118 passes under the main read-write heads. The actuation of the AND gate in turn causes the actuation of OR gate —OR–EPR which applies an active signal condition to the resetting input of pulse memory flip-flop PMFF–EP. Magnetic drum MD now makes its final quarter revolution.

As slot 14 of register space No. 156 appears under the main heads, the fourth scan (the home scan) of the sender associated with register space No. 1 is made as described above. The subscriber's loop condition as determined from this scan is recorded in pulse memory flip-flop PMFF-S in the manner described before. This will be used one slot later in slot 1 of register space No. 1. During the scan of the sender associated with register space No. 1 while slot 14 of register space No. 156 is passing under the main read-write heads, auxiliary head HD6A is reading the condition of the subscriber's loop one-quarter revolution earlier, or, at the end of the third quarter revolution of magnetic drum MD as recorded in the S1 cell of slot 3 track 6 of register space No. 118. No comparison between the present condition of the subscriber's loop and the condition one-quarter revolution earlier is made at this time. Instead, the information from cell S1 in slot 3 track 6 of register space No. 118 is recorded in pulse memory flip-flop PMFF-EP shown in FIG. 28. Referring to FIG. 28, AND gate —&—EPSB will be actuated when an active signal is applied to its input A over the —WS write sync lead, when a 1 is read in the S1 cell in slot 3 track 6 of register space No. 118 by auxiliary reading head HD6A to apply an active signal over the R1-6A lead and when slot 14 of a register space is passing under the main read-write heads. The actuation of AND gate —&—EPSB will in turn cause the actuation of OR gate —OR-EPS and the actuation of this OR gate will in turn cause pulse memory flip-flop PMFF-EP to be set to its 1 condition.

When slot 1 of register No. 1 appears under the main read-write heads (the home pass of register space No. 1), auxiliary head HD6A is reading the information recorded in the EP1 cell in slot 4 track 6 of register space No. 118. As indicated above a 1 will be read if a dial pulse ended during the first three-quarters revolution of magnetic drum MD and a 0 will be read if no dial pulses ended during the interval. The revolution of magnetic drum MD is completed and the information obtained during this complete revolution is as follows:

(1) Present condition of the subscriber's loop connected to the sender associated with register space No. 1 as evidenced by the setting of pulse memory flip-flop PMFF-S shown in FIG. 27.

(2) Condition of the subscriber's loop one-quarter revolution earlier as set in pulse memory flip-flop PMFF-EP shown in FIG. 28.

(3) Condition of the subscriber's loop one complete revolution earlier as is evidenced by a 1 or 0 recorded in the LR cell in slot 6 track 6 of register space No. 1.

(4) Absence or presence of a dial pulse in the first three-quarters of the previous revolution as evidenced by a 0 or a 1 appearing in cell EP1 of track 6 slot 4 of register space No. 118 and available over the R0-6A or R1-6A leads from the output of auxiliary head HD6A.

With the above information available when slot 1 of a register space is passing under the main read-write heads, it is possible through the logic circuitry to determine whether dial pulses have ended during the last revolution and if so whether there were one or two pulses. The operation of this logic circuitry will be described below. Pulse memory flip-flop PMFF-EP shown in FIG. 28 will be reset to normal if it is operated when slot 2 of register space No. 1 passes under the main read-write heads. Referring to FIG. 28, it will be observed that AND gate —&—EPR2 will be actuated when slot 2 of register space No. 1 passes under the main read-write heads. The actuation of this AND gate in turn operates OR gate —OR-EPR which applies an active signal condition to the resetting input of pulse memory flip-flop PMFF-EP.

With dial pulses now quantitatively detectable, provision is made in the logic circuitry of the register space control circuit for the proper registration of the digits represented by these dial pulses in the register spaces on magnetic drum MD as will be described hereinafter. In addition to the conditions representing the completion of one or two dial pulses as described above which are present when slot 1 of a register space is passing under the main magnetic read-write heads, other conditions will also be available as will be described. These conditions include information relating to interdigital timeouts and sender releases. All of the above conditions, that is, completion of dial pulses, interdigital timeouts and sender release timing, cause the operation of a group of three pulse memory flip-flops designated PMFF-C1, PMFF-C2 and PMFF-C3 shown in FIG. 29. These pulse memory flip-flops with their associated transmission gates TG-C1, TG-C1', TG-C2, TG-C2', TG-C3 and TG-C3' and their associated transmission pulse amplifiers PAT-C1, PAT-C1', PAT-C2, PAT-C2', PAT-C3 and PAT-C3, cause active signal conditions to be applied to leads C1, C1', C2, C2', C3 and C3' of cable 7 shown in FIG. 29. These pulse memory flip-flops will be operated in various combinations to provide various combinations of active signal conditions on the C-leads. The table of conditions and combinations is as follows:

| PMFF Combination Interpretation | State of Pulse Memory Flip-Flop | | |
|---|---|---|---|
| | C1 | C2 | C3 |
| Normal State | 0 | 0 | 0 |
| Sender Release | 0 | 0 | 1 |
| 2 dial pulses have ended during last revolution | 0 | 1 | 0 |
| 1 dial pulse has ended during last revolution | 1 | 0 | 0 |
| Interdigital timeout | 1 | 0 | 1 |
| Dial pulse has begun only during last revolution | 1 | 1 | 0 |

Figure 29:
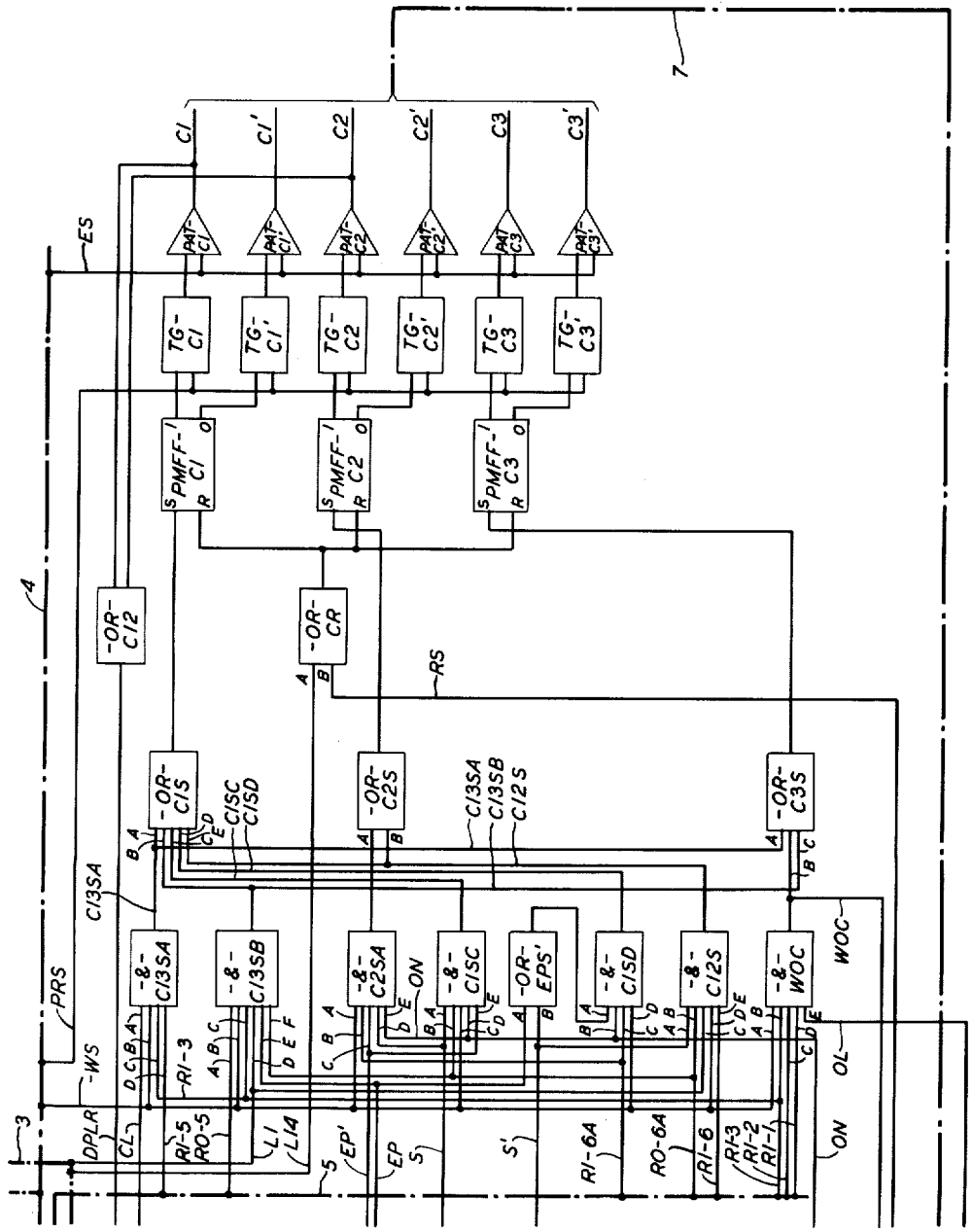
FIG. 29 shows in block diagram form an additional portion of the register space control circuit of the present invention and includes three pulse memory flip-flops which are operated in combination to provide indications of the completion of dial pulses, sender releases and interdigital timeouts.

If one dial pulse has ended during the preceding revolution, it will be noted by reference to the above table and to FIG. 29 that pulse memory flip-flop PMFF-C1 is the only flip-flop operated and, accordingly, leads C1, C2' and C3' will have an active signal condition applied thereto. Similarly, if two dial pulses have ended during the last revolution, pulse memory flip-flop PMFF-C2 alone will be operated. Again referring to FIG. 29, it will be noted that leads C1', C2 and C3' will be active. From the above table, it will be noted that if a dial pulse has begun only during the last revolution, both pulse memory flip-flops PMFF-C1 and PMFF-C2 will be operated and leads C1, C2 and C3' will be active.

*Digit Registration*

With active signal conditions applied to the C1, C2, C3, C1', C2' and C3' leads of cable 7 as described above through the operation of the three pulse memory flip-flops shown in FIG. 29, indicating the detection of dial pulses (either one or two during the preceding revolution of magnetic drum MD), the logic circuitry of the register space control circuit will be actuated to record the dial pulses in the digit registers of a register space, as shown in FIG. 3. The pulses of the first digit are recorded in the first digit register, the pulses of the second digit are recorded in the second digit register, et cetera. The interdigital period between the pulses of the first digit, the second digit and succeeding digits will be detected in the manner described hereinafter by the interdigital timing circuitry in the register space control circuit. When the end of a pulse is detected and active signal conditions are applied to the C-leads of cable 7 from the outputs of the pulse memory flip-flops PMFF-C1 through PMFF-C3 shown in FIG. 29, the register space control circuit looks for the first digit register of the register space in which a 0 is recorded in the digit dialed cell in track 5. In other words, if the pulses received are for the first digit, the first 0 encountered in track 5 as the register space passes under the magnetic heads will be the 0 in slot 4 associated with the first digit register. In the manner described hereinafter, when all of the pulses of the first digit have been received and an interdigital timeout is detected, a 1 will be recorded in the digit dialed cell of the appropriate register. The manner in which the pulse memory flip-flops PMFF–C1 through PMFF–C3 are operated in accordance with the conditions indicating the completion of one or two dial pulses will now be described.

Returning again to the example previously utilized, if, as a result of the four scans of the sender associated with register space No. 1 during the preceding revolution of magnetic drum MD, only one dial pulse was detected, pulse memory flip-flop PMFF–C1 shown in FIG. 29 is set as indicated hereinbefore. Referring to FIG. 29, it will be noted that input A of AND gate —&—C1SC is connected to lead S which extends to the output of pulse memory flip-flop PMFF–S shown in FIG. 27. The S lead will have an active signal thereon if the subscriber's loop to the sender associated with the register space No. 1 is closed. Input B of AND gate —&—C1SC is connected to the R0–6A lead which will be active when a 0 is read in the EP1 cell in track 6 slot 4 of register space No. 118 by auxiliary reading head HD6A. As indicated above, a 0 in the EP1 cell indicates that a dial pulse did not end during the first three-quarters of the previous revolution of magnetic drum MD. Input C of AND gate —&—C1SC is connected to the –WS write sync lead and input D is connected to the ON lead which, as indicated hereinbefore, will be active when the register space is marked off normal. Input E of AND gate —&—C1SC is connected to the EP' lead which, as indicated above, will be active when the subscriber's loop to the sender associated with register space No. 1 in the illustrative example was open one-quarter revolution earlier. The closed loop condition of the subscriber's loop as evidenced by the active signal on the S lead and the open loop condition one-quarter revolution earlier as evidenced by the active signal on the EP' lead indicates the completion of a dial pulse during the immediately preceding one-quarter revolution of magnetic drum MD. AND gate —&—C1SC will therefore be actuated to apply an active signal over the C1SC lead to input C of OR gate —OR–C1S. The actuation of OR gate —OR–C1S will in turn apply an active signal to the set input of pulse memory flip-flop PMFF–C1 setting this flip-flop to its 1 condition.

In the event that the dial pulse which ended in the preceding revolution of magnetic drum MD ended during the first three-quarters of this drum revolution, a 1 will be recorded in the EP1 cell in track 6 slot 4 of register space No. 118 as described hereinbefore. The reading of a 1 in this cell will cause an active signal to be applied to the R1–6A lead. In the event that only one dial pulse ended during the preceding revolution and this dial pulse ended during the first three-quarters of this revolution, and the subscriber's loop one-quarter revolution earlier was closed as evidenced by an active signal on the EP lead, AND gate —&—C1SD shown in FIG. 29 will be actuated. As shown in FIG. 29, input A of AND gate —&—C1SD is connected to the output of OR gate —OR–EPS'. Therefore, if the subscriber's loop one-quarter revolution earlier was closed (lead EP active) or if the subscriber's loop is now open (lead S' active), OR gate —OR–EPS' will be actuated to apply an active signal to input A of AND gate —&—C1SD. Active signals on either of these leads precludes the possibility of two dial pulses having ended during the preceding revolution. Input B of AND gate —&—C1SD is connected to the ON lead which will be active as indicated hereinbefore when the register space is off normal. Input C of AND gate —&—C1SD is connected to the R1–6A lead which will be active when a 1 is read in the EP1 cell of register space No. 118, as indicated above, indicating a dial pulse ended during the first three-quarters of the last revolution and input D of AND gate —&—C1SD is connected to the –WS write sync lead. The actuation of AND gate —&—C1SD will apply an active signal over lead C1SD to input D or OR gate —OR–C1S which in turn will apply an active signal to the setting input of pulse memory flip-flop PMFF–C1, setting this flip-flop to its 1 condition. With pulse memory flip-flop PMFF–C1 set and pulse memory flip-flops PMFF–C2 and PMFF–C3 normal, active signals will be applied to the C1, C2' and C3' leads of cable 7 which extend to FIGS. 30 and 31 of the register space control circuit where these signals control the logic circuits as described hereinafter to record a 1 in the appropriate digit register of register space No. 1.

If, as a result of the four scans of the sender associated with register space No. 1 during the preceding revolution of magnetic drum MD, two dial pulses were detected, pulse memory flip-flop PMFF–C2 shown in FIG. 29 is set when slot 1 register space No. 1 is passing under the magnetic heads. Referring to FIG. 29, input A of AND gate —&—C2SA is connected to the –WS write sync lead and input B is connected to the R1–6A lead. Lead R1–6A will be active if a 1 is read in the EP1 cell in slot 4 track 6 of register space No. 118. A 1 recorded in this cell gives an indication that a dial pulse has ended during the first three-quarter revolution of magnetic drum MD. Input C of AND gate —&—C2SA is connected to the EP' lead which, as indicated hereinbefore, will be active when pulse memory flip-flop PMFF–EP shown in FIG. 28 is normal. As described above, when slot 1 of register space No. 1 is passing under the main read-write heads, pulse memory flip-flop PMFF–EP will be set in accordance with the condition of the subscriber's loop one-quarter revolution earlier. Therefore, if EP' lead from the output of this flip-flop is active, the subscriber's loop one-quarter revolution earlier was open. Input D of AND gate —&—C2SA is connected to the S lead which, as indicated above, will be active when the subscriber's loop to the sender associated with register space No. 1 was closed at the completion of the preceding revolution of magnetic drum MD. The EP' lead being active and lead S being active gives an indication that the subscriber's loop closed for the second time during the preceding revolution thus giving an indication of the completion of two dial pulses. Input E of AND gate —&—C2SA is connected to the ON lead which will be active, as indicated hereinbefore, when the register space is marked off-normal. The actuation of AND gate —&—C2SA in this manner in turn causes the actuation of OR gate —OR–C2S which in turn will apply an active signal condition to the set input of pulse memory flip-flop PMFF–C2, setting this flip-flop to its 1 condition.

With pulse memory flip-flop PMFF–C2 alone set, active signal conditions will be applied to leads C1', C2 and C3' of cable 7 which extend to the logic circuitry of the register space control circuit shown in FIGS. 30 and 31.

In the event that no dial pulse ended during the previous revolution but only started, pulse memory flip-flops PMFF–C1 and PMFF–C2 will both be actuated to their 1 condition. Referring to FIG. 29, AND gate —&—C12S controls the simultaneous operation of pulse memory flip-flops PMFF–C1 and PMFF–C2. As shown in FIG. 29, input A of AND gate —&—C12S is connected to the S' lead. This lead will be active if the condition of the subscriber's loop is presently open. Input B of AND gate —&—C12S is connected to the R0–6A lead which will be active when a 0 is read in the EP1 cell in slot 4 track 6 of register space No. 118 indicating that a dial pulse had not ended during the first three-quarters of the preceding revolution of magnetic drum MD. Input C of AND gate —&—C12S is connected to lead L1 and will be active when slot 1 of register space No. 1 in the assumed example is passing under the main read-write heads. Input D of AND gate —&—C12S is connected to the –WS write sync lead and input E of AND gate —&—C12S is connected to the R1–6 lead which will be active when a 1 is read in the LR cell in slot 1 track 6 of register space No. 1 indicating that on the previous revolution of magnetic drum MD, the subscriber's loop was closed. Therefore, if the subscriber's loop was closed at the beginning of the previous revolution and no dial pulse was completed during the first three-quarters of the revolution and the subscriber's loop is now open, a dial pulse has begun but has not ended and, accordingly, AND gate —&—C12S will be actuated. The actuation of this AND gate will apply an active signal over lead C12S to input B of OR gate —OR–C2S and input E of OR gate —OR–C1S. The actuation of these OR gates will in turn apply active signals to the setting inputs of pulse memory flip-flops PMFF–C2 and PMFF–C1, respectively. The setting of these flip-flops will cause active signals to be applied from the output of the three pulse memory flip-flops shown in FIG. 29 to leads C1, C2 and C3' of cable 7.

When it is determined that one dial pulse ended during the previous revolution of magnetic drum MD, the active signals on leads C1, C2' and C3' will be combined in AND gate —&—1DP shown in FIG. 30 with an active signal on the IDL lead. As shown in FIG. 30, lead IDL is fed from the output of AND gate —&—IDL and input A of AND gate —&—IDL is connected to the R0–5 lead which will be active when a 0 is read in track 5. Input B of AND gate —&—IDL is connected to the output of OR gate —OR–L4–14. The inputs of OR gate —OR–L4–14 are connected to the outputs, respectively, of OR gate —OR–L4–11 and AND gates —&—L12RS, —&—L13RS and —&—L14RS. It will be observed by referring to FIG. 30, that the inputs of OR gate —OR–L4–11 are connected, respectively, to the outputs of AND gates —&—L4RS through —&—L11RS. Assume, for example, that the first dial pulse detected is the first pulse of the first digit, accordingly a count of one should be recorded in the first digit register in slot 4 of register space No. 1 (returning again to the assumed example). When slot 4 of register space No. 1 passes under the main magnetic read-write heads, AND gate —&—L4RS will be actuated by the active signal on the L4 and the –RS read sync leads. The actuation of AND gate —&—L4RS will in turn cause the actuation of OR gate —OR–L4–11. The actuation of OR gate —OR–L4–11 will in turn cause the actuation of OR gate —OR–L4–14. The actuation of OR gate —OR–L4–14 will apply an active signal to input B of AND gate —&—IDL. If a 0 is read in track 5 slot 4 of register space No. 1, the active signal on the R0–5 lead applied to input A of AND gate —&—IDL will cause the actuation of this AND gate which in turn will apply an active signal condition to the IDL lead. The active signal condition on the IDL lead will be combined with the active signal conditions on the C1, C2' and C3' leads in AND gate —&—1DP. The actuation of AND gate —&—1DP will apply an active signal condition to the +1 lead which extends to the inputs of AND gates —&—W14A and —&—W04C shown in FIG. 31. If a 0 is read in track 4 slot 4 of register space No. 1, AND gate —&—W14A will be actuated by an active signal condition on the R0–4 lead, the –WS write sync lead and the +1 lead. The actuation of this AND gate will in turn apply an active signal over the W14A lead to input A of OR gate —OR–W14 shown in FIG. 27. The actuation of OR gate —OR–W14 will in turn apply an active signal over the W1–4 lead extending via cable 6 to the writing amplifier circuits associated with track 4 of magnetic drum MD and will cause a 1 to be written in track 4 slot 4 of the first digit register of register space No. 1.

The active signal on the C1 lead when one dial pulse is detected during the previous revolution of magnetic drum MD will also cause the actuation of OR gate —OR–C12 shown in FIG. 29. The actuation of this OR gate will in turn apply an active signal over the DPLR lead which extends to input C of AND gate —&—CRS shown in FIG. 30. The active signal on the DPLR lead is combined in AND gate —&—CRS with the active signal on the IDL lead applied to input B and the –WS write sync lead applied to input A to cause the actuation of AND gate —&—CRS. The actuation of AND gate —&—CRS will apply an active signal over the RS lead which extends to input B of OR gate —OR–CR shown in FIG. 29. The actuation of OR gate —OR–CR applies an active signal condition to the resetting input of all three pulse memory flip-flops PMFF–C1 through PMFF–C3 shown in FIG. 29, thus resetting these flip-flops to normal.

Referring again to AND gate —&—W14A shown in FIG. 31 and OR gate —OR–W14 shown in FIG. 27, these two gates together with AND gates —&—W04C, —&—W13A, —&—W03A, —&—W12A, —&—W02A, —&—W11A, —&—W01A and OR gates —OR–W04, —OR–W13, —OR–W03, —OR–W12, —OR–W02, —OR–W11 and —OR–W10, shown in FIG. 31, comprise the gates which control the recording of the number of dial pulses detected in the digit registers of the register spaces. It will be remembered from the previous description of the timer cells that a portion of these gates were utilized to control the recording of the number of revolutions between changes of state of the subscriber's loop in the timer cells in slot 1 of the register spaces. The manner in which the gates control the recording of detected dial pulses in the digit register cells is identical to that described for the timing function. These gates utilize the existing count in any register to form a new binary number which is one count higher than the number previously registered (two counts higher if two dial pulses are detected during the preceding revolution of magnetic drum MD). The same gates are used with all of the digit registers of all of the register spaces. Carries are effected logically. Whenever an attempt is made to write in a track already containing a 1, a write 0 gate is activated and a carry signal is transferred into the gates controlling the next column.

Assume that at the completion of a revolution of magnetic drum MD the second dial pulse of the first digit is detected. In this event, AND gate —&—L4RS shown in FIG. 30 will be actuated, OR gates —OR–L4–11 and —OR–L4–14 will again be actuated and AND gate —&—IDL will again be actuated because a 0 will still be read in the digit dialed cell in track 5 of slot 4 of register space No. 1. The active signal on the IDL lead will in turn be combined with the active signals on the C1, C2' and C3' leads in AND gate —&—1DP and once again an active signal pulse will be applied to the +1 lead which extends to inputs of AND gates —&—W14A and —&—W04C shown in FIG. 31. This time, however, a 1 will be read in the digit register cell in track 4 slot 4 of register space No. 1 and the R1–4 lead will be active. The active signal on the R1–4 lead will be combined with the active signal from the +1 lead in AND gate —&—W04C. The actuation of AND gate —&—W04C will in turn cause the actuation of OR gate —OR–W04 which will apply an active signal over the W0–4 lead extending via cable 6 to the writing amplifier circuits associated with track 4 to cause a 0 to be written in track 4. The actuation of AND gate —&—W04C will also apply an active signal to input A of OR gate —OR–W10A. The actuation of OR gate —OR–W10A will in turn apply an active signal over lead W10A to an input of AND gates —&—W13A and —&—W03A. Because a 0 will be read in track 3 slot 4 of the first digit register of register space No. 1, the R0–3 lead will be active and AND gate —&—W13A will be actuated. The actuation of AND gate —&—W13A will in turn cause the actuation of OR gate —OR–W13 to apply an active signal over the W1–3 lead extending via cable 6 to the writing amplifier circuits associated with track 3 on magnetic drum MD to cause a 1 to be written in track 3 slot 4 of the first digit register in register space No. 1. As long as single dial pulses are detected on each successive revolution of magnetic drum MD, the AND gates shown in FIG. 31 will be actuated in the manner described above to add a count of 1 at the completion of each revolution.

In the event that two dial pulses are detected during a particular revolution of magnetic drum MD, leads C1', C2 and C3' in cable 7 from the output of the pulse memory flip-flops PMFF–C1, PMFF–C2 and PMFF–C3, shown in FIG. 29 will be active as indicated above. The active signals on the C1' and C2 leads will be combined with the active signal on the IDL lead in AND gate —&—2DP shown in FIG. 30. The actuation of this AND gate will apply an active signal over the +2 lead which extends to input B of OR gate —OR–W01A shown in FIG. 31. Assume, for example, that two dial pulses have been previously recorded in the first digit register of register space No. 1, thus making the count in the cells 1 through 4, respectively, read 0010. The active signal on the +2 lead will cause the actuation or OR gate —OR–W01A. The actuation of this OR gate will apply an active signal over the W01A lead to the inputs of AND gates —&—W13A and —&—W03A. As described above, a 1 is recorded in track 3 and therefore the R1–3 lead will be active. This will cause the actuation of AND gate —&—W03A which in turn will apply an active signal to actuate OR gate —OR–W03. The actuation of OR gate —OR–W03 will in turn apply an active signal over the W0–3 lead extending via cable 6 to the writing amplifier circuits associated with track 3 of magnetic drum MD. The actuation of AND gate —&—W03A as described above will also apply an active signal to an input of AND gates —&—W12A and —&—W02A. Under the assumed example, a 0 will be read in track 2 slot 4 of the first digit register in register space No. 1 and the R0–2 lead will be active. The active signal on the R0–2 lead will in turn cause the actuation of AND gate —&—W12A. The actuation of this AND gate will in turn cause the actuation of OR gate —OR–W12 to apply an active signal over the W1–2 lead extending via cable 6 to the writing amplifier circuits associated with track 2 on magnetic drum MD to cause a 1 to be written in track 2 slot 4 of the first digit register of register space No. 1. After completion of the above operation, the count recorded in the first digit register cells in tracks 1 through 4 of slot 4 will read 0100 and it will be noted that this count in binary code is an addition of two to that previously recorded in the digit register. The actuation of AND gate —&—IDL shown in FIG. 30 in addition to controlling the actuation of AND gates —&—1DP and —&—2DP and the recording of the detected dial pulses in the appropriate digit registers of the register spaces, also causes the actuation of AND gate —&—CRS shown in FIG. 30 in the manner described above to apply an active signal over the RS lead to reset the pulse memory flip-flops PMFF–C1 and PMFF–C2 when operated.

In the event that a dial pulse started but did not end in the previous revolution, pulse memory flip-flops PMFF–C1 and PMFF–C2 in FIG. 29 will be operated as described above. The active signals on the C1, C2 and C3' leads will not actuate any of the AND gates shown in FIG. 30 to add an additional count to the digit register in which the pulses are being counted. No further action in the circuit takes place until slot 14 in the register space passes under the magnetic heads at which time an active signal on the L14 lead applied to input A of OR gate —OR–CR shown in FIG. 29 will cause the actuation of this OR gate which in turn will apply an active signal to the resetting input of the pulse memory flip-flops PMFF–C1, PMFF–C2, and PMFF–C3, preparing these flip-flops for operation in accordance with the conditions for other register spaces.

As will be described hereinafter, when an interdigital interval is detected indicating the completion of the pulses of a particular digit, a 1 will be written in the digit dialed cell in track 5 of the register space associated with the particular digit register in which the previous dial pulses were recorded. Thereafter, successively received dial pulses will be counted and recorded in the first succeeding digit register in which a 0 is written in the digit dialed cell. For example, after the pulses of the first digit have been received and the first interdigital interval is detected, a 1 will be written in the digit dialed cell in track 5 slot 4 of register space No. 1. Thereafter, the next dial pulses received will cause the actuation of AND gate —&—L5RS, OR gate —OR–L4–11, OR gate —OR–L4–14 and AND gate —&—IDL shown in FIG. 30 when slot 5 of the register space is passing under the main magnetic heads and the AND gate —&—1DP if one pulse is detected or the AND gate —&—2DP shown in FIG. 30 if two pulses will be actuated by an active signal on the IDL lead to count the pulses of the second digit in the second digit register. It will be noted that AND gate —&—IDL is actuated only when a 0 is read in track 5 of a register space. In this manner, the pulses of the appropriate digits are steered into the appropriate digit registers.

*Interdigital Timing*

When dial pulses cease, the state of the subscriber's loop remains unchanged, that is, closed, and the revolutions of magnetic drum MD are counted on the timer cells in slot 1 of the register space. In the illustrative embodiment of the present invention, closed loop intervals of greater than 88 milliseconds are classified as interdigital timeouts. These interdigital timeouts may last up to a maximum of 121 milliseconds. It is important to detect interdigital timeouts within these limits because the first pulse of a succeeding digit might be received and if the interdigital timeout has not been detected a false count for the succeeding digit will be recorded. It will be noted that under the assumed operating speed of magnetic drum MD two drum revolutions are completed in 88 milliseconds and the third drum revolution will not be completed until 132 milliseconds have elapsed, hence means must be provided for detecting interdigital timeouts at the completion of two and three-quarters drum revolutions.

For the purpose of interdigital timing as will be described hereinafter, it is advantageous to know the location of the last dial pulse, in other words whether this dial pulse ended during the first three-quarters of the last revolution of magnetic drum MD or whether it ended in the last one-quarter of the last revolution of magnetic drum MD. If the last dial pulse ended in the first three-quarters of a revolution of magnetic drum MD, a 0 is written in the EPL cell in track 5 slot 1 of the register space. Referring to FIG. 27, AND gate —&—W05A will be actuated when an active signal is applied to its input A from the R1–5 lead, when an active signal is applied to its input B from the R1–6A lead, when an active signal is applied to its input C from the ON lead from the output of AND gate —&—ON shown in FIG. 27, when an active signal is applied to its input D from the –WS write sync lead and when an active signal is applied over the EP lead to input E. AND gate —&—W05A will be actuated to in turn cause the actuation of OR gate —OR–W05 when a dial pulse has ended during the previous three-quarters revolution of magnetic drum MD. The actuation of OR gate —OR–W05 will in turn apply an active signal over the W0–5 lead extending via cable 6 to the writing amplifier circuits associated with track 5 on magnetic drum MD to cause a 0 to be written in the EPL cell in slot 1 track 5 of the appropriate register space.

If the last dial pulse ended in the last one-quarter revolution of magnetic drum MD, a 1 will be written in the EPL cell in track 5 slot 1 of the register space. Referring to FIG. 27, AND gate —&—W15B will be actuated when an active signal is applied to its input A over lead S, when an active signal is applied to its input B over lead EP', when an active signal is applied to its input C over lead ON, when an active signal is applied to its input D over lead –WS and when an active signal is applied to its input E over the R0–5 lead. The actuation of AND gate —&—W15B in this manner in turn causes the actuation of OR gate —OR–W15. The actuation of OR gate —OR–W15 will apply an active signal condition to the W1–5 lead which extends via cable 6 to the writing amplifier circuits associated with track 5 on magnetic drum MD to cause a 1 to be written in the EPL cell in track 5 slot 1 of the register space.

When slot 1 of a register space is passing under the main read-write heads on magnetic drum MD, if the last pulse of a digit ended in the first three-quarters of the previous drum revolution an interdigital timeout will be completed at the end of one and three-quarters drum revolutions of closed loop condition thereafter. On the first pass of slot 1 of the register space under the main magnetic heads after the last dial pulse ended in the first three-quarters of the previous revolution, leads S, EP, R1–6A, L1, ON and –WS will be active. Lead S will be active because the subscriber's loop is now closed. Lead EP will be active because the subscriber's loop was closed one-quarter revolution earlier. Lead R1–6A will be active because a 1 will be read by auxiliary head HD6A in the EP1 cell in track 6 slot 4 of the mate register space which previously passed under the main magnetic heads giving an indication that a dial pulse ended in the first three-quarters of the previous drum revolution. Lead ON will be active because as described hereinbefore the register space is marked off normal. Under these conditions a 0 will be written in the EPL cell in slot 1 track 5 of the register space if a 0 is not now written therein. As shown in FIG. 27, AND gate —&—W05A and OR gate —OR–W05 will be actuated as described above (lead R1–5 will be active because a 1 will be read in slot 1 track 5 of the register space). The timer cells in the timer of slot 1 of the register space will also be erased. As shown in FIG. 31, OR gate —OR–R6SS' will be actuated by the active signal on the R1–6A lead to in turn actuate AND gate —&—W0B in the manner described hereinbefore.

At the completion of the first complete revolution of closed loop condition after the termination of a dial pulse, that is, when slot 1 of the register space passes under the main magnetic heads the second time after completion of the dial pulse, leads S, EP, R0–6A, R0–5, R0–3, and –WS will be active. Lead EP will be active because the subscriber's loop was closed one-quarter revolution earlier. Lead S will be active because the subscriber's loop is now closed. Lead R0–6A will be active because a 0 will be read by auxiliary head HD6A in the EP1 cell in track 6 slot 4 of the mate register space which previously passed under the main magnetic heads. This 0 indicates that a dial pulse did not end in the first three-quarters of the immediately preceding drum revolution. Lead R0–5 will be active because a 0 will be read in EPL cell in slot 1 track 5 of the register space. Lead R0–3 will be active because a 0 will be read in track 3 of the timer in slot 1. Under this set of conditions a 1 will be written in the timer cell in track 3 slot 1 of the register space to record one complete revolution of closed loop condition. As shown in FIG. 31, AND gate —&—CL will be actuated and in turn actuate OR gate —OR–W10A, AND gate —&—W13A and OR gate —OR–W13 in the manner described hereinbefore.

At the completion of the next revolution of magnetic drum MD which is the third pass of slot 1 of the register space under the main magnetic heads after the termination of the dial pulse, leads EP, R0–6A, R0–5, L1, –WS and R1–3 will be active. Lead R1–3 will be active because a 1 will be read in timer cell in track 3 slot 1. The active conditions on these leads will cause the actuation of AND gate —&—C13SB shown in FIG. 29. The actuation of this AND gate will in turn apply an active signal to lead C13SB which extends to input B of OR gate —OR–C1S and input C of OR gate —OR–C3S. The actuation of these two OR gates will in turn cause pulse memory flip-flops PMFF–C1 and PMFF–C3 to be set to indicate the completion of an interdigital timeout.

The setting of these flip-flops will cause active signals to be applied to the C1, C2' and C3 leads of cable 7 extending to the logic circuitry of the register space control circuit.

It is possible for the subscriber's loop to have closed at the end of the last dial pulse of a digit 1 microsecond after slot 1 of a register space passes under the main heads on magnetic drum MD. When slot 1 of the register space again passes under the main heads the loop will have been closed for 44 milliseconds less 1 microsecond (under the assumed drum speed). When slot 1 of the register space again passes under the main heads the loop will have been closed for 88 milliseconds less 1 microsecond. At the completion of three-quarters of an additional drum revolution the loop will have remained closed for 121 milliseconds less 1 microsecond. It is also possible for the subscriber's loop to have closed at the end of the last dial pulse of a digit 1 microsecond before the completion of three-quarters of a drum revolution, and therefore when slot 1 of the register space passes under the main magnetic heads on the magnetic drum after the completion of a dial pulse during the first three-quarters of the previous drum revolution the subscriber's loop will have been closed 11 milliseconds plus 1 microsecond. When slot 1 of the register space again passes under the main magnetic heads the loop will have been closed 55 milliseconds plus 1 microsecond. At the completion of three-quarters of an additional drum revolution the subscriber's loop will have been closed 88 milliseconds plus 1 microsecond. Accordingly, it will be observed that the interdigital timing accomplished by the above described circuitry will time interdigital intervals lasting between approximately 88 milliseconds and 121 milliseconds.

When slot 1 of a register space is passing under the main read-write heads on magnetic drum MD, if the last pulse of a digit ended in the final one-quarter of the previous drum revolution, an interdigital timeout will be completed at the end of two complete drum revolutions of closed loop condition thereafter. On the first pass of slot 1 of the register space under the main magnetic heads after the last dial pulse ended in the final one-quarter of the previous revolution, leads S, EP', R0–6A, L1, ON and –WS will be active. Lead S will be active because the subscriber's loop is now closed. Lead EP' will be active because the subscriber's loop was open one-quarter revolution earlier. Lead R0–6A will be active because a 0 will be read by auxiliary head HD6A in the EP1 cell in track 6 slot 4 of the mate register space which previously passed under the main magnetic heads. This 0 indicates that adial pulse did not end in the first three-quarters of the previous drum revolution. Lead ON will be active because as described hereinbefore the register space is marked off normal. At this time the logic circuits of the register space control circuit will cause a 1 to be written in the EPL cell in track 5 slot 1 of the register space if a 1 is not now written therein. As shown in FIG. 27, AND gate —OR–W15 will be actuated in the manner described hereinbefore (lead R0–5 will be active because a 1 will be read in slot 1 track 5 of the register space). The timer cells in the timer of slot 1 in the register space will also be erased. As shown in FIG. 31, AND gate —&—SEP', OR gate —OR–R6SS', and AND gate —&—W0B will be actuated in the manner described hereinbefore.

At the completion of the first complete revolution of closed loop condition after the termination of a dial pulse, that is when slot 1 of the register space passes under the main magnetic heads the second time after completion of the dial pulse, leads S, EP, R0–6A, R1–5, R0–3, L1 and –WS will be active. Lead EP will be active because the subscriber's loop was closed one-quarter revolution earlier. Lead S will be active because the subscriber's loop is now closed. Lead R0–6A will be active because a 0 will be read by auxiliary head HD6A in the EP1 cell in track 6 slot 4 of the mate register space which previously passed under the main magnetic heads. This 0 indicates that a dial pulse did not end in the first three-quarters of the immediately preceding drum revolution. Lead R1–5 will be active because a 1 will be read in the EPL cell in slot 1 track 5 of the register space. Lead R0–3 will be active because a 0 will be read in track 3 of the timer cell in slot 1. Under this set of conditions a 1 will be written in the timer cell in track 3 slot 1 of the register space to record one complete revolution of closed loop condition. As shown in FIG. 31, AND gate —&—CL will be actuated and in turn actuate OR gate —OR–W10A, AND gate —&—W13A, and OR gate —OR–W13 in the manner described hereinbefore.

At the completion of the next revolution of magnetic drum MD which is the third pass of slot 1 of the register space under the main magnetic heads after the termination of the dial pulse, leads S, EP, R0–6A, R15, L1, –WS, CL and R1–3 will be active. Lead R1–3 will be active because a 1 will be read in the timer cell in track 3 slot 1. Lead CL will be active because AND gate —&—CL shown in FIG. 31 will be actuated by the active signals on leads EP, L1, S and R0–6A. The active signal on lead CL is combined with the active signals on the –WS lead, the R1–3 lead, and the R1–5 lead in AND gate —&—C13SA shown in FIG. 29. The actuation of AND gate —&—C13SA in this manner will apply an active signal to lead C13SA extending to input A or OR gate —OR–C1S and input A of OR gate —OR–C3S. The actuation of these two OR gates will in a similar manner to that described hereinbefore cause the setting of pulse memory flip-flops PMFF–C1 and PMFF–C3 to their 1 condition, to indicate the completion of an interdigital timeout. The setting of these flip-flops will cause active signals to be applied to the C1, C2' and C3 leads of cable 7 extending to the logic circuitry of the register space control circuit.

It is possible for the subscriber's loop to have closed at the end of the last dial pulse of a digit, 1 microsecond after completion of three-quarters of the previous revolution of magnetic drum, and therefore when slot 1 of the register space passes under the main magnetic heads the first time after completion of the dial pulse the subscriber's loop will have been closed 11 milliseconds less 1 microsecond (under the assumed drum speed). When slot 1 of the register space again passes under the main heads the loop will have been closed for 55 milliseconds less 1 microsecond. When slot 1 of the register space passes under the main heads the third time after termination of the dial pulse the subscriber's loop will have been closed 99 milliseconds less 1 microsecond. It is also possible for the subscriber's loop to have closed 1 microsecond before slot 1 of a register space passes under the main magnetic heads so that upon the first pass of slot 1 of the register space under the main magnetic heads after termination of the dial pulse the subscriber's loop will have been closed for but 1 microsecond. At the completion of the second pass of slot 1 of the register space under the main magnetic heads after termination of the dial pulse the subscriber's loop will have been closed for 44 milliseconds plus 1 microsecond. When slot 1 of the register space passes under the main magnetic heads for the third time after termination of the dial pulse the subscriber's loop will have been closed for 88 milliseconds plus 1 microsecond. Accordingly, it will be observed that the interdigital timing accomplished by the above described circuitry will time interdigital circuits lasting between approximately 88 milliseconds and 99 milliseconds.

The reason for terminating interdigital timeouts for dial pulses ending the first three-quarters of a drum revolution after one and three-quarters revolutions of closed loop condition is to permit detection of the interdigital timeout under the upper limit of 121 milliseconds indicated above. The reason for terminating interdigital timeouts for dial pulses ending in the last one and one-quarter revolutions of magnetic drum MD after two complete revolutions of closed loop condition is to permit detection of an interdigital timeout above the lower limit of 88 milliseconds indicated above.

The differentiation between one and three-quarters and two revolutions of closed loop condition is accomplished by AND gates —&—C13SA and —&—C13SB shown in FIG. 29. It will be noted that leads EP, L1, S, R0–6A, –WS, R1–3, and R1–5 must be active to cause the actuation of AND gate —&—C13SA; and leads R0–5, –WS, R1–3, L, EP and R0–6A must be active to cause the actuation of AND gate —&—C13SB. It will be noted that the only timing difference between the two AND gates is the presence of lead S which must be active before AND gate —&—C13SA may be actuated. Because the loop condition at the end of three-quarters of a revolution of the magnetic drum is recorded in pulse memory flip-flop PMFF–EP shown in FIG. 28 and available on the EP or EP' leads when slot 1 of the register space passes under the main read-write heads. It is possible to distinguish between three-quarters of the revolution of closed loop condition and one revolution of closed loop condition. Accordingly, for one and three-quarters revolution timing it is unimportant if a new pulse begins in the last one-quarter of the second revolution because the condition of the subscriber's loop at the completion of one and three-quarters revolutions of the drum is recorded in pulse memory flip-flop PMFF–EP. However, when two revolutions of closed loop condition are being timed the loop must remain closed for the fourth and final scan of the second revolution in order to detect an interdigital timeout because lead S must be active and, as described hereinbefore, lead S is active only when the subscriber's loop is closed at the completion of a revolution of magnetic drum MD.

When an interdigital timeout is detected pulse memory flip-flops PMFF–C1 and PMFF–C3 are set and the logic circuitry of the register space control circuit hunts for the first of the slots 4 through 14 of the register space which contains a 0 in track 5. Referring to FIG. 30, it will be noted that OR gate —OR–L4–11, OR gate —OR–L4–14 and AND gate —&—IDL determine which of the slots 4 through 14 of a register space is the first to contain a 0 in track 5. The IDL lead from the output of AND gate —&—IDL will be active whenever one of the slots 4 through 14 of a register space contains a 0 in track 5. The active signal on the IDL lead is applied to input D of AND gate —&—W15A shown in FIG. 30. Input A of AND gate —&—W15A is connected to the C1 lead. Input B of AND gate —&—W15A is connected to the C3 lead. Input E of AND gate —&—W15A is connected to the –WS write sync lead, and input C of AND gate —&—W15A is connected to the output of OR gate —OR–BSY. Therefore, if OR gate —OR–BSY is actuated and pulse memory flip-flops PMFF–C1 and PMFF–C3 are operated making leads C1 and C3 active, AND gate —&—W15A will be actuated when the first slot of slots 4 through 14 which contains a 0 in track 5 is under its main read-write heads. The actuation of AND gate —&—W15A applies an active signal over the W15A lead which extends to input A of OR gate —OR–W15 shown in FIG. 27. The actuation of OR gate –OR–W15 in turn applies an active signal over the W1–5 lead extending via cable 6 to the writing amplifier circuits associated with track 5 on magnetic drum MD to cause a 1 to be written in the digit dialed cell in track 5 of the register space.

Returning again to OR gate —OR–BSY shown in FIG. 30, it will be noted that this OR gate will be actuated whenever a 1 is read in tracks 1, 2 or 3 of a register space or when AND gate —&—BSY shown in FIG. 30 is actuated. It will be noted that AND gate —&—BSY will be actuated when a 1 is read in track 4 of slots 5 through 14.

The provision of AND gate —&—BSY and OR gate —OR—BSY assures that AND gate —&—W15A will not be actuated in response to an interdigital timeout unless at least a count of 1 is registered in the register opposite the 0 except in slot 4 where preliminary pulse rejection is accomplished as will be described below.

*Preliminary Pulse Rejection*

The logic circuitry covering interdigital timeout after the first dialed digit is recorded in slot 4 is more selective. This precludes the possibility of a subscriber accidentally deflecting a switchhook when lifting the handset and thereby getting an incorrect number if this accidental break in the loop condition is recorded as a dial pulse. Provision is made to reject any 1 (preliminary pulse) as a first digit dialed. Accordingly, if only one dial pulse is detected and recorded in slot 4 and is then followed by an interdigital timeout, this preliminary pulse will be rejected by simply erasing the 1 in track 4 rather than by writing a 1 in the digit dialed cell in track 5.

Referring to FIG. 30, input A of AND gate —&—W04B is connected to the L4 lead which will be active when slot 4 of a register space passes under the main read-write heads. Input B of AND gate —&—W04B is connected to the C1 lead, input C of AND gate —&—W04B is connected to the C3 lead, input D of AND gate —&—W04B is connected to the R1-4 lead and input E of AND gate —&—W04B is connected to the output of AND gate —&—PPRA. Accordingly, if a 0 is read in tracks 1, 2 and 3 of slot 4 and a 0 is read in track 5 of slot 4, AND gate —&—PPRA will actuated to apply an active signal to input E of AND gate —&—W04B. If a 1 is read in track 4 of slot 4 and if leads C1 and C3 are active indicating the detection of an interdigital timeout, AND gate —&—W04B will be actuated to apply an active signal over the W04B lead extending to an input of OR gate —OR—W04 shown in FIG. 31. The actuation of OR gate —OR—W04 will in turn cause an active signal to be applied to the W0-4 lead extending via cable 6 to the writing amplifier circuits associated with track 4 on magnetic drum MD to cause a 0 to be written in track 4 slot 4 of the register space. In other words, there must be more than one pulse recorded in the first digit register in slot 4 of a register space before an interdigital timeout can be detected. This rejection of 1's as a first digit dialed will continue indefinitely as long as these preliminary pulses are detected.

If, at any time during which the revolutions of either open or closed loop condition are being counted in the timer, a change of loop condition is noted, the count in the timer is erased in the manner described hereinbefore.

*Sender Release*

From the table given hereinbefore, it will be noted that a sender release is evidenced by the operation of pulse memory flip-flop PMFF-C3 alone. This indicates that the calling subscriber's loop has opened as a result of abandonment or termination of a call. The logic circuitry of the register space control circuit counts the number of revolutions of open loop condition and when the count in the timer cells in slot 1 of a register space stands at 111 (seven revolutions), conditions are such so as to operate pulse memory flip-flop PMFF-C3 shown in FIG. 29. Referring to FIG. 29, AND gate —&—W0C has inputs connected to the R1-1, R1-2 and R1-3 leads which will be active when a count of 111 is read in the timer cells in tracks 1, 2 and 3 of slot 1 of the register space. Input A of this AND gate is connected to the 0L —WS write sync lead and input E is connected to the 0L lead from the output of AND gate —&—0L shown in FIG. 31. As described hereinbefore, lead 0L will be active when an open loop condition is detected. The actuation of AND gate —&—W0C will in turn cause the actuation of OR gate —OR—C3S which causes the operation of pulse memory flip-flop PMFF-C3. The output of AND gate —&—W0C is also applied to lead W0C which extends to an input of OR gate —OR-W04 shown in FIG. 31. The actuation of OR gate —OR—W04 causes an active signal to be applied over the W0-4 lead extending via cable 6 to the writing amplifier circuits associated with track 4 on magnetic drum MD to cause a 0 to be written in track 4 slot 1 (the ON cell) of the register space. The active signal on the W0C lead is also applied to input B or OR gate —OR—W05 shown in FIG. 27 which in a similar manner causes a 0 to be written in the EPL cell in track 5 slot 1 of the register space. When the count of 111 is read in the timer cells, the timer itself recycles and 0's will be written in tracks 1, 2 and 3 of the timer cells in slot 1 of the register space. The LR cell in track 6 slot 1 will have been previously set to 0 because of the previous detection of the open loop conditions.

With pulse memory flip-flop PMFF-C3 in FIG. 29 actuated, the active signal conditions on leads C3, C2' and C1' are combined in AND gate —&—W0A shown in FIG. 31. The actuation of this AND gate applies an active signal to the W0A lead which extends to OR gates —OR—W05, —OR—W04, —OR—W03, —OR—W02 and —OR—W01 causing 0's to be written in each of tracks 1 through 5 of the slots of the register space. Pulse memeory flip-flop PMFF-C3 is reset when slot 14 of the register space passes under the magnetic heads. Referring to FIG. 29, it will be noted that lead L14 is applied to input A of OR gate —OR—CR. Therefore, this OR gate will be actuated when slot 14 of the register space passes under the magnetic heads to apply active signals to the resetting inputs of all three pulse memory flip-flops PMFF-C1, PMFF-C2 and PMFF-C3. The register space is now empty and all flip-flops are normal and a new call may be handled by the register space whenever its associated sender requires it.

It is to be understood that the above-described arrangements are illustrative of the application of the principles of the present invention. Numerous other arrangements may be devised by those skilled in the art without departing from the spirit and scope of the invention.

What is claimed is:

1. In a pulse signaling system including a plurality of transmission paths having either one or the other of two states wherein a signal pulse is characterized by the change from a first state to a second state and back again to said first state, a signal pulse detector and register comprising in combination, a magnetic storage medium comprising a continuously rotating surface of a magnetizable material, scanning means operative to determine the state of said paths, means connecting said scanning means to each of said paths a plurality of times during each revolution of said medium, means controlled by said scanning means for recording on said medium indicia representing the state of each of said paths as determined by each of the scans thereof, comparing means for comparing the state of each of said paths during each scan thereof with the state determined on the immediately preceding scan thereof, pulse detecting means controlled by said comparing means and operable when a change of state representing the completion of a signal pulse is detected in any of said transmission paths, and means controlled by said pulse detecting means and operable after each scan of each of said transmission paths during any one revolution of said medium for recording on said medium indicia representing the cumulative count of the signal pulses detected thus far in said one revolution.

2. A signal pulse detector and register as defined in claim 1 in combination with means operable at the completion of each revolution of said medium for recording on said medium indicia representing the total cumulative count of the signal pulses detected in each of said paths for the revolution of said medium just completed plus the number of signal pulses detected in previous revolutions of said medium.

3. A signal pulse detector and register as defined in claim 1 wherein said comparing means comprises settable means settable after each scan of each of said paths to either of two conditions corresponding to the state of the scanned path, means for reading the indicia representing the previous state of the scanned path recorded on said medium during the immediately preceding scan thereof and means operable after each scan of each of said paths for comparing the previous state of the scanned path represented by said indicia with the state of said scanned path represented by the setting of said settable means.

4. In a data storage system, a source of data to be stored, a magnetic storage medium comprising a continuously rotating surface of a magnetizable material, said medium being divided into a plurality of sections, a combined recording and pickup device located adjacent to said medium, each of said sections of said medium sequentially passing said device, recording means including said device for recording data on said medium, means for connecting said recording means to said data source during the passage of each of said sections of said medium past said device, and means for successively transferring data from section to section of said medium during one revolution thereof.

5. In a data storage system, a plurality of sources of data to be stored, a magnetic storage medium comprising a continuously rotating surface of a magnetizable material, said medium being divided into a plurality of sections, a combined recording and pickup device located adjacent to said medium, each of said sections of said medium sequentially passing said device, recording means including said device for recording data on said medium, means for connecting said recording means to each of said data sources during the passage of each of said sections of said medium past said device, and means for successively shifting data from section to section of said medium during one revolution thereof in a direction opposite to the direction of rotation thereof.

6. In a data storage system, a source of data to be stored, a magnetic storage medium comprising a continuously rotating surface of a magnetizable material, said medium being divided into a plurality of sections, a recording device located adjacent to said medium, each of said sections of said medium sequentially passing said recording device, recording means including said recording device operable during the passage of each section of said medium past said recording device for recording therein on said medium data received from said data source, reading means operable during the passage of each section of said medium past said recording device for reading the data recorded in the previous section of said medium to pass said recording device, combining means operable during the passage of each section of said medium past said recording device for combining the data read by said reading means and the data received by said recording means, and a second recording means controlled by said combining means and including said recording device operable during the passage of each of said sections of said medium past said recording device for recording therein on said medium the data combined by said combining means.

7. In a data storage system, a plurality of sources of data to be stored, a magnetic storage medium comprising a continuously rotating surface of a magnetizable material, said medium being divided into a plurality of sections, a plurality of groups of areas on said medium each group being individually associated with a different one of said sources of data and each area in said groups being located in a different one of said sections of said medium, a combined recording and pickup device located adjacent to said medium, each of said areas of said medium sequentially passing said device in sequence, data receiving means, scanning means operable during the passage of each of said areas on said medium past said recording and pickup device for connecting the source of data associated therewith to said data receiving means, first recording means including said recording and pickup device operable during the passage of each of said areas on said medium past said recording and pickup device for recording thereon on said medium the data received by said data receiving means from the data source associated therewith, an auxiliary pickup device, reading means including said auxiliary pickup device operable during the passage of each of said areas on said medium past said recording and pickup device for reading the data recorded on said medium in the last area of the same group of areas to pass said recording and pickup device, combining means operable during the passage of each of said areas on said medium past said recording and pickup device for combining the data read by said reading means and the data received from the source of data associated therewith by said data receiving means, and second recording means controlled by said combining means and including said recording and pickup device operable during the passage of each of said areas on said medium past said recording and pickup device for recording therein on said medium the combined data received from said combining means.

8. In a pulse signaling system including a plurality of transmission paths having either one or the other of two states wherein a signal pulse is characterized by the change from a first state to a second state and back again to said first state and wherein successive digital values are represented by successive series of signal pulses each series of which is separated by an interdigital interval, means for detecting said interdigital intervals comprising in combination, a magnetic storage medium comprising a continuously rotating surface of a magnetizable material, a plurality of recording and pickup devices located adjacent to said medium, scanning means for determining the state of each of said paths a plurality of times during each revolution of said medium, pulse detecting means controlled by said scanning means for detecting the completion of signal pulses in each of said paths, timing means including said medium and controlled by said pulse detecting means for timing the interval between the end of each of said signal pulses detected and the start of a succeeding signal pulse, timeout means operable when said timing means times a predetermined interval corresponding to a nonintegral number of complete drum revolutions and means controlled by said timeout means for recording on said medium indicia indicating the detection of an interdigital interval.

9. In a pulse signaling system including a plurality of transmission paths having either one or the other of two states wherein a signal pulse is characterized by the change from a first state to a second state and back again to said first state and wherein successive digital values are represented by successive series of signal pulses each series of which is separated by an interdigital interval, means for detecting said interdigital intervals comprising in combination, a magnetic storage medium comprising a continuously rotating surface of a magnetizable material, a plurality of recording and pickup devices located adjacent to said medium, scanning means for determining the state of each of said paths a plurality of times during each revolution of said medium, pulse detecting means controlled by said scanning means for detecting the completion of signal pulses in each of said paths, counting means controlled by said scanning means for counting the complete revolutions made by said medium between the end of each detected signal pulse and the next succeeding signal pulse, timeout means controlled by said counting means and operable a predetermined portion of one revolution of said medium after a predetermined number of complete revolutions thereof, and means controlled by said timeout means and including said recording and pickup devices for recording on said medium indicia indicating the detection of an interdigital interval.

10. In a pulse signaling system including a plurality of transmission paths having either one or the other of two states wherein a signal pulse is characterized by the change from a first state to a second state and back again to said first state and wherein successive digital values are represented by successive series of signal pulses each series of which is separated by an interdigital interval, means for detecting said interdigital intervals comprising in combination, a magnetic storage medium comprising a continuously rotating surface of a magnetizable material, a plurality of recording and pickup devices located adjacent to said medium, scanning means for determining the state of each of said paths a plurality of times during each revolution of said medium, pulse detecting means controlled by said scanning means for detecting the completion of signal pulses in each of said paths, means operable at the completion of a revolution of said medium following the detection of a signal pulse in any of said paths in a first part of said revolution for recording a first indicia on said medium, means operable at the completion of a revolution of said medium following the detection of a signal pulse in any of said paths in a second part of said revolution for recording a second indicia on said medium, timing means for timing the interval between the end of each signal pulse detected and the start of a succeeding signal pulse, timeout means responsive to said first indicia on said medium and operable after the timing of a first predetermined interval by said timing means and responsive to said second indicia on said medium and operable after the timing of a second predetermined interval by said timing means, and means controlled by said timeout means when operated for recording on said medium indicia indicating the detection of an interdigital interval.

11. In a pulse signaling system including a plurality of transmission paths having either one or the other of two states wherein a signal pulse is characterized by the change from a first state to a second state and back again to said first state and wherein successive digital values are represented by successive series of signal pulses each series of which is separated by an interdigital interval, means for detecting said interdigital intervals comprising in combination, a magnetic storage medium comprising a continuously rotating surface of a magnetizable material, a plurality of recording and pickup devices located adjacent to said medium, scanning means for determining the state of each of said paths a plurality of times during each revolution of said medium, pulse detecting means controlled by said scanning means for detecting the completion of signal pulses in each of said paths, means operable at the completion of a revolution of said medium following the detection of a signal pulse in any of said paths in a first part of said revolution for recording a first indicia on said medium, means operable at the completion of a revolution of said medium following the detection of a signal pulse in any of said paths in a second part of said revolution for recording a second indicia on said medium, counting means controlled by said scanning means for counting the number of complete revolutions made by said medium between the end of each detected signal pulse and the start of the next succeeding signal pulse, first timeout means controlled by said counting means and responsive to said first indicia on said medium and operable a predetermined portion of one revolution of said medium after a predetermined number of complete revolutions thereof, second timeout means controlled by said counting means and responsive to said second indicia on said medium and operable after a predetermined number of complete revolutions of said medium, and means controlled by said first timeout means and said second timeout means when operated for recording on said medium indicia indicating the detection of an interdigital interval.

12. In a data storage system, a source of signals to be stored, a magnetic storage medium comprising a continuously rotating surface of a magnetizable material, said medium being divided into a plurality of sections, a recording device located adjacent said medium, each of said sections of said medium sequentially passing said recording device, signal detecting means, means for connecting said signal detecting means to said source of signals during the passage of each of said sections of said medium past said recording device, means including said signal detecting means and said recording device operable when a signal is detected in said source during the passage of any of said sections of said medium past said recording device for recording on said medium indicia representing said signal, an auxiliary pickup device located adjacent said medium and positioned with respect thereto to read the indicia recorded thereon by said recording device, means including said auxiliary pickup device for accumulating the number of signals detected in said source during each revolution of said medium, and means controlled by said accumulating means operable at the completion of each revolution of said medium for recording on said medium indicia representing said number of signals.

13. In a data storage system a plurality of sources of signals to be stored, a magnetic storage medium comprising a continuously rotating surface of a magnetizable material, a plurality of areas on said medium each individual to a different one of said sources, said areas on said medium being divided into a plurality of groups, a magnetic head located adjacent said medium, each of said areas of said medium sequentially passing said head, signal detecting means, means for connecting said signal detecting means to each of said sources during the passage of each of said groups of areas on said medium past said head, and means including said head controlled by said signal detecting means for recording indicia representing the number of signals detected in each of said sources in the area on said medium individual thereto.

14. In a pulse signaling system including a transmission path having either one or the other of two conditions wherein a signal pulse is characterized by the change from a first condition to a second condition and back to said first condition, a signal pulse detector and register comprising in combination, a magnetic storage medium comprising a continuously rotating surface of a magnetizable material, said medium being divided into a plurality of sections, a magnetic head positioned adjacent said medium, each of said sections of said medium sequentially passing said head, recording means including said head for recording indicia on said medium, scanning means for determining the condition of said transmission path, means connecting said scanning means to said transmission path during the passage of each of said sections of said medium past said head, means controlled by said scanning means and including said recording means for recording in each of said sections of said medium indicia representing the condition of said transmission path during the respective scan thereof as each of said sections of said medium passes said head, an auxiliary pickup device located adjacent said medium and operative during the passage thereby of each of said sections of said medium to read the indicia previously recorded therein during the immediately preceding passage past said head, comparing means controlled by said scanning means and said auxiliary pickup device for comparing the condition of said transmission path after each scan thereof with the condition determined on the previous scan thereof, pulse detecting means controlled by said comparing means and operable when the completion of a signal pulse is detected, and means including said recording means and controlled by said pulse detecting means operable on the detection of a completed signal pulse during the passage of any of said sections of said medium past said head for recording therein on said medium indicia indicative of the completon of said signal pulse.

15. The combination of claim 14 in combination with pickup means including said head for reading the indicia recorded on said medium by said recording means, means controlled by said pickup means and said auxiliary pickup device for determining the number of signal pulses completed in said transmission path during each revolution of said medium, and means controlled by said last named means operable at the completion of each revolution of said medium for recording on said medium indicia representing said number of signal pulses.

References Cited in the file of this patent

UNITED STATES PATENTS

| | | |
|---|---|---|
| 2,679,035 | Daniels | May 18, 1954 |
| 2,700,148 | McGuigan | Jan. 18, 1955 |
| 2,764,634 | Brooke et al. | Sept. 25, 1956 |
| 2,896,019 | Wright et al. | July 21, 1959 |